(12) United States Patent
Nakano et al.

(10) Patent No.: US 8,180,059 B2
(45) Date of Patent: May 15, 2012

(54) MANAGEMENT APPARATUS, TERMINAL APPARATUS, AND COPYRIGHT PROTECTION SYSTEM

(75) Inventors: Toshihisa Nakano, Osaka (JP);
Nuttapong Attrapadung, Tokyo (JP);
Kazukuni Kobara, Tokyo (JP); Hideki Imai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1544 days.

(21) Appl. No.: 10/578,892

(22) PCT Filed: Nov. 25, 2004

(86) PCT No.: PCT/JP2004/017453
§ 371 (c)(1),
(2), (4) Date: May 11, 2006

(87) PCT Pub. No.: WO2005/060149
PCT Pub. Date: Jun. 30, 2005

(65) Prior Publication Data
US 2007/0067622 A1    Mar. 22, 2007

(30) Foreign Application Priority Data
Nov. 28, 2003    (JP) .................... 2003-399968

(51) Int. Cl.
*H04L 9/00* (2006.01)
*H04N 7/167* (2011.01)
*H04L 29/06* (2006.01)

(52) U.S. Cl. .................. 380/277; 380/201; 713/153

(58) Field of Classification Search .............. None
See application file for complete search history.

(56) References Cited

U.S. PATENT DOCUMENTS

| | | | |
|---|---|---|---|
| 7,010,125 B2 * | 3/2006 | Lotspiech et al. | 380/242 |
| 7,088,822 B2 * | 8/2006 | Asano | 380/45 |
| 2002/0076204 A1 | 6/2002 | Nakano et al. | |
| 2003/0182565 A1 | 9/2003 | Nakano et al. | |

FOREIGN PATENT DOCUMENTS

| | | |
|---|---|---|
| JP | 10-283270 | 10/1998 |
| JP | 63-298523 | 12/1998 |
| JP | 2002-281013 | 9/2002 |
| JP | 2003-169048 | 6/2003 |

OTHER PUBLICATIONS

D. Naor, M. Naor and J. Lotspiech, "Revocation and Tracing Schemes for Stateless Receivers", Proceedings of CRYPTO2001, LNCS2139, pp. 41-62, 2001.

* cited by examiner

*Primary Examiner* — Kaveh Abrishamkar
*Assistant Examiner* — Nadia Khoshnoodi
(74) *Attorney, Agent, or Firm* — Wenderoth, Lind & Ponack, L.L.P.

(57) ABSTRACT

A management apparatus reduces the number of pieces of unique information each not generated from another piece of unique information, among unique information being bases of keys assigned to managed apparatuses.

The management apparatus calculates, for nodes in layers other than tree structure leaves, subsets of apparatus identifiers subordinate to the nodes, searches for a subset wholly containing another subset in the lowermost layer other than a leaf layer from an immediately-upper layer and mutually associates these subsets, searches for another subset wholly containing the containing subset from a same or an immediately-upper layer and mutually associates these subsets, controls this processing to repeat up to the uppermost layer, controls these processings to repeat on all subsets in the lowermost layer, makes unique information correspond to subsets in the lowermost layer, and makes information derivatively obtained from the unique information correspond to subsets connected due to the associating.

39 Claims, 44 Drawing Sheets

FIG. 4

| PARENT NODE NAME | CHILD NODE NAME | APPARATUS IDENTIFIER |
|---|---|---|
| E0 | E1 | — |
| E0 | E2 | — |
| E1 | E3 | — |
| E1 | E4 | — |
| E2 | E5 | — |
| E2 | E6 | — |
| E3 | E7 | — |
| E3 | E8 | — |
| E4 | E9 | — |
| E4 | E10 | — |
| E5 | E11 | — |
| E5 | E12 | — |
| E6 | E13 | — |
| E6 | E14 | — |
| E7 | — | APPARATUS 1 |
| E8 | — | APPARATUS 2 |
| E9 | — | APPARATUS 3 |
| E10 | — | APPARATUS 4 |
| E11 | — | APPARATUS 5 |
| E12 | — | APPARATUS 6 |
| E13 | — | APPARATUS 7 |
| E14 | — | APPARATUS 8 |

FIG. 5

| | | | | | | | |
|---|---|---|---|---|---|---|---|
| 2345678<br>A5RLRRR<br>K28 | 1345678<br>A5RLRRL<br>K27 | 1245678<br>A5RLRLR<br>K26 | 1235678<br>A5RLRLL<br>K25 | 1234678<br>A1RLRRR<br>K11 | 1234578<br>A1RLRRL<br>K10 | 1234568<br>A1RLRLR<br>K9 | 1234567<br>A1RLRLL<br>K8 |
| | | | | 345678<br>A5RLRR<br>K24 | 125678<br>A5RLRL<br>K23 | 123478<br>A1RLRR<br>K7 | 123456<br>A1RLRL<br>K6 |
| | | | | | | 5678<br>A5RLR<br>K22 | 1234<br>A1RLR<br>K5 |
| 678<br>A7RR<br>K33 | 578<br>A7RL<br>K32 | 568<br>A5RR<br>K21 | 567<br>A5RL<br>K20 | 234<br>A3RR<br>K16 | 134<br>A3RL<br>K15 | 124<br>A1RR<br>K4 | 123<br>A1RL<br>K3 |
| | | | | 78<br>A7R<br>K31 | 56<br>A5R<br>K19 | 34<br>A3R<br>K14 | 12<br>A1R<br>K2 |
| 8<br>A8<br>K34 | 7<br>A7<br>K30 | 6<br>A6<br>K29 | 5<br>A5<br>K18 | 4<br>A4<br>K17 | 3<br>A3<br>K13 | 2<br>A2<br>K12 | 1<br>A1<br>K1 |

| | PARENT NODE | CHILD NODE | ROOT INFORMATION |
|---|---|---|---|
| D301 | 1 | 12 | ROOT |
| | 12 | 123 | |
| | 12 | 124 | |
| | 123 | 1234 | |
| D302 | 124 | — | |
| | 1234 | 123456 | |
| | 1234 | 123478 | |
| | 123456 | 1234567 | |
| | 123456 | 1234568 | |
| | 123478 | 1234578 | |
| | 123478 | 1234678 | |
| D303 | 1234567 | — | |
| | 1234568 | — | |
| | 1234578 | — | |
| | 1234678 | — | |
| D311 | 2 | — | ROOT |
| | 3 | 34 | ROOT |
| | 34 | 134 | |
| | 34 | 234 | |
| D321 | 134 | — | |
| D322 | 234 | — | |
| D331 | 4 | — | ROOT |
| | 5 | 56 | ROOT |
| | 56 | 567 | |
| | 56 | 568 | |
| | 567 | 5678 | |
| | 568 | — | |
| | 5678 | 125678 | |
| | 5678 | 345678 | |
| | 125678 | 1235678 | |
| | 125678 | 1245678 | |
| | 345678 | 1345678 | |
| | 345678 | 2345678 | |
| | 1235678 | — | |
| | 1245678 | — | |
| | 1345678 | — | |
| | 2345678 | — | |
| | 6 | — | ROOT |
| | 7 | 78 | ROOT |
| | 78 | 578 | |
| | 78 | 678 | |
| | 578 | — | |
| | 678 | — | |
| | 8 | — | ROOT |

| 501 | 502 | 503 | 504 | 505 | 506 |
|---|---|---|---|---|---|
| 1234567 | 123456 | 1234 | 123 | 12 | 1 |
| 1234568 | 123478 | 5678 | 124 | 34 | 2 |
| 1234578 | 125678 | | 134 | 56 | 3 |
| 1234678 | 345678 | | 234 | 78 | 4 |
| 1235678 | | | 567 | | 5 |
| 1245678 | | | 568 | | 6 |
| 1345678 | | | 578 | | 7 |
| 2345678 | | | 678 | | 8 |

FIG. 12

| APPARATUS NAME | TOTAL NUMBER OF PIECES | KEY INFORMATION STORED IN THE APPARATUS | | | | | | | |
|---|---|---|---|---|---|---|---|---|---|
| APPARATUS 1 | 4 PIECES (−2) | 1<br>A1 | 134<br>A3RL | 125678<br>A5RLRL | 1345678<br>A5RLRRL | | | | |
| APPARATUS 2 | 5 PIECES (−1) | 2<br>A2 | 12<br>A1R | 234<br>A3RR | 125678<br>A5RLRL | 2345678<br>A5RLRRR | | | |
| APPARATUS 3 | 4 PIECES (−2) | 3<br>A3 | 123<br>A1RL | 345678<br>A5RLRR | 1235678<br>A5RLRLL | | | | |
| APPARATUS 4 | 6 PIECES (0) | 4<br>A4 | 34<br>A3R | 124<br>A1RR | 1234<br>A1RLR | 345678<br>A5RLRR | 1245678<br>A5RLRLR | | |
| APPARATUS 5 | 4 PIECES (−2) | 5<br>A5 | 578<br>A7RL | 123456<br>A1RLRL | 1234578<br>A1RLRRL | | | | |
| APPARATUS 6 | 5 PIECES (−1) | 6<br>A6 | 56<br>A5R | 678<br>A7RR | 123456<br>A1RLRL | 1234678<br>A1RLRRR | | | |
| APPARATUS 7 | 4 PIECES (−2) | 7<br>A7 | 567<br>A5RL | 123478<br>A1RLRR | 1234567<br>A1RLRLL | | | | |
| APPARATUS 8 | 6 PIECES (0) | 8<br>A8 | 78<br>A7R | 568<br>A5RR | 5678<br>A5RLR | 123478<br>A1RLRR | 1234568<br>A1RLRLR | | |

| APPARATUS NAME | TOTAL NUMBER OF PIECES | KEY INFORMATION STORED IN THE APPARATUS | | | | | | |
|---|---|---|---|---|---|---|---|---|
| APPARATUS 1 | 4 PIECES (-2) | 1-0<br>A1 | 3-12<br>A3RL | 5-1212<br>A5RLRL | 5-12112<br>A5RLRLL | | | |
| APPARATUS 2 | 5 PIECES (-1) | 2-0<br>A2 | 1-1<br>A1R | 3-11<br>A3RR | 5-1212<br>A5RLRL | 5-12111<br>A5RLRRR | | |
| APPARATUS 3 | 4 PIECES (-2) | 3-0<br>A3 | 1-12<br>A1RL | 5-1211<br>A5RLRR | 5-12122<br>A5RLRLL | | | |
| APPARATUS 4 | 6 PIECES (0) | 4-0<br>A4 | 3-1<br>A3R | 1-11<br>A1RR | 1-121<br>A1RLR | 5-1211<br>A5RLRR | | 5-12121<br>A5RLRLR |
| APPARATUS 5 | 4 PIECES (-2) | 5-0<br>A5 | 7-12<br>A7RL | 1-1212<br>A1RLRL | 1-12112<br>A1RLRLL | | | |
| APPARATUS 6 | 5 PIECES (-1) | 6-0<br>A6 | 5-1<br>A5R | 7-11<br>A7RR | 1-1212<br>A1RLRL | 1-12111<br>A1RLRRR | | |
| APPARATUS 7 | 4 PIECES (-2) | 7-0<br>A7 | 5-12<br>A5RL | 1-1211<br>A1RLRR | 1-12122<br>A1RLRLL | | | |
| APPARATUS 8 | 6 PIECES (0) | 8-0<br>A8 | 7-1<br>A7R | 5-11<br>A5RR | 5-121<br>A5RLR | 1-1211<br>A1RLRR | | 1-12121<br>A1RLRLR |

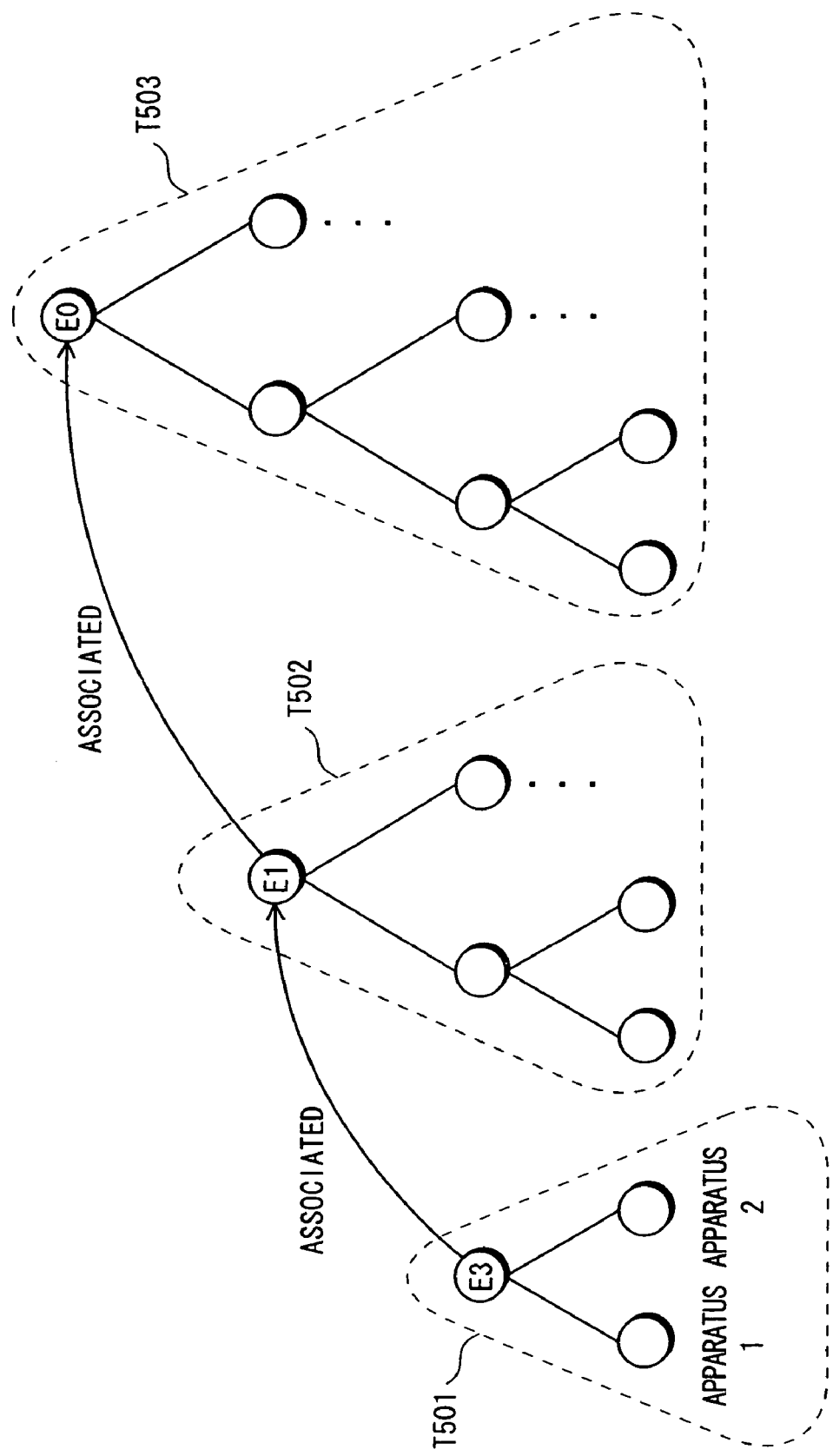

MANAGEMENT APPARATUS, TERMINAL APPARATUS, AND COPYRIGHT PROTECTION SYSTEM

TECHNICAL FIELD

The present invention relates to a technique to record and play back digitalized data of contents being copyrighted works such as movies and music onto and from a large-capacity recording medium such as an optical disc, and particularly to a technique to prevent copyright infringement using an illegitimate apparatus to record and play back such contents.

BACKGROUND ART

In recent years, since multimedia-related technology has been developed and large-capacity recording media have become available, a system has been getting popular in which digital contents (hereafter, simply referred to as "contents") that are made of video, audio, and the like are generated and distributed as being stored in a large capacity recording medium such as an optical disc or distributed via a network or by broadcast.

Distributed contents are read with the use of a computer, a playback apparatus, or the like, so that they can be played back or duplicated.

Generally speaking, an encryption technique is used in order to protect copyrights of contents, in other words, in order to prevent illegitimate use of contents such as illegitimate playback and illegitimate duplication.

More specifically, contents are encrypted with the use of an encryption key and distributed as being recorded on a recording medium such as an optical disc. With regards to such contents, only terminal apparatuses that each have a decryption key corresponding to the encryption key are able to decrypt data read from the recording medium, using the decryption key and to, for example, play back the contents. It should be noted that, when contents are encrypted and recorded onto a recording medium, different methods are used such as (i) contents are encrypted with an encryption key corresponding to a decryption key stored in a terminal apparatus and then recorded and (ii) contents are encrypted with a key and recorded, and then a decryption key that corresponds to the key is encrypted with an encryption key that corresponds to the decryption key stored in a terminal apparatus and recorded.

In such cases, it is necessary to strictly manage the decryption key stored in the terminal apparatus so that it is not disclosed to the outside. There is a risk, however, that such a key may be disclosed to the outside when an illegitimate user analyzes the inside of the terminal apparatus. Once an illegitimate user has discovered such a key, there are chances that the illegitimate user may manufacture a recording apparatus, a playback apparatus, or software for illegitimately utilizing the contents and distribute it via the Internet and the like. In such situations, the copyright holder would want to make sure that the once-disclosed key becomes unable to handle the contents to be provided in the future. A technique to realize this is called a key revocation technique. The Patent Document 1 and the Non-Patent Document 1 disclose systems that realize key revocation with the use of a hierarchical structure called a tree structure.

The following describes a conventional key revocation technique disclosed in the Non-Patent Document 1.

Firstly, a "subset difference" is to be defined. A subset difference is defined as a set being made up of apparatuses (leaves) obtained by excluding a set of a smaller tree structure from a set of a larger tree structure. The subset difference is determined by specifying two roots, namely one root for the larger tree structure and the other root for the smaller tree structure. A decryption key is assigned to each subset difference.

Further, a content is encrypted with a content key, and each apparatus owns a decryption key. A piece of data that required for each apparatus to obtain a content key using the decryption key stored in the apparatus will be referred to as key data. Generally speaking, a piece of key data is distributed along with a content. In the case where a recording medium is used for distribution of a content, a piece of key data is recorded on the recording medium.

It is possible to reduce the size of a piece of key data by supplementing a set of unrevoked apparatuses with a subset difference. FIG. 42 is a diagram that shows the concept. In FIG. 42, the root of the larger tree structure T1000 is Vi, and the root of the smaller tree structure T1001 is Vj. A set for revoking apparatuses assigned to the two leaves marked with the Xs is a subset difference 1001 "Si, j" obtained by excluding the tree structure T1001 from the tree structure T1000. The required key data is an encrypted content key that is encrypted using an encryption key "Li, j" corresponding to the subset difference "Si, j". To be more specific, the subset difference is a set of leaves belonging to a remainder portion obtained by excluding a conceptual drawing T1003 conceptually representing the tree structure T1001 from a conceptual drawing T1002 conceptually representing the tree structure T1000.

As another example, FIG. 43 shows a subset difference and an encryption key "Si, j" to be used for encrypting a content key in the case where the apparatuses 3, 4, 13, and 15 are revoked in a tree structure with sixteen apparatuses. For example, the apparatuses 9 to 12 belong to a subset difference 2001 "S3, 7" obtained by excluding the tree structure T2001 whose root is V7 from the tree structure T2000 whose root is V3. In FIG. 43, apparatuses that belong to a subset difference "Si, j" each own a decryption key in common. For example, the apparatuses 1, 2, and 5 to 8 that belong to the subset difference 2002 "S2, 9" each own a decryption key "L2, 9" in common. The apparatuses 9 to 12 that belong to the subset difference 2001 "S3, 7" each own a decryption key "L3, 7" in common. Further, since a content key is encrypted with each of "L2, 9", "L3, 7", "L14, 28", and "L15, 31", the apparatuses 3, 4, 13, and 15 having none of the decryption keys are unable to decrypt the content key and are unable to deal with the contents.

Here, each of the apparatuses needs to own a decryption key in correspondence with the positional relationship of the revoked apparatuses. The concept in principle can be explained as follows: If an apparatus owns a decryption key "Li, j" in correspondence with a subset difference "Si, j", then the apparatus also owns a decryption key "Li, k" in correspondence with a subset difference "Si, k", where Vk is a subset of Vj. In such a case, a one-way function is used in order to have an arrangement wherein it is possible to calculate "Li, k" from "Li, j", but it is impossible to calculate "Li, j" from "Li, k".

First of all, explanation is provided on encryption keys (that are in correspondence with decryption keys owned by apparatuses) assigned to the nodes in a tree structure, with reference to the example of a tree structure T3000 having binary trees shown in FIG. 44. It should be noted that FIG. 44 shows a part of the tree structure T3000 which manages eight apparatuses in total.

Mutually distinctive T-bit identifiers called "labels" are respectively provided for the nodes in the tree structure T3000 shown in FIG. 44. A pseudo random number generator G is provided that is operable to generate a 3T-bit random number in response to an inputted data length of T bits. In the case where a label "A1" is inputted to the pseudo random number generator G, among the 3T bits to be outputted, the first T bits are taken as a label of a child positioned on the bottom left of the label 3001 "A1", and the middle T bits are taken as an encryption key in correspondence with the node having the label 3001 "A1", while the last T bits are taken as a label of a child positioned on the bottom right of the label 3001 "A1". These three pieces of T-bit data are expressed as "A1L", "A1M", and "A1R", respectively. In FIG. 44, the labels "A1", "A2", "A3", and "A4" . . . are assigned to the nodes respectively in advance. In addition, a new label that derives from an upper label is added. For example, three labels are assigned to the node 4001 on the third layer from the top. More specifically, the three labels are the label "A4" assigned to this node in advance, as well as a label "A1LL" which derives from the upper label "A1" and a label "A2L" which also derives from an upper label "A2". Further, the number of encryption keys assigned to a node is equal to the number of the labels assigned to the node. For example, three encryption keys, namely, "A1LLM", "A2LM", and "A4M" are assigned to the node 4001.

Here, the following describes the relationship between an encryption key "Li, j" in correspondence with a subset difference "Si, j" and encryption keys assigned to the nodes. When a node Vi and a node Vj are given, the encryption key "Li, j" in correspondence with the subset difference "Si, j" is an encryption key in correspondence with a label added to the node Vj, among the labels deriving from a label assigned to the node Vi. In the example shown in FIG. 44, if the label of the node Vi is A1, and the label of the Vj is A4, the encryption key "Li, j" is "A1LLM".

Next, explanation is provided on decryption keys to be assigned to the apparatuses. Here, a plurality of labels assigned to a node are assigned to an apparatus. Each apparatus generates, within the apparatus itself, a decryption key from corresponding labels, using the pseudo random number generator G. Further, explanation is provided on an example of secret key encryption in which an encryption key is identical to a decryption key.

Specifically, the attention is focused on a node being subordinate to a node positioned on a path between a leaf to which an apparatus is assigned and the root so that the labels that are assigned to the node and derive from another node positioned above the node are to be assigned to the apparatus.

For example, the labels to be assigned to the apparatus 1 shown in FIG. 44 are six labels, namely, "A1LLR", "A2LR", "A4R", "A1LR", "A2R", and "A1R". It should be noted that since the labels "A3", "A5", and "A7" are assigned to corresponding nodes respectively in advance, these labels are not assigned to the apparatus 1.

The total number of the labels to be assigned to each apparatus can be expressed as 0.5(log$_2$ t)^2+0.5 log$_2$ t, where the total number of the apparatuses is t. The calculation is based on the following: the number of the labels to be assigned to an apparatus is one from the second layer, two from the third layer, . . . and log$_2$ t from the lowermost layer. Consequently, the total number of the labels is 1+2+ . . . +log$_2$ t=0.5(log$_2$ t)^2+0.5 log$_2$ t. For example, in the case where the total number of the apparatuses is eight, the number of the labels to be assigned to each apparatus is six.

The following describes an example in which some apparatuses are actually revoked, with reference to FIG. 44.

In an initial state where none of the apparatuses are revoked, a content key is encrypted using the keys "A1LM" and "A1RM" that are in correspondence with the label 3002 "A1L" and the label 3003 "A2R". Each of all the apparatuses owns either the label 3002 "A1L" or the label 3003 "A1R", and is able to generate a decryption key either "A1LM" or "A1RM" from the owned label. Accordingly, each apparatus is able to decrypt a content key with the generated decryption key and is further able to decrypt a content using the decrypted content key.

In the case where the apparatus 1 is hacked and all the keys owned by the apparatus 1 have been disclosed, the label 3001 "A1" and the label 3004 "A1LLL" are specified, and the smaller tree structure (leaf) T3001 having the label 3004 "A1LLL" is taken out from the larger tree structure T3000 whose root is the label 3001 "A1". The content key is encrypted using the encryption key "A1LLLM" which is in correspondence with the label 3004 "A1LLL". With this arrangement, since the pseudo random generator G is a one-way function, the apparatus 1 is not able to generate a decryption key "ALLLM" from any label stored within the apparatus 1, and is therefore not able to decrypt the content key. Each of apparatuses other than the apparatus 1 either stores therein the label 3004 "A1LLL" or is able to generate the label 3004 "A1LLL" from a label stored in the apparatus, using a pseudo random generator. In other words, each of apparatuses other than the apparatus 1 is able to generate a decryption key "A1LLLM" For example, the apparatus 2 stores therein the label 3004 "A1LLL" and is therefore able to generate the decryption key "A1LLLM" from the stored label 3004 "A1LLL". Each of the two leaves (not shown in the drawing; for example the apparatuses 3 and 4) being subordinate to the node that is in correspondence with the label 3006 "A5" stores therein the label 3005 "A1LL". In other words, each of the apparatuses 3 and 4 is able to generate the decryption key "A1LLLM" from the stored label 3005 "A1LL". Each of the leaves i.e. the grandchild nodes (not shown in the drawing; for example, the apparatuses 5, 6, 7, and 8) being subordinate to the node that is in correspondence with the label "A3" stores therein the label 3002 "A1L". In other words, each of the apparatuses 5 to 8 is able to generate the decryption key "A1LLLM" from the stored label 3002 "A1L".

As explained above, the system disclosed in the Non-Patent Document 1 realizes key revocation.

Patent Document 1: The Japanese Unexamined Patent Application Publication No. 2002-281013

Non-Patent Document 1: D. Naor, M. Naor, and J. Lotspiech, "Revocation and Tracing schemes for Stateless Receivers", Proceedings of CRYPTO 2001, LNCS2139, pp. 41-62, 2001.

DISCLOSURE OF THE INVENTION

Problem to be Solved by the Invention

According to the conventional key revocation technique disclosed in the Non-Patent Document 1, however, sub-trees whose roots are nodes including the leaves are independent of each other. The reason is because a label is assigned to each of the roots of the sub-trees, and the assigned labels are independent of each other. Thus, it is possible to generate a label assigned within a sub-tree using a label assigned to the sub-tree, but it is impossible to generate a label assigned to a sub-tree using a label assigned to a different sub-tree. Accordingly, with the use of the conventional technique, when the number of apparatuses to be managed increases, the number of sub-trees to be managed increases, too. To be more specific, the problem is that the number of the labels that cannot be generated from another label and are to be assigned in advance to a root of a sub-tree becomes large.

In order to solve the problem with the conventional technique, the prevent invention aims to provide a management apparatus, a terminal apparatus, a copyright protection system, a recording medium, an association method, an association program, and a program recording medium, with which it is possible to reduce the number of the pieces of unique information that are among a plurality of pieces of unique information to be bases of keys to be assigned to the apparatuses to be managed and cannot be generated from another piece of unique information.

Means for Solving the Problem

In order to solve the aforementioned problem, the present invention provides a management apparatus that manages a plurality of terminal apparatuses by arranging apparatus identifiers for identifying the plurality of terminal apparatuses to be leaves of a tree structure and assigning pieces of unique information to the apparatus identifiers respectively, the pieces of unique information being bases of decryption keys for decrypting a piece of encrypted data, the management apparatus comprising: a subset generating unit operable to calculate and generate, for each of nodes in layers except for the leaves of the tree structure, a subset being made up of one or more apparatus identifiers positioned subordinate to the node; a first association unit operable to search for a subset that wholly contains another subset positioned in a lowermost layer other than a leaf layer from an immediately upper layer, and to associate the subsets with each other; a second association unit operable to search for another subset that wholly contains the containing subset being an association destination from a same layer or an immediately upper layer and to associate the subsets with each other; a first control unit operable to control the second association unit so that processing thereof is repeatedly performed up to an uppermost layer; a second control unit operable to control the first association unit, the second association unit, and the first control unit so that processings thereof are repeatedly performed on all subsets in the lowermost layer; a first assignment unit operable to bring pieces of unique information into correspondence with the subsets in the lowermost layer respectively and to assign each piece of unique information to apparatus identifiers contained in the corresponding subset in the lowermost layer; and a second assignment unit operable to bring pieces of derivative unique information into correspondence respectively with subsets each of which extends over two or more layers as a result of the associating and to assign each piece of derivative unique information to apparatus identifiers contained in the corresponding extending subset, the pieces of derivative unique information being derivatively obtained from the pieces of unique information.

Effects of the Invention

According to the arrangement presented as a Means for solving the Problem, the management apparatus is able to associate subsets with one another from the subsets in the lowermost layer to the subsets in the uppermost layer, using the first association unit, the second association unit, the first control unit, and the second control unit. Further, the management apparatus is able to, with the use of the second assignment unit, bring a piece of derivative information that is obtained derivatively from a piece of unique information that corresponds to a subset in the lowermost layer into correspondence with a subset that extends over layers as a result of the associating. A conventional management apparatus has to prepare in advance pieces of unique information that are not related to one another for subsets each of which has a smallest number of elements in a layer. According to the present invention, however, the management apparatus has to prepare pieces of unique information that are mutually different for only the subsets in the lowermost layer. In other words, the management apparatus is able to reduce the number of pieces of unique information to be prepared in advance that cannot be generated from another piece of unique information.

It is acceptable to have an arrangement wherein the subset that is searched for by the first association unit and wholly contains said another subset in the lowermost layer is made up of a smallest number of elements, and the first association unit associates said another subset being a parent node with the searched subset being a child node, the subset that is searched for by the second association unit and wholly contains the containing subset being the association destination is made up of a smallest number of elements, and the second association unit associates the association destination subset being a parent node with the searched subset being a child node, and the first control unit controls the second association unit so that processing thereof is performed repeatedly up to the uppermost layer and generates subset trees whose roots are the subsets in the lowermost layer.

With this arrangement, the management apparatus is able to generate subset trees of each of which the root is a subset in the lowermost layer. Thus, the management apparatus is able to manage association among subsets using a tree structure.

It is also acceptable to have an arrangement wherein the first association unit controls the second association unit so that processings thereof are repeatedly performed up to the uppermost layer, using one or more subsets obtained by excluding one or more subsets having been associated from subsets positioned in upper layers of the lowermost layer and generates subset trees whose roots are the subsets in the lowermost layer.

With this arrangement, the management apparatus is able to generate subset trees of each of which the root is a subset in the lowermost layer, using only once the subsets generated by the subset generation unit.

Further, it is acceptable to have an arrangement wherein the second assignment unit generates the pieces of derivative unique information from the pieces of unique information, using a one-way function and brings the generated pieces of derivative unique information into correspondence with the extending subsets.

With this arrangement, the management apparatus is able to generate a piece of unique information to be brought into correspondence with a subset that extends over layers due to the associating, from a piece of unique information that is in correspondence with a subset in the lowermost layer, using the one-way function.

Here, it is acceptable that the management apparatus further comprises: a unique information obtaining unit operable to obtain, in a case where a subset in which an identifier of a terminal apparatus being a distribution destination of a piece of unique information appears as an element for a first time exists on one or more paths from the roots to one or more leaves of the subset trees, one or more pieces of unique information being in correspondence with such a subset; and a distributing unit operable to distribute, to the terminal apparatus being the distribution destination, one or more groups each being made up of a different one of the obtained pieces of unique information and set identification information that identifies the subset that is in correspondence with the piece of unique information.

With this arrangement, the management apparatus is able to distribute, to the terminal apparatus being the distribution destination, one or more groups each being made up of a piece of unique information and a piece of set identification information corresponding to the piece of unique information. Thus, it is possible to reduce the number of pieces of unique information to be distributed to the terminal apparatuses from the number in a conventional case. Conventionally, subsets are associated with one another in each of the layers and pieces of unique information to be distributed are obtained for each of the layers; however, according to the present invention, there is no need to distribute a piece of unique information being in correspondence with a subset that exists in an upper layer than another subset to which the piece of unique information to be distributed corresponds and that extends over layers due to the associating. The reason is because it is possible to derivatively calculate a piece of unique information assigned to each of apparatus identifiers contained in the subset that is positioned in the upper layer and extends over layers, from the piece of unique information to be distributed. Accordingly, the management apparatus is able to reduce the number of pieces of unique information to be distributed to the terminal apparatus being the distribution destination. In other words, the management apparatus is able to reduce the number of keys to be assigned to each terminal apparatus.

Further, it is acceptable to have an arrangement wherein the unique information obtaining unit includes: a first obtaining unit operable to search for the subset in which the identifier of the terminal apparatus being the distribution destination appears as an element for the first time in the one or more paths from the roots to the one or more leaves of the subset trees and, in the case where such a subset has been detected and has not been obtained, to obtain the detected subset; a second obtaining unit operable to obtain the one or more pieces of unique information that are in correspondence with the subset obtained by the first obtaining unit; and a repetition controlling unit operable to control the first and second obtaining units so that processings thereof are repeatedly performed until all of the one or more paths are searched.

With this arrangement, the management apparatus is able to obtain one or more pieces of unique information to be distributed to the terminal apparatus being the distribution destination, from the subset tree, with the use of the repetition control unit.

Further, it is acceptable that the management apparatus further comprises: a first storing unit having an area for storing subsets being constituent elements of the subset trees and pieces of unique information that are respectively in correspondence with the subsets; a second storing unit having an area for storing a plurality of nodes constituting the subset trees and child nodes of the plurality of nodes; a first writing unit operable to write the subsets and the pieces of unique information into the first storing unit, while the subsets are brought into correspondence with the pieces unique information; and a second writing unit operable to write the plurality of nodes and the child nodes of the plurality of nodes into the second storing unit, while the nodes are brought into correspondence with the child nodes.

With this arrangement, the management apparatus is able to store therein subsets and corresponding pieces of unique information while bringing them into correspondence with each other. In addition, the management apparatus is able to store therein a plurality of nodes constituting the subset tree and the child nodes of these nodes while bringing them into correspondence with each other.

Here, it is acceptable to have an arrangement wherein the first storing unit has a first table storing therein a plurality of groups each being made up of a different one of the subsets and the corresponding piece of unique information, the second storing unit has a second table storing therein a plurality of groups each being made up of a different one of the nodes and the corresponding child node, the first writing unit writes the groups made up of the subsets and the corresponding pieces of unique information into the first table, and the second writing unit writes the groups made up of the nodes and the child nodes into the second storing unit.

With this arrangement, the management apparatus is able to store therein subsets and corresponding pieces of unique information while bringing them into correspondence with each other, using the first table. Further, the management apparatus is able to store therein the plurality of nodes constituting a subset tree and the child nodes of these nodes, while bringing them into correspondence with each other, using the second table.

Further, it is acceptable to have an arrangement wherein the second control unit generates a plurality of subset trees by controlling the first association unit, the second association unit, and the first control unit so that the processings thereof are repeatedly performed on all the subsets in the lowermost layer, the first storing unit stores therein subsets contained in the plurality of subset trees and pieces of unique information that are in correspondence with the contained subsets, and the management apparatus further comprises: a revoked identifier storing unit having an area for storing one or more revoked identifiers indicating one or more revoked terminal apparatuses out of the plurality of terminal apparatuses; an encryption key generating unit operable to obtain one or more of the subsets from the first storing unit based on what is stored in the revoked identifier storing unit, to obtain one or more encryption keys based on pieces of unique information that are respectively in correspondence with the obtained subsets, to encrypt a media key used for utilization of a content with the obtained encryption keys individually, so as to generate encrypted media keys that are equal in number to the one or more encryption keys; and a third writing unit operable to write, onto a recording medium mounted on the management apparatus, one or more groups each being made up of a different one of the encrypted media keys and a piece of reference identification information for identifying a subset used for obtaining the encryption key for the encrypted media key.

With this arrangement, the management apparatus is able to generate one or more encrypted media keys and write, onto a mounted recording medium, one or more groups each being made up of a generated encrypted key and a piece of reference identification information.

Further, it is acceptable that the management apparatus further comprises: a revoked identifier receiving unit operable to receive each revoked identifier and write the received revoked identifier into the revoked identifier storing unit.

With this arrangement, the management apparatus is able to receive a revoked identifier and write the received revoked identifier into the revoked identifier storing unit.

Further, it is acceptable to have an arrangement wherein the encryption keys are each a common key and are identical to the decryption keys, the one-way function is further used for generating common keys based on the pieces of unique information from the pieces of unique information, and the encryption key generating unit includes: a subset obtaining unit operable to obtain, from the first storing unit, a subset that contains a largest number of one or more unrevoked identifiers which are other than the revoked identifiers stored in the revoked identifier storing unit; a control unit operable to control the subset obtaining unit so that processing thereof is repeatedly performed until each of all the unrevoked identifiers belongs to any one of the one or more subsets obtained by the subset obtaining unit; a common key obtaining unit operable to obtain, using the one-way function, one or more common keys generated from the pieces of unique information that are respectively in correspondence with the subsets obtained by the subset obtaining unit; and an encrypting unit operable to generate encrypted media keys that are equal in number to the common keys, using the common keys obtained by the common key obtaining unit.

With this arrangement, the management apparatus is able to generate a common key being an encryption key from a piece of unique information that is in correspondence with a subset made up of unrevoked identifiers, using a one-way function and to generate an encrypted media key using the generated common key.

Further, it is acceptable to have an arrangement wherein each piece of reference identification information is a corresponding subset used for obtaining a corresponding common key for the encrypted media key, the third writing unit writes, onto the recording medium, one or more groups each being made up of a different one of the encrypted media keys and the corresponding subset used for obtaining the corresponding common key for the encrypted media key, the distributing unit distributes, to the terminal apparatus being the distribution destination, one or more groups each being made up of a different one of the obtained pieces of unique information and a piece of set identification information that is one of the subsets with which the piece of unique information is in correspondence, and the distributing unit further distributes a data structure indicating the subset trees.

With this arrangement, the management apparatus is able to use a subset that is used in the obtainment of the encryption key as the piece of reference identification information and to use a subset that is in correspondence with the distributed piece of unique information as the piece of set identification information to be distributed to the terminal apparatus. Further, the management apparatus is able to distribute a data structure indicating each subset tree to the terminal apparatus.

Further, it is acceptable that the management apparatus further comprises: a path information obtaining unit operable to obtain a piece of path information including (i) a generation path indicating, for each subset, a path that extends from a root subset being a root of a subset tree to which the subset belongs and reaches the subset, and (ii) a root identifier indicating the root subset, wherein the reference identification information is a piece of path information for the subset used for obtaining the encryption key for the encrypted media key, the third writing unit writes, onto the recording medium, one or more groups each being made up of a different one of the encrypted media keys and a piece of path information for the subset used for obtaining the encryption key for the encrypted media key, and the distributing unit distributes, to the terminal apparatus being the distribution destination, one or more groups each being made up of a different one of the obtained pieces of unique information and a piece of set identification information that is a piece of path information for the subset with which the obtained piece of unique information is in correspondence.

With this arrangement, the management apparatus is able to use the piece of path information of the subset used in the obtainment of the encryption key as the piece of reference identification information and to use the piece of path information of the subset that is in correspondence with the distributed piece of unique information as the piece of set identification information to be distributed to the terminal apparatus.

The present invention further provides a terminal apparatus to which a piece of unique information being a base of a decryption key for decrypting a piece of encrypted data is assigned by a management apparatus that manages, with use of a tree structure, a plurality of apparatus identifiers identifying a plurality of terminal apparatuses, wherein the management apparatus (i) calculates and generates, for each of nodes in layers except for leaves of the tree structure, a subset being made up of one or more apparatus identifiers positioned subordinate to the node, (ii) searches for a subset that wholly contains another subset positioned in a lowermost layer other than a leaf layer from an immediately upper layer and associates the subsets with each other, (iii) searches for a subset that wholly contains the containing subset from a same layer or an immediately upper layer and associates the subsets with each other, (iv) controls a second association unit so that the associating is repeatedly performed up to an uppermost layer, (v) performs control so that these processings are repeatedly performed on all subsets in the lowermost layer, (vi) brings pieces of unique information into correspondence with the subsets in the lowermost layer and assigns each piece of unique information to apparatus identifiers contained in the corresponding subset in the lowermost layer, and (vii) brings pieces of derivative unique information into correspondence respectively with subsets each of which extends over two or more layers as a result of the associating and assigns each piece of derivative unique information to apparatus identifiers contained in the corresponding extending subset, the pieces of derivative unique information being derivatively obtained from the pieces of unique information, and the terminal apparatus includes a unique information storing unit storing therein a piece of unique information that contains an apparatus identifier of the terminal apparatus, out of the pieces of unique information that have been distributed from the management apparatus in advance and are brought into correspondence with the subsets.

With this arrangement, the terminal apparatus is able to store therein pieces of unique information. A conventional management apparatus associates subsets with one another in each of the layers, brings a piece of unique information into correspondence with a subset that has the smallest number of elements in each layer, and brings a piece of derivative unique information into correspondence with a subset that extends over layers due to the associating, the piece of derivative unique information being derivatively obtained from the piece of unique information assigned with the subset having the smallest number of elements. Accordingly, a conventional terminal apparatus needs to store therein a piece of unique information that is in correspondence with a subset that contains the apparatus identifier of the terminal apparatus for each collective of subsets that are associated with one another in each layer. According to the present invention, however, since the management apparatus associates layers with one another, the management apparatus does not have to store therein any piece of unique information that can be derivatively calculated from a piece of unique information in correspondence with a subset that contains the terminal identifier of the terminal apparatus; in other words, the management apparatus does not have to store therein any piece of unique information that is in correspondence with a subset in the upper layer. Thus, the number of pieces of unique information stored in the terminal apparatus is reduced.

Further, it is acceptable to have an arrangement wherein the unique information storing unit further stores therein a piece of set identification information identifying a subset with which the stored piece of unique information is in correspondence, and the terminal apparatus further includes: a judging unit operable to judge whether the piece of set identification information indicates that the terminal apparatus is an unrevoked apparatus; a first obtaining unit operable to, in a case where a judgment result of the judgment unit is in the affirmative, obtain an encrypted media key that (i) is obtained by encrypting a media key with an encryption key based on a specific piece of unique information out of the pieces of unique information in correspondence with the subsets generated by the management apparatus and (ii) is in correspondence with a piece of key related information related to the encryption key; a second obtaining unit operable to obtain a decryption key that is in correspondence with the encryption key using the piece of unique information stored in the unique information storing unit; and a decrypting unit operable to decrypt the encrypted media key obtained by the first obtaining unit, using the decryption key obtained by the second obtaining unit, so as to generate the media key.

With this arrangement, in the case where a terminal apparatus is an unrevoked apparatus, the terminal apparatus is able to obtain an encrypted media key and a decryption key and to generate a media key by decrypting the encrypted media key with the obtained decryption key.

It is further acceptable to have an arrangement wherein the specific piece of unique information is a piece of reference unique information that is in correspondence with a subset that contains, at a time when the encrypted media key is generated, one or more identifiers of one or more unrevoked apparatuses, the encryption key is a common key, the piece of key related information is a piece of reference identification information that identifies the subset with which the piece of reference unique information is in correspondence, the encrypted media key is in correspondence with the piece of reference identification information, the judgment unit judges that the piece of set identification information indicates that the terminal apparatus is an unrevoked apparatus, in a case where a path exists that extends from the subset identified by the piece of set identification information stored in the unique information storing unit and reaches the subset identified by the piece of reference identification information, the first obtaining unit obtains the encrypted media key that is encrypted by an encryption key based on the piece of reference unique information in correspondence with the piece of reference identification information, the second obtaining unit obtains the decryption key and takes the obtained decryption key as the common key, and the decrypting unit decrypts the encrypted media key, using the obtained common key.

With this arrangement, the terminal apparatus is able to, in the case where there exists a path that extends from a subset indicated by the piece of set identification information and reaches a subset identified by the piece of reference identification information, judge that the piece of set identification information indicates that the terminal apparatus is an unrevoked apparatus.

Further, it is acceptable to have an arrangement wherein the management apparatus (i) searches for a subset that wholly contains said another subset in the lowermost layer and is made up of a smallest number of elements and associates said another subset being a parent node with the searched subset being a child node, (ii) further searches for a subset that wholly contains the containing subset being an association destination, is made up of a smallest number of elements, and has not been associated yet, and associates the association destination subset being a parent node with the further searched subset being a child node, so as to generate subset trees whose roots are the subsets in the lowermost layer, the unique information storing unit further stores therein a data structure for constituting the subset trees generated by the management apparatus, and the judgment unit judges, using the subset trees constituted with the data structure, whether or not a path exists that extends from the subset that is in correspondence with the piece of unique information stored in the unique information storing unit and reaches the subset identified by the piece of reference identification information.

With this arrangement, the terminal apparatus is able to judge, with the use of the data structure for constituting the subset tree, whether or not there exists a path that extends from a subset indicated by the piece of set identification information and reaches a subset identified by a piece of reference identification information.

Here, it is acceptable to have an arrangement wherein the management apparatus (i) searches for a subset that wholly contains said another subset in the lowermost layer and is made up of a smallest number of elements and associates said another subset being a parent node with the searched subset being a child node, (ii) further searches for a subset that wholly contains the containing subset being an association destination, is made up of a smallest number of elements, and has not been associated yet, and associates the association destination subset being a parent node with the further searched subset being a child node, so as to generate subset trees whose roots are the subsets in the lowermost layer, the piece of reference identification information includes a first generation path that extends from a root of one of the subset trees and reaches a reference subset with which the piece of reference unique information is in correspondence, the piece of set identification information includes a second generation path that extends from the root of the one of the subset trees and reaches a subset with which the piece of unique information is in correspondence, and the judgment unit judges, in a case where the second generation path is contained in the first generation path, that a path exists that extends from the subset identified by the piece of set identification information and reaches the subset identified by the piece of reference identification information.

With this arrangement, the terminal apparatus is able to judge whether or not the piece of set identification information stored in the terminal apparatus indicates the terminal apparatus is an unrevoked apparatus, using the first generation path included in the piece of reference identification information and each of the second generation paths included in the pieces of set identification information.

Further, it is acceptable to have an arrangement wherein the management apparatus (i) inputs a piece of unique information that is in correspondence with a subset to a one-way function so as to generate a common key based on the piece of unique information and generate a piece of derivative unique information deriving from the piece of unique information, (ii) brings the generated piece of derivative unique information into correspondence with a subset that is associated with the subset with which the inputted piece of unique information is in correspondence, and (iii) assigns the generated piece of derivative unique information to apparatus identifiers included in the associated subset, the second obtaining unit includes: a device key obtaining unit operable to generate and obtain a device key based on the piece of unique information and the piece of derivative unique information from the piece of unique information stored in the unique information storing unit, using a function identical to the one-way function; a repetition unit operable to control the device key obtaining unit so that processing thereof is repeatedly performed using each piece of unique information obtained by the device key obtaining unit as a next input to the identical function, until a device key based on the piece of reference unique information is obtained; and a decryption key obtaining unit operable to obtain, as the common key, the device key based on the piece of reference unique information obtained by the device key obtaining unit.

With this arrangement, the terminal apparatus is able to obtain, as a common key, a device key that is in correspondence with the piece of reference unique information, from the piece of unique information stored in the unique information storing unit, using a function that is identical to the one-way function which the management apparatus has.

Further, it is acceptable that the terminal apparatus further comprises a content obtaining unit operable to obtain a content; a content key obtaining unit operable to obtain a content key; a first encrypting unit operable to encrypt the content key obtained by the content key obtaining unit, using the media key obtained by the decrypting unit so as to generate an encrypted content key; a second encrypting unit operable to encrypt the content obtained by the content obtaining unit, using the content key obtained by the content key obtaining unit so as to generate an encrypted content; and a writing unit operable to write the encrypted content key and the encrypted content into a recording medium.

With this arrangement, the terminal apparatus is able to generate an encrypted content key by encrypting a content key with the obtained common key, generate an encrypted content by encrypting a content with a content key, and write the generated encrypted content key and encrypted content onto a recording medium. Thus, the terminal apparatus is able to generate, in the case where the terminal apparatus has been judged to be an unrevoked apparatus, the encrypted content key and the encrypted content, and the copyright of the content is thereby protected.

Further, it is acceptable to have an arrangement wherein the writing unit writes the encrypted content key and the encrypted content into the recording medium which is included in an apparatus located in a network, via a communication medium.

With this arrangement, the terminal apparatus is able to write the generated encrypted content key and encrypted content onto a recording medium via a communication medium.

Further, it is acceptable that the terminal apparatus further comprises: an encrypted content key obtaining unit operable to obtain an encrypted content key which is obtained by encrypting a content key with the media key; an encrypted content obtaining unit operable to obtain an encrypted content which is obtained by encrypting a content with the content key; a first decrypting unit operable to decrypt the encrypted content key obtained by the encrypted content key obtaining unit, using the media key so as to generate the content key; a second decrypting unit operable to decrypt the encrypted content obtained by the encrypted content obtaining unit, using the content key so as to generate the content; and a playback unit operable to play back the content generated by the second decrypting unit.

With this arrangement, the terminal apparatus is able to generate a content key by decrypting the encrypted content key with the obtained common key, generate a content by decrypting the encrypted content with the generated content key, and play back the generated content. Accordingly, the terminal apparatus is able to, in the case where the terminal apparatus has been judged to be an unrevoked apparatus, generate the content from the encrypted content and play back the generated content, and the copyright of the content is thereby protected.

Further, it is acceptable to have an arrangement wherein the encrypted content key and the encrypted content are recorded on a recording medium, which is mounted on the terminal apparatus, the encrypted content key obtaining unit obtains the encrypted content key from the recording medium, and the encrypted content obtaining unit obtains the content from the recording medium.

With this arrangement, the terminal apparatus is able to obtain the encrypted content key and the encrypted content from the recording medium mounted on the terminal apparatus and to generate a content.

Further, it is acceptable to have an arrangement wherein the encrypted content obtaining unit obtains the encrypted content key via a communication medium, and the encrypted content obtaining unit obtains the content via a communication medium.

With this arrangement, the terminal apparatus is able to obtain the encrypted content key and the encrypted content via a communication medium and to generate a content.

The present invention further provides a copyright protection system comprising a plurality of terminal apparatuses and a management apparatus that manages the plurality of terminal apparatuses by arranging apparatus identifiers for identifying the plurality of terminal apparatuses to be leaves of a tree structure and assigning pieces of unique information to be bases of decryption keys for decrypting a piece of encrypted data to the apparatus identifiers respectively, wherein the management apparatus includes: a subset generating unit operable to calculate and generate, for each of nodes in layers except for the leaves of the tree structure, a subset being made up of one or more apparatus identifiers positioned subordinate to the node; a first association unit operable to search for a subset that wholly contains another subset positioned in a lowermost layer other than a leaf layer from an immediately upper layer, and to associate the subsets with each other; a second association unit operable to search for another subset that wholly contains the containing subset being an association destination from a same layer or an immediately upper layer and to associate the subsets with each other; a first control unit operable to control the second association unit so that processing thereof is repeatedly performed up to an uppermost layer; a second control unit operable to control the first association unit, the second association unit, and the first control unit so that processings thereof are repeatedly performed on all subsets in the lowermost layer; a first assignment unit operable to bring pieces of unique information into correspondence with the subsets in the lowermost layer respectively and to assign each piece of unique information to apparatus identifiers contained in the respective subset in the lowermost layer; and a second assignment unit operable to bring pieces of derivative unique information into correspondence respectively with subsets each of which extends over two or more layers as a result of the associating and to assign each piece of derivative unique information to apparatus identifiers contained in the corresponding extending subset, the pieces of derivative unique information being derivatively obtained from the pieces of unique information.

With this arrangement, the management apparatus in the copyright protection system is able to associate subsets with one another from the subsets in the lowermost layer to the subsets in the uppermost layer, using the first association unit, the second association unit, the first control unit, and the second control unit. Further, the management apparatus is able to, with the use of the second assignment unit, bring a piece of derivative information that is obtained derivatively from a piece of unique information that corresponds to a subset in the lowermost layer into correspondence with a subset that extends over layers as a result of the associating. A conventional management apparatus has to prepare in advance pieces of unique information that are not related to one another for subsets each of which has a smallest number of elements in a layer. According to the present invention, however, the management apparatus has to prepare pieces of unique information that are mutually different for only the subsets in the lowermost layer. In other words, the management apparatus is able to reduce the number of pieces of unique information to be prepared in advance that cannot be generated from another piece of unique information.

Further, it is acceptable to have an arrangement wherein the subset that is searched for by the first association unit and wholly contains said another subset in the lowermost layer is made up of a smallest number of elements, and the first association unit associates said another subset being a parent node with the searched subset being a child node, the subset that is searched for by the second association unit and wholly contains the containing subset being the association destination is made up of a smallest number of elements, and the second association unit associates the association destination subset being a parent node with the searched subset being a child node, and the first control unit controls the second association unit so that processing thereof is performed repeatedly up to the uppermost layer and generates subset trees whose roots are the subsets in the lowermost layer.

With this arrangement, the management apparatus in the copyright protection system is able to generate subset trees of each of which the root is a subset in the lowermost layer. Thus, the management apparatus is able to manage association among subsets using a tree structure.

Further, it is acceptable to have an arrangement wherein the first association unit controls the second association unit so that processings thereof are repeatedly performed up to the uppermost layer, using one or more subsets obtained by excluding one or more subsets having been associated from subsets positioned in upper layers of the lowermost layer and generates subset trees whose roots are the subsets in the lowermost layer.

With this arrangement, the management apparatus in the copyright protection system is able to generate subset trees of each of which the root is a subset in the lowermost layer, using only once the subsets generated by the subset generation unit.

Further, it is acceptable to have an arrangement wherein the second assignment unit generates the pieces of derivative unique information from the pieces of unique information, using a one-way function and brings the generated pieces of derivative unique information into correspondence with the extending subsets.

With this arrangement, the management apparatus in the copyright protection system is able to generate a piece of unique information to be brought into correspondence with a subset that extends over layers due to the associating, from a piece of unique information that is in correspondence with a subset in the lowermost layer, using the one-way function.

Further, it is acceptable that the copyright protection system further comprises: a unique information obtaining unit operable to obtain, in a case where a subset in which an identifier of a terminal apparatus being a distribution destination of a piece of unique information appears as an element for a first time exists on one or more paths from the roots to one or more leaves of the subset trees, one or more pieces of unique information being in correspondence with such a subset; and a distributing unit operable to distribute, to the terminal apparatus being the distribution destination, one or more groups each being made up of a different one of the obtained pieces of unique information and set identification information that identifies the subset that is in correspondence with the piece of unique information.

With this arrangement, the management apparatus in the copyright protection system is able to distribute, to the terminal apparatus being the distribution destination, one or more groups each being made up of a piece of unique information and a piece of set identification information corresponding to the piece of unique information. Thus, it is possible to reduce the number of pieces of unique information to be distributed to the terminal apparatuses from the number in a conventional case. Conventionally, subsets are associated with one another in each of the layers and pieces of unique information to be distributed are obtained for each of the layers; however, according to the present invention, there is no need to distribute a piece of unique information being in correspondence with a subset that exists in an upper layer than another subset to which the piece of unique information to be distributed corresponds and that extends over layers due to the associating. The reason is because it is possible to derivatively calculate a piece of unique information assigned to each of apparatus identifiers contained in the subset that is positioned in the upper layer and extends over layers, from the piece of unique information to be distributed. Accordingly, the management apparatus is able to reduce the number of pieces of unique information to be distributed to the terminal apparatus being the distribution destination. In other words, the management apparatus is able to reduce the number of keys to be assigned to each terminal apparatus.

It is further acceptable that the copyright protection system further comprises: a first storing unit having an area for storing subsets being constituent elements of the subset trees and pieces of unique information that are respectively in correspondence with the subsets; a second storing unit having an area for storing a plurality of nodes constituting the subset trees and child nodes of the plurality of nodes; a first writing unit operable to write the subsets and the pieces of unique information into the first storing unit, while the subsets are brought into correspondence with the pieces unique information; and a second writing unit operable to write the plurality of nodes and the child nodes of the plurality of nodes into the second storing unit, while the nodes are brought into correspondence with the child nodes.

With this arrangement, the management apparatus in the copyright protection system is able to store therein subsets and corresponding pieces of unique information while bringing them into correspondence with each other. In addition, the management apparatus is able to store therein a plurality of nodes constituting the subset tree and the child nodes of these nodes while bringing them into correspondence with each other.

Further, it is acceptable to have an arrangement wherein the second control unit generates a plurality of subset trees by controlling the first association unit, the second association unit, and the first control unit so that the processings thereof are repeatedly performed on all the subsets in the lowermost layer, the first storing unit stores therein subsets contained in the plurality of subset trees and pieces of unique information that are in correspondence with the contained subsets, and the management apparatus further comprises: a revoked identifier storing unit having an area for storing one or more revoked identifiers indicating one or more revoked terminal apparatuses out of the plurality of terminal apparatuses; an encryption key generating unit operable to obtain one or more of the subsets from the first storing unit based on what is stored in the revoked identifier storing unit, to obtain one or more encryption keys based on pieces of unique information that are respectively in correspondence with the obtained subsets, to encrypt a media key used for utilization of a content with the obtained encryption keys individually, so as to generate encrypted media keys that are equal in number to the one or more encryption keys; and a third writing unit operable to write, onto a recording medium mounted on the management apparatus, one or more groups each being made up of a different one of the encrypted media keys and a piece of reference identification information for identifying a subset used for obtaining the encryption key for the encrypted media key.

With this arrangement, the management apparatus in the copyright protection system is able to generate one or more encrypted media keys and write, onto a mounted recording medium, one or more groups each being made up of a generated encrypted key and a piece of reference identification information.

It is further acceptable that the copyright protection system further comprises: a revoked identifier receiving unit operable to receive each revoked identifier and write the received revoked identifier into the revoked identifier storing unit.

With this arrangement, the management apparatus in the copyright protection system is able to receive a revoked identifier and write the received revoked identifier into the revoked identifier storing unit.

It is further acceptable to have an arrangement wherein the encryption keys are each a common key and are identical to the decryption keys, the one-way function is further used for generating common keys based on the pieces of unique information from the pieces of unique information, and the encryption key generating unit includes: a subset obtaining unit operable to obtain, from the first storing unit, a subset that contains a largest number of one or more unrevoked identifiers which are other than the revoked identifiers stored in the revoked identifier storing unit; a control unit operable to control the subset obtaining unit so that processing thereof is repeatedly performed until each of all the unrevoked identifiers belongs to any one of the one or more subsets obtained by the subset obtaining unit; a common key obtaining unit operable to obtain, using the one-way function, one or more common keys generated from the pieces of unique information that are respectively in correspondence with the subsets obtained by the subset obtaining unit; and an encrypting unit operable to generate encrypted media keys that are equal in number to the common keys, using the common keys obtained by the common key obtaining unit.

With this arrangement, the management apparatus in the copyright protection system is able to generate a common key being an encryption key from a piece of unique information that is in correspondence with a subset made up of unrevoked identifiers, using a one-way function and to generate an encrypted media key using the generated common key.

Further, it is acceptable to have an arrangement wherein the terminal apparatus comprises: a unique information storing unit storing therein one or more groups each being made up of a piece of unique information distributed from the distributing unit of the management apparatus in advance and a piece of set identification information identifying a subset with which the piece of unique information is in correspondence; a judging unit operable to judge whether the piece of set identification information indicates that the terminal apparatus is an unrevoked apparatus; a first obtaining unit operable to, in a case where a judgment result of the judgment unit is in the affirmative, obtain one encrypted media key from the recording medium; a second obtaining unit operable to obtain a decryption key that is in correspondence with the encryption key, using the piece of unique information stored in the unique information storing unit; and a decrypting unit operable to decrypt the encrypted media key obtained by the first obtaining unit, using the decryption key obtained by the second obtaining unit, so as to generate the media key.

With this arrangement, the terminal apparatus in the copyright protection system is able to store therein pieces of unique information. A conventional management apparatus associates subsets with one another in each of the layers, brings a piece of unique information into correspondence with a subset that has the smallest number of elements in each layer, and brings a piece of derivative unique information into correspondence with a subset that extends over layers due to the associating, the piece of derivative unique information being derivatively obtained from the piece of unique information assigned with the subset having the smallest number of elements. Accordingly, a conventional terminal apparatus needs to store therein a piece of unique information that is in correspondence with a subset that contains the apparatus identifier of the terminal apparatus for each collective of subsets that are associated with one another in each layer. According to the present invention, however, since the management apparatus associates layers with one another, the management apparatus does not have to store therein any piece of unique information that can be derivatively calculated from a piece of unique information in correspondence with a subset that contains the terminal identifier of the terminal apparatus; in other words, the management apparatus does not have to store therein any piece of unique information that is in correspondence with a subset in the upper layer. Thus, the number of pieces of unique information stored in the terminal apparatus is reduced.

In addition, in the case where a terminal apparatus is an unrevoked apparatus, the terminal apparatus is able to obtain an encrypted media key and a decryption key and to generate a media key by decrypting the encrypted media key with the obtained decryption key.

Further, it is acceptable to have an arrangement wherein the encryption key is a common key, the judgment unit judges that the piece of set identification information indicates that the terminal apparatus is an unrevoked apparatus, in a case where a path exists that extends from the subset being stored in the unique information storing unit and being identified by the piece of set identification information stored in the unique information storing unit and reaches the subset identified by the piece of reference identification information, the first obtaining unit obtains an encrypted media key that is in correspondence with the piece of reference identification information, the second obtaining unit obtains the decryption key and takes the obtained decryption key as the common key, and the decrypting unit decrypts the encrypted media key, using the obtained common key.

With this arrangement, the terminal apparatus in the copyright protection system is able to, in the case where there exists a path that extends from a subset indicated by the piece of set identification information and reaches a subset identified by the piece of reference identification information, judge that the piece of set identification information indicates that the terminal apparatus is an unrevoked apparatus.

Further, it is acceptable to have an arrangement wherein the second obtaining unit includes: a device key obtaining unit operable to generate and obtain a device key based on the piece of unique information and the piece of derivative unique information from the piece of unique information stored in the unique information storing unit, using a function identical to the one-way function; a repetition unit operable to control the device key obtaining unit so that processing thereof is repeatedly performed using each piece of unique information obtained by the device key obtaining unit as a next input to the identical function, until a device key based on the piece of reference unique information is obtained; and a decryption key obtaining unit operable to obtain, as the common key, the device key based on the piece of reference unique information obtained by the device key obtaining unit.

With this arrangement, the terminal apparatus in the copyright protection system is able to obtain, as a common key, a device key that is in correspondence with the piece of reference unique information, from the piece of unique information stored in the unique information storing unit, using a function that is identical to the one-way function which the management apparatus has.

The present invention provides a management apparatus that manages a plurality of terminal apparatuses by arranging apparatus identifiers for identifying the plurality of terminal apparatuses to be leaves of a tree structure and assigning pieces of unique information to the apparatus identifiers, the pieces of unique information being bases of decryption keys for decrypting a piece of encrypted data, the management apparatus comprising: a subset generating unit operable to calculate and generate, for each of nodes in layers except for the leaves of the tree structure, a subset being made up of one or more apparatus identifiers positioned subordinate to the node; a group generating unit operable to select, out of subsets positioned in a layer, and put into one group (i) a subset that contains a smallest number of elements and (ii) another subset that contains the subset containing the smallest number of elements; a first control unit operable to control the group generating unit so that processing thereof is repeatedly performed on all subsets each of which is positioned in the layer and contains the smallest number of elements; a second control unit operable to control the group generating unit and the first control unit so that processings thereof are repeatedly performed on all of layers; an integrating unit operable to, after the second control unit performs the processing on all of the layers, integrate into one group (i) a lower-layer group and (ii) an upper-layer group that includes a subset that wholly contains one of subsets belonging to the lower-layer group, the lower-layer group and the upper-layer group belonging to mutually different layers; a first assignment unit operable to, after groups are integrated in all of the layers, bring pieces of unique information into correspondence with subsets each of which has a smallest number of elements in each of remaining groups and assign each piece of unique information to one or more apparatus identifiers contained in the corresponding subset; and a second assignment unit operable to bring pieces of derivative unique information into correspondence with subsets other than the subset that has the smallest number of elements respectively and assigns each piece of derivative unique information to one or more apparatus identifiers that are contained in each of said other subsets, the pieces of derivative unique information being obtained derivatively from the pieces of unique information.

With this arrangement, the management apparatus is able to associate subsets with one another from the subsets in the lowermost layer to the subsets in the uppermost layer, using the integrating unit. Further, the management apparatus is able to, with the use of the second assignment unit, bring a piece of derivative information that is obtained derivatively from a piece of unique information that corresponds to a subset in the lowermost layer into correspondence with a subset that extends over layers as a result of the associating. A conventional management apparatus has to prepare in advance pieces of unique information that are not related to one another for subsets each of which has a smallest number of elements in a layer. According to the present invention, however, the management apparatus has to prepare pieces of unique information that are mutually different for only the subsets in the lowermost layer. In other words, the management apparatus is able to reduce the number of pieces of unique information to be prepared in advance that cannot be generated from another piece of unique information.

BRIEF DESCRIPTION OF THE DRAWINGS

FIG. 4 shows an example of data structure of a tree structure table T101;

FIG. 5 shows an example of data structure of a device key table D100;

FIG. 6 shows an example of data structure of an interrelation table D101;

FIG. 10 shows an example of data structure of a device key table D100a;

FIG. 12 is a table that shows the total number of pieces of key information and the key information to be distributed to apparatuses;

FIG. 40 is a table that shows the total number of pieces of key information and key information to be distributed to apparatuses;

FIG. 41 shows association among sub-trees of which the roots are node E0, node E1, and node E3, respectively in the tree structure T100;

REFERENCE CHARACTERS

10: COPYRIGHT PROTECTION SYSTEM
100: KEY MANAGEMENT APPARATUS
101: APPARATUS INFORMATION STORING UNIT
102: INFORMATION STORING UNIT
103: INFORMATION GENERATING UNIT
104: DISTRIBUTING UNIT
105: REVOKED APPARATUS SPECIFYING UNIT
106: KEY REVOCATION DATA GENERATING UNIT
107: RECEIVING UNIT
108: OUTPUTTING UNIT
200: RECORDING MEDIUM
201: KEY REVOCATION DATA STORING UNIT
202: ENCRYPTED CONTENT KEY STORING UNIT
203: ENCRYPTED CONTENT STORING UNIT
300: RECORDING APPARATUS
301: KEY INFORMATION STORING UNIT
302: CONTENT STORING UNIT
303: CONTENT KEY STORING UNIT
304: DECRYPTION KEY GENERATING UNIT
305: DECRYPTING UNIT
306: FIRST ENCRYPTING UNIT
307: SECOND ENCRYPTING UNIT
308: RECEIVING UNIT
309: INPUTTING AND OUTPUTTING UNIT
400: PLAYBACK APPARATUS
401: KEY INFORMATION STORING UNIT
402: DECRYPTION KEY GENERATING UNIT
403: FIRST DECRYPTING UNIT
404: SECOND DECRYPTING UNIT
405: THIRD DECRYPTING UNIT
406: PLAYBACK UNIT
407: RECEIVING UNIT
408: READING UNIT
420: MONITOR

BEST MODE FOR CARRYING OUT THE INVENTION

1. First Embodiment
1.1 Configuration of Copyright Protection System 10

Figure 1:
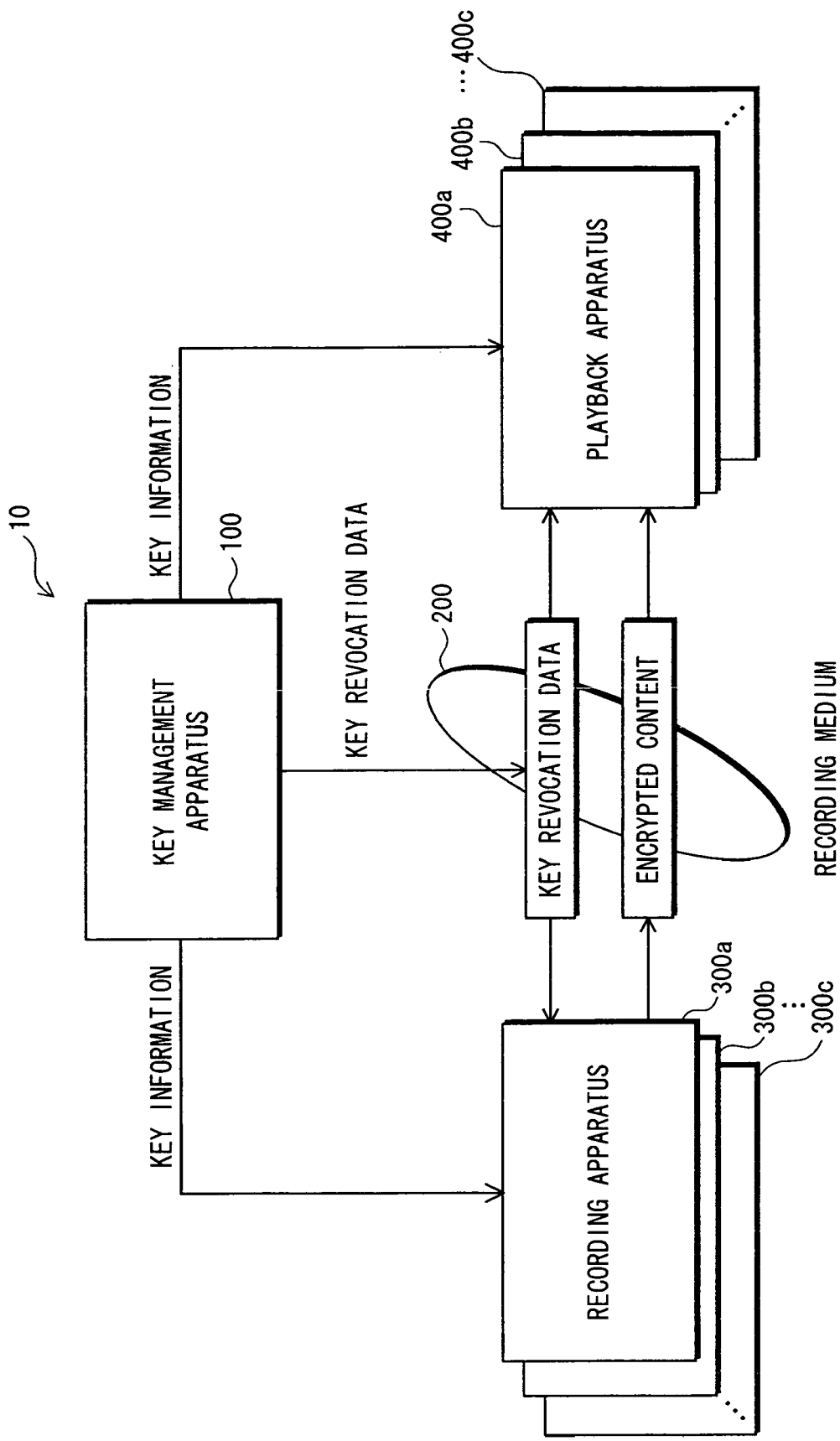
FIG. 1 is a block diagram that shows the overall scheme of a copyright protection system 10.

FIG. 1 shows the configuration of a copyright protection system 10 which is an embodiment of the present invention. The copyright protection system 10 comprises a key management apparatus 100, a recording medium 200, recording apparatuses 300a, 300b, ... and 300c, as well as playback apparatuses 400a, 400b, ... and 400c.

The key management apparatus 100 records a piece of key revocation data onto a recording medium 200 which is a recordable medium such as a DVD-RAM on which no information has been recorded so as to obtain the recording medium 200 having the piece of key revocation data recorded thereon. In order to distinguish a recording medium 200 on which no information has been recorded from a recording medium 200 on which key revocation data has been recorded, in the following description, a recording medium 200 on which no information has been recorded will be referred to as a recording medium 200a, whereas a recording medium 200 on which key revocation data has been recorded will be referred to as a recording medium 200b. A piece of key revocation data includes (i) an encrypted media key obtained by encrypting a media key pre-stored in the key management apparatus 100 and (ii) information made up of a set of apparatus identifiers of unrevoked (valid) apparatuses among the recording apparatuses 300a, 300b, ... and 300c and the playback apparatuses 400a, 400b, ... and 400c. The set made up of the apparatus identifiers of the unrevoked apparatuses is a subset of the set made up of the apparatus identifiers owned by the apparatuses.

The key management apparatus 100 assigns and distributes one or more pieces of key information to each of the recording apparatuses 300a, 300b, ... and 300c, and playback apparatuses 400a, 400b, ... and 400c. A piece of key information includes (i) a label which serves as a base for generation of a device key for decrypting an encrypted media key and (ii) a set of apparatus identifiers owned by the apparatuses to each of which a label has been assigned.

The recording apparatus 300a generates an encrypted content by encrypting a digitalized content and records the generated encrypted content onto a recording medium 200b mounted on the recording apparatus 300a so as to obtain the recording medium 200 having the encrypted content recorded. In the following description, a recording medium 200 on which an encrypted content is recorded will be referred to as a recording medium 200c. In the present example, a content is made up of video information and audio information.

The playback apparatus 400a takes out the encrypted content from the recording medium 200c mounted on the playback apparatus 400a and decrypts the encrypted content so as to obtain the original content.

It should be noted that each of the recording apparatuses 300b, ... and 300c operates in the same manner as the recording apparatus 300a. Each of the playback apparatuses 400b, . . . and 400c operates in the same manner as the recording apparatus 400a.

In the following description, a subset is expressed by listing up all the elements included in the subset. For example, a subset made up of the apparatus identifiers 1, 2, and 3 will be expressed as a subset "123", and a subset made up of the apparatus identifiers 3 and 4 will be expressed as a subset "34".

1.2 Key Management Apparatus 100

Figure 2:
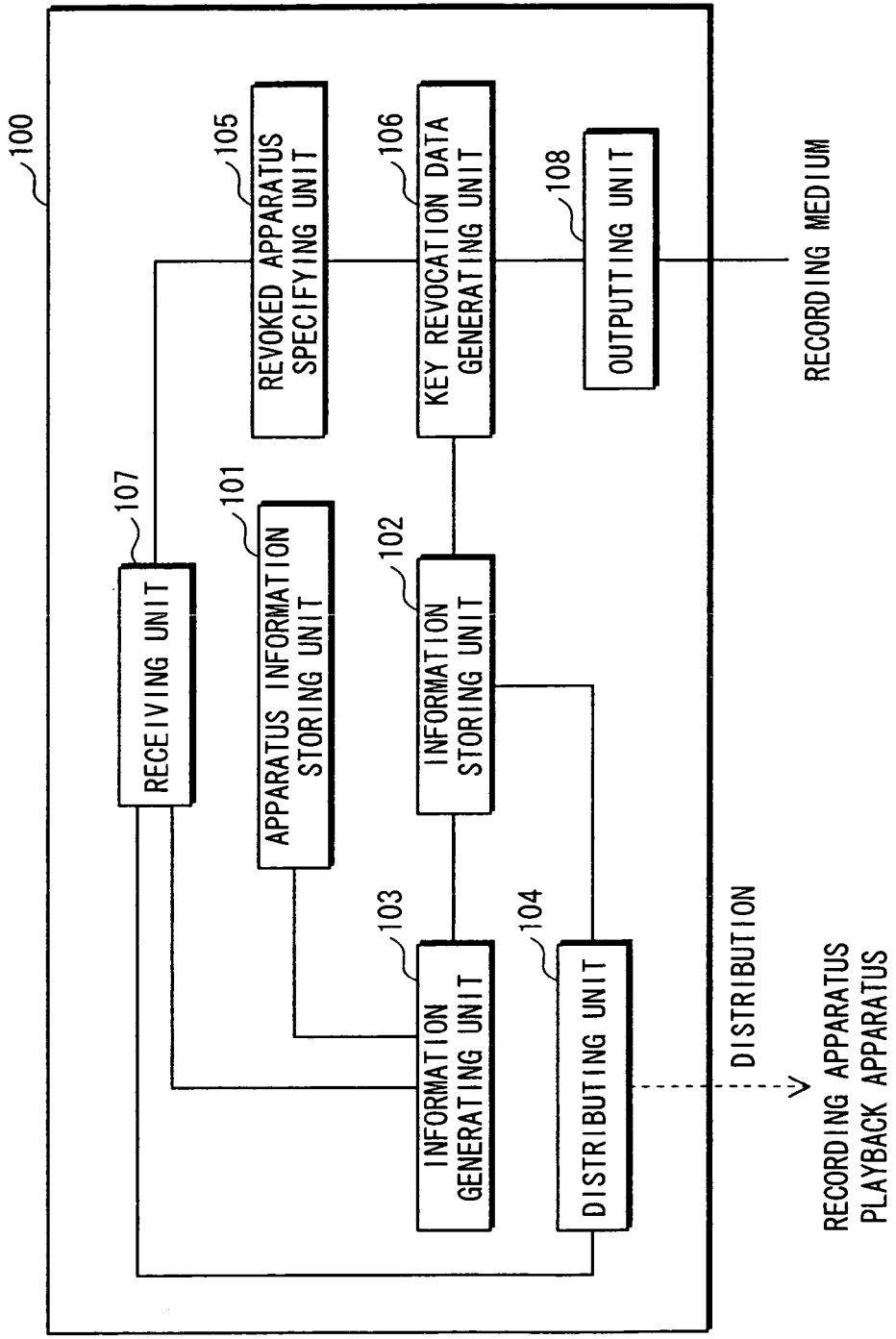
FIG. 2 is a block diagram that shows the configuration of a key management apparatus 100.

The key management apparatus 100 comprises, as shown in FIG. 2, an apparatus information storing unit 101, an information storing unit 102, an information generating unit 103, a distributing unit 104, a revoked apparatus specifying unit 105, a key revocation data generating unit 106, a receiving unit 107 and an outputting unit 108.

The key management apparatus 100 is specifically a computer system comprising a microprocessor, a ROM, a RAM, a hard disk unit, a display unit, a keyboard, a mouse, and the like. A computer program is stored in the RAM or the hard disk unit. The key management apparatus 100 achieves its functions as the microprocessor operates according to the computer program.

(1) Apparatus Information Storing Unit 101

Figure 3:
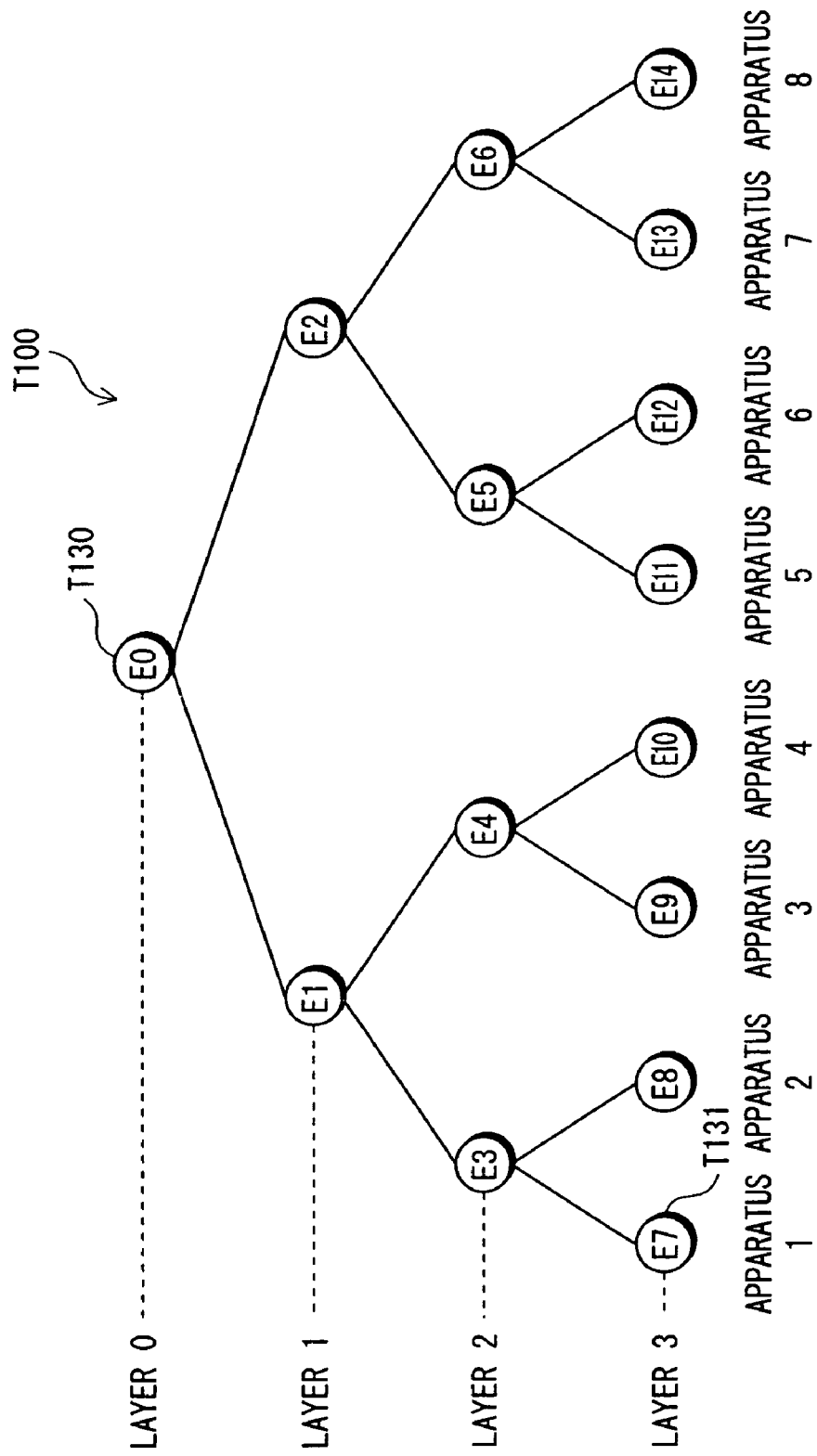
FIG. 3 is a conceptual diagram that shows a tree structure T100.

The apparatus information storing unit 101 is specifically constituted with a hard disk unit. In order to manage apparatus identifiers to identify the recording apparatuses and the playback apparatuses with the tree structure T100 that has binary trees and is shown in FIG. 3 as an example, the apparatus information storing unit 101 stores therein a tree structure table T101 shown in FIG. 4 as data structure expressing the tree structure T100.

Firstly, explanation is provided on the tree structure T100. FIG. 3 shows, as an example, a tree structure T100 for the case where the total number of recording and playback apparatuses is eight. The tree structure has layers, and the node in the layer 0 is called a root, whereas each node in the lowermost layer (the layer 3 in the example shown in FIG. 3) is called a leaf. The apparatuses are assigned to the leaves in the tree structure in one-to-one correspondence. Information assigned to each leaf is an apparatus identifier for identifying the corresponding apparatus. In the tree structure T100, the apparatus identifiers 1 through 8 are assigned to the eight leaves, respectively.

For example, the node T130 "E0" is the root of the tree structure T100. The node T131 "E7" is a leaf in the tree structure T100 and the apparatus identifier "apparatus 1" is assigned to this node.

Next, explanation is provided on the tree structure table T101. The tree structure table T101 pre-stores therein at least one group made up of a parent node, a corresponding child node, and an apparatus identifier. A parent node name identifies one of the nodes in the tree structure T100. A child node name identifies a child node of a node identified by a parent node name. It should be noted, however, that in the case where a node identified by a parent node is a leaf, a symbol "–" is recorded in the table. An apparatus identifier is an identifier for identifying an apparatus assigned to a leaf. In the case where a node identified with a parent node name is not a leaf, "–" is recorded in the table.

For example, the group T170 shown in the tree structure table T101 is made up of a parent node name T171 "E0", a child node name T172 "E1", and an apparatus identifier recorded as a symbol T173 "–". As another example, the group T175 is made up of a parent node name T176 "E7", a child node name recorded as a symbol "–", and an apparatus identifier T178 "apparatus 1". From this table, it is understood that the node "E0" has "E1" as its child node, and that the node "E7" is a leaf to which the apparatus identifier "apparatus 1" is assigned.

With the aforementioned arrangement, the key management apparatus 100 manages the apparatus identifiers, in other words, manages the recording apparatuses and the playback apparatuses, with the use of the apparatus information storing unit 101.

(2) Information Storing Unit 102

The information storing unit 102 is specifically constituted with a hard disk unit. As shown in FIGS. 5 and 6 as an example, the information storing unit 102 stores therein a device key table D100 and an interrelation table D101.

<Device Key Table D100>

The device key table D100 includes at least one group made up of a subset made up of apparatus identifiers of unrevoked apparatuses, a label name in correspondence with the subset, and a device key generated from the label name. As described later, an information generating unit 103 generates the device key table D100 and writes the table into the information storing unit 102. The device key table D100 shows the results of generation by the information generating unit 103 in the case where the total number of recording and playback apparatuses is eight.

In each of the sections in the device key table D100, the top level shows a subset, the middle level shows a label name, and the bottom level shows a device key. For example, in the section D200, the top level shows a subset D201 "1", the middle level shows a label D202 "A1", and the bottom level shows a device key D203 "K1".

<Interrelation Table D101>

Figure 7:
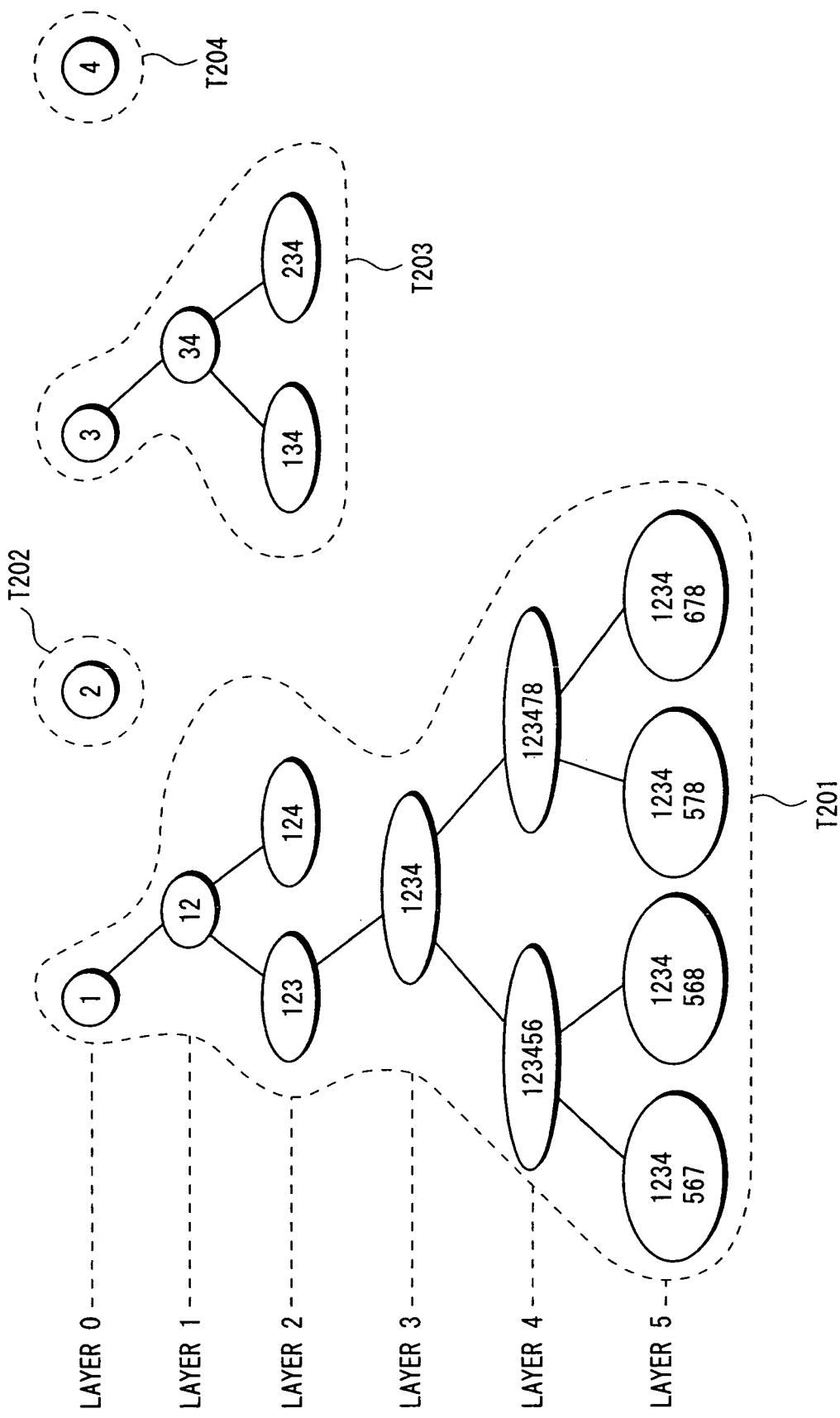
FIG. 7 is a conceptual diagram that shows tree structures T201, T202, T203, and T204.
Figure 8:
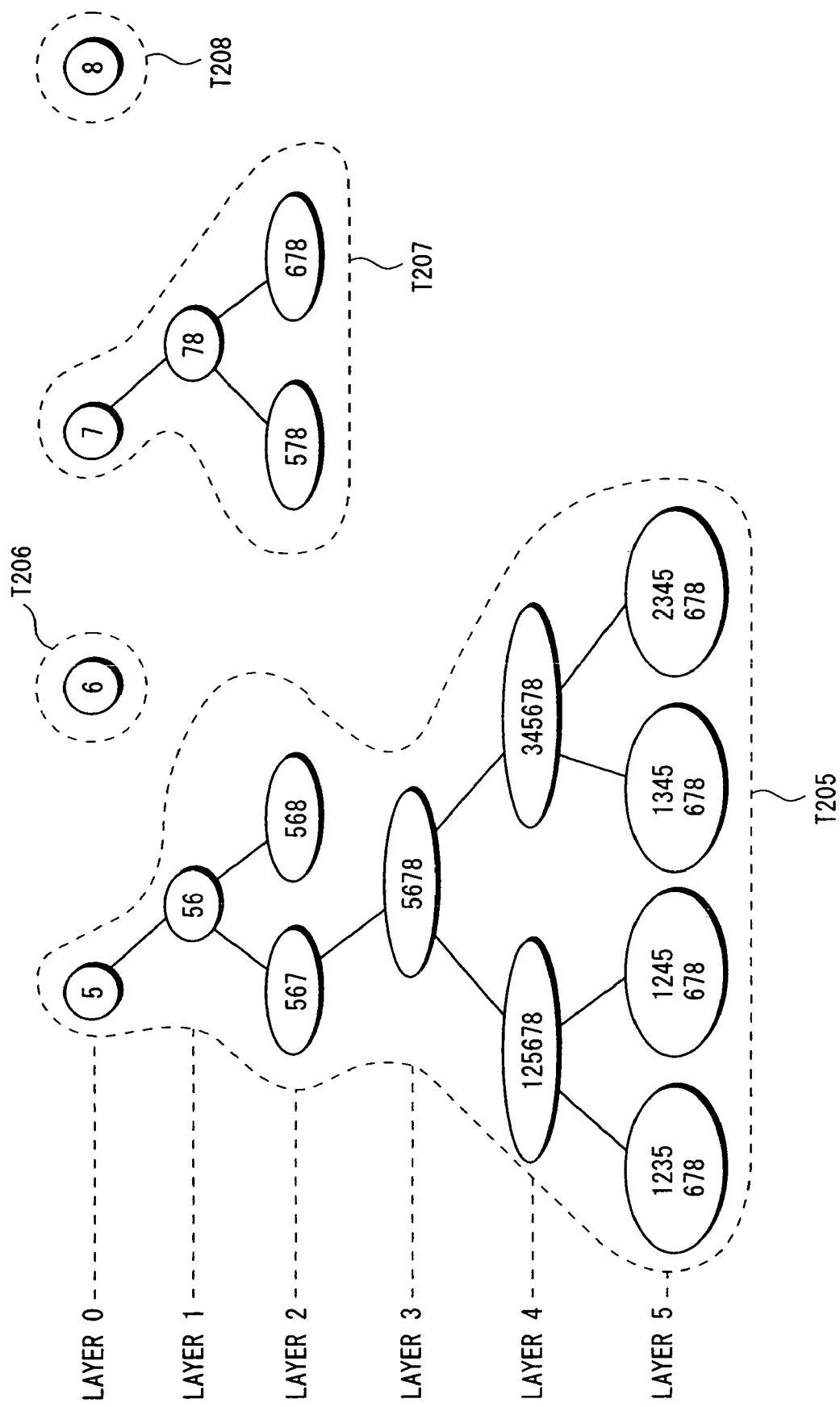
FIG. 8 is a conceptual diagram that shows tree structures T205, T206, T207 and T208.

The interrelation table D101 is in correspondence with the tree structures T201, T202, T203, T204, T205, T206, T207, and T208 that are of subsets and are shown as examples in FIGS. 7 and 8 and shows data structure expressing the tree structures that are of subsets. As described later, the information generating unit 103 generates the interrelation table D101 as a data structure for expressing the tree structures that are of subsets and writes the table into the information storing unit 102. The interrelation table D101 shows the results obtained by the information generating unit 103 in the case where the total number of recording and playback apparatuses is eight.

The following describes the tree structures of subsets.

The tree structures T201 and T205 of subsets have a subset 1 and a subset 5 as the root, respectively, and each of them has six hierarchical layers from the layer 0 to the layer 5. Each of the nodes in the tree structures T201 and T205 of subsets is a subset that contains a parent node of the node and also in which the number of the elements is the smallest, among the subsets recorded in the device key table D100.

For example, the node in the layer 1 is a subset "12" that contains the subset "1" being the root and in which the number of the elements is the smallest. In the layer 2, the nodes are the subset "123" and the subset "124" each of which contains the subset "12" being the node in the layer 1 and in which the number of the elements is the smallest.

The tree structures T202, T204, T206 and T208 of subsets have a subset "2", a subset "4", a subset "6", and a subset "8" as the root, respectively, and each of them has only one hierarchical layer being the layer 0. In other words, there is no association between the root and child nodes.

The tree structures T203 and T207 of subsets have a subset "3" and a subset "7" as the root respectively, and each of them has six hierarchical layers from the layer 0 to the layer 5. Each of the nodes in the tree structures T203 and T207 of subsets is a subset that contains a parent node of the node and also in which the number of the elements is the smallest, among the subsets recorded in the device key table D100.

The following describes the interrelation table D101.

The interrelation table D101 includes as many pieces of node information as the nodes included in the tree structures T201, T202, T203, T204, T205, T206, T207 and T208 of subsets as well as pieces of root information in correspondence with the pieces of node information. Here, a piece of node information shows a parent node and a child node. Parent nodes in the node information are subsets that are in correspondence with the nodes constituting the tree structures T201 through T208 of subsets. Child nodes are subsets that are associated with the parent nodes.

It should be noted that the symbol "−" as a child node means that there is no subset associated with the parent node. Further, in the case where two identical subsets are recorded as parent nodes, it means that there are two child nodes for the subset. In such a case, a child node for a subset recorded in the upper position is a child node on the left, a child node for a subset recorded in the lower position is a child node on the right. In the case where a subset is recorded only once as a parent node, it means that there is only one child node for the subset, and the child node is the one on the right.

A piece of root information indicates whether or not a node recorded as a corresponding parent node is a root or not. In the case where the node recorded as a parent node is a root, a piece of information indicating that the parent node is a root (in the present example "root") is recorded. In the case where the parent node is not a root, nothing is recorded.

(3) Information Generating Unit 103

The information generating unit 103 pre-stores therein a pseudo random number generator G150 that is a one-way function and is operable to generate a 3X-bit random number in response to an inputted data length of X bits. It should be noted that a result obtained in the case where a value a1 is inputted is different from a result obtained in the case where a value a2 being different from the value a1 is inputted.

Figure 9:
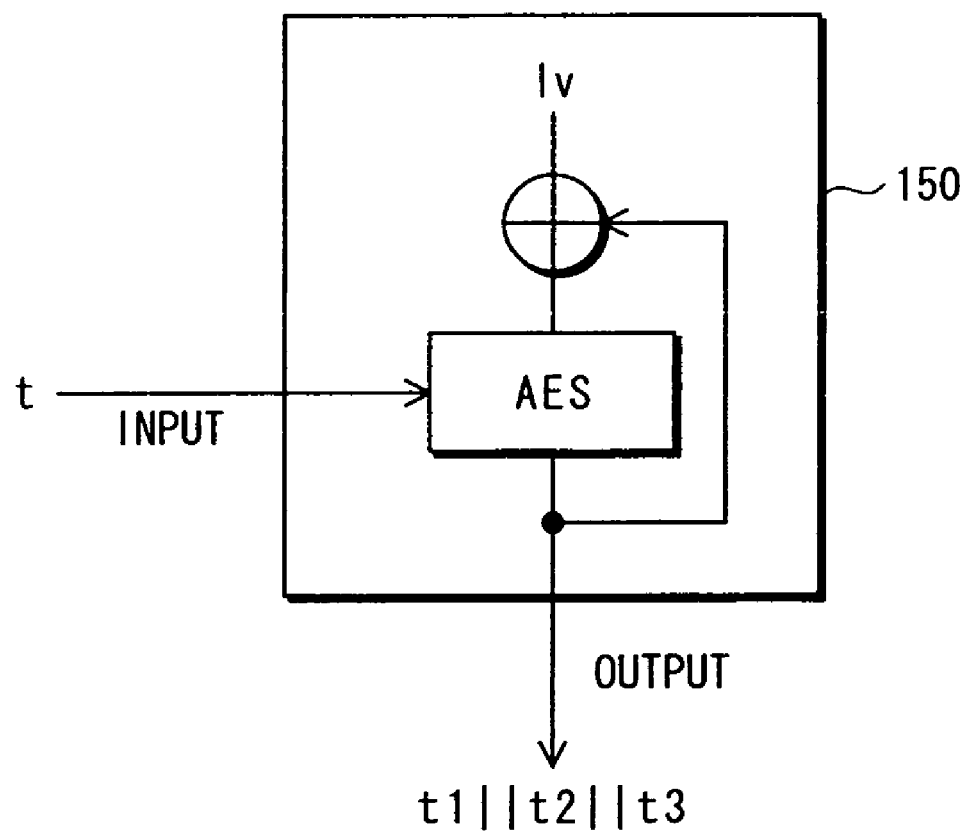
FIG. 9 shows the configuration of a pseudo random number generator G150.

Here, the operation of the pseudo random number generator 150G is described, with reference to FIG. 9. Having received an input value t whose data length is X bits, the pseudo random number generator 150G generates t1, which is a value having X bits, with the use of an initial value Iv and an AES function, and further generates a value t2, which is a value having X bits, with the use of the inputted value t, an AES function, and a value obtained by adding the generated value t1 to the initial value Iv. Further, the pseudo random number generator G150 generates t3, which is a value having X bits, with the use of the inputted value t, an AES function, and a value obtained by adding the generated value t2 to the initial value Iv, and outputs a value having 3X bits, namely, t1∥t2∥t3, in which the generated t1, t2, and t3 are joined together. It should be noted that the symbol "∥" means the joining. The value t1 is a label in correspondence with the left child node when a child node of the node for the inputted value t is associated. The value t3 is a label in correspondence with the right child node when a child node of the node for the inputted value t is associated. The value t2 is a device key assigned to the node for the inputted value t. In the following description, the value t1 will be referred to as a left label, the value t3 as a right label, the value t2 positioned in the middle as a device key.

The information generating unit 103 has a worksheet device key table in which nothing is recorded in a initial state and which has a same frame as the device key table D100. In other words, the worksheet device key table is a table when nothing has been recorded into the device key table D100.

The information generating unit 103 receives a generation instruction to have a device key generated and stored into the device key table D100, from the receiving unit 107.

Having received the generation instruction, the information generating unit 103 generates at least one subset made up of apparatus identifiers of unrevoked apparatuses out of all the apparatuses (i.e. all the apparatus identifiers) managed with binary trees by the apparatus information storing unit 101, makes association among generated subsets, generates the interrelation table D101, and further generates a label and a device key for each subset, and then generates the device key table D100 in which the generated labels and device keys are assigned. The information generating unit 103 writes the generated device key table D100 and the interrelation table D101 into the information storing unit 102.

<Generation of Subsets>

The information generating unit 103 obtains a height T of a tree structure managed by the apparatus information storing unit 101 and sets an initial value 0 into a line counter n of the worksheet device key table.

The information generating unit 103 repeats the following operations "a1" through "a6" from i=0 to i=T−1.

a1: The information generating unit 103 obtains the number N of the nodes existing in the layer i. Then, the information generating unit 103 obtains a height H of a sub-tree whose root is a node existing in the layer i.

a2: the following operations "a3" through "a6" are repeated from j=0 to j=H−1.

a3: 1 is added to the line counter n and the result of the addition is now taken as n.

a4: the following operations "a5" and "a6" are repeated from k=1 to k=N.

a5: a sub-tree whose root is a k'th node from the left in the layer i is obtained, and one or more subsets are generated each being made up of one or more terminal identifiers that remain after 2^j terminal identifiers are excluded from the leaves of the obtained sub-tree. Consequently, one or more subsets are generated which include unrevoked (valid) terminal identifiers and from which revoked (invalid) terminal identifiers are excluded. It should be noted that, in the case where a plurality of apparatuses are excluded (i.e. in the case where a plurality of revoked apparatus identifiers are excluded), only such a group of revoked apparatus identifiers is excluded together for which there exists an upper node (i) being in common to all the revoked apparatuses in the group and also (ii) to which no unrevoked apparatus identifiers belong.

a6: The generated subsets are sequentially written into empty columns starting from the left in the n'th line of the worksheet device key table.

As a result of the operation above, the information generating unit 103 generates a device key table D100a in which only subsets are recorded, from the worksheet device key table. Consequently, as a result of the operation above, a subset generating unit operable to generate subsets is configured.

It should be noted that the device key table D100a shown in FIG. 10 shows the result of the operation to generate subsets with the use of the tree structure T100 shown in FIG. 3. The following describes the operation to generate the device key table D100a shown in FIG. 10 with the use of the tree structure T100 shown in FIG. 3.

Specific Example of Generating Device Key Table D100a

The information generating unit 103 obtains the height T=3 of the tree structure T100 and sets an initial value 0 into a line counter n.

The information generating unit 103 repeats the following operations from i=0 to i=2.

<When i=0>

The information generating unit 103 obtains the number N=1 of the nodes existing in the layer i=0, by performing the operation "a1". Subsequently, the information generating unit 103 obtains the height H=3 of the sub-tree whose root is a node existing in the layer i=0.

The information generating unit 103 repeats the operations "a3" through "a6" from j=0 to j=2, according to the operation "a2".

When j=0, at first, 1 is added to the line counter n (=0) according to the operation "a3", so that n=1. Subsequently, according to the repetition in the operation "a4", the operations "a5" and "a6" are performed as many times as k, which is one time.

According to the operation "a5", subsets "1234567", "1234568", "1234578", "1234678", "1235678", "1245678", "1345678", and "2345678" are generated each being made up of terminal identifiers that remain after $2^0$ (=1) terminal identifier is excluded from a sub-tree whose root is the first node from the left in the layer 0, i.e. the tree structure T100. According to the operation "a6", the generated subsets are sequentially written into empty columns starting from the left in the n'th (=first) line of the worksheet device key table.

When j=1, 1 is added to the current line counter n (=1) according to the operation "a3", so that n=2. Subsequently, according to the repetition in the operation "a4", the operations "a5" and "a6" are performed as many times as k, which is one time.

According to the operation "a5", subsets "123456", "123478", "125678", and "345678" are generated each being made up of identifiers that remain after $2^1$ (=2) terminal identifiers are excluded from the tree structure T100. According to the operation "a6", the generated subsets are sequentially written into empty columns starting from the left in the n'th (=second) line of the worksheet device key table.

When j=2, 1 is added to the current line counter n (=2) according to the operation "a3", so that n=3. Subsequently, according to the repetition in the operation "a4", the operations "a5" and "a6" are performed as many times as k, which is one time.

According to the operation "a5", subsets "1234" and "5678", are generated each being made up of identifiers that remain after $2^2$ (=4) terminal identifiers are excluded from the tree structure T100. According to the operation "a6", the generated subsets are sequentially written into empty columns starting from the left in the n'th (=third) line of the worksheet device key table.

<When i=1>

The information generating unit 103 obtains the number N=2 of the nodes existing in the layer i=1, by performing the operation "a1". Subsequently, the information generating unit 103 obtains the height H=2 of the sub-tree whose root is a node existing in the layer i=1.

The information generating unit 103 repeats the operations "a3" through "a6" from j=0 to j=1, according to the operation "a2".

When j=0, 1 is added to the current line counter n (=3) according to the operation "a3", so that n=4. Subsequently, according to the operation "a4", the operations "a5" and "a6" are repeated from k=1 to k=2.

When k=1, according to the operation "a5", subsets "123", "124", "134", and "234" are generated each being made up of identifiers that remain after $2^0$ (=1) terminal identifier is excluded from a sub-tree whose root is the first node from the left in the layer 1. According to the operation "a6", the generated subsets are sequentially written into empty columns starting from the left in the n'th (=fourth) line of the worksheet device key table.

When k=2, according to the operation "a5", subsets "567" and "568", "578", and "678" are generated each being made up of identifiers that remain after $2^0$ (=1) terminal identifier is excluded from a sub-tree whose root is the second node from the left in the layer 1. According to the operation "a6", the generated subsets are sequentially written into empty columns starting from the left in the n'th (=fourth) line of the device key table D100.

When j=1, 1 is added to the current line counter n (=4) according to the operation "a3", so that n=5. Subsequently, according to the operation "a4", the operations "a5" and "a6" are repeated from k=1 to k=2.

When k=1, according to the operation "a5", subsets "12" and "34" are generated each being made up of identifiers that remain after $2^1$ (=2) terminal identifiers are excluded from a sub-tree whose root is the first node from the left in the layer 1. According to the operation "a6", the generated subsets are sequentially written into empty columns starting from the left in the n'th (=fifth) line of the worksheet device key table.

When k=2, according to the operation "a5", subsets "56" and "78" are generated each being made up of identifiers that remain after $2^1$ (=2) terminal identifiers are excluded from a sub-tree whose root is the second node from the left in the layer 1. According to the operation "a6", the generated subsets are sequentially written into empty columns starting from the left in the n'th (=fifth) line of the device key table D100.

<When i=2>

The information generating unit 103 obtains the number N=4 of the nodes existing in the layer i=2, by performing the operation "a1". Subsequently, the information generating unit 103 obtains the height H=1 of the sub-tree whose root is a node existing in the layer i=2.

The information generating unit 103 repeats the operations "a3" through "a6" from j=0 to j=H−1, in other words for only j=0, according to the operation "a2".

When j=0, 1 is added to the current line counter n (=5) according to the operation "a3", so that n=6. Subsequently, according to the operation "a4", the operations "a5" and "a6" are repeated from k=1 to k=4.

When k=1, according to the operation "a5", subsets "1" and "2" are generated each being made up of an identifier that remains after $2^0$ (=1) terminal identifier is excluded from a sub-tree whose root is the first node from the left in the layer 1. According to the operation "a6", the generated subsets are sequentially written into empty columns starting from the left in the n'th (=sixth) line of the worksheet device key table.

When k=2, according to the operation "a5", subsets "3" and "4" are generated each being made up of an identifier that remains after $2^0$ (=1) terminal identifier is excluded from a sub-tree whose root is the second node from the left in the layer 1. According to the operation "a6", the generated subsets are sequentially written into empty columns starting from the left in the n'th (=sixth) line of the worksheet device key table.

When k=3, according to the operation "a5", subsets "5" and "6" are generated each being made up of an identifier that remains after $2^0$ (=1) terminal identifier is excluded from a sub-tree whose root is the third node from the left in the layer 1. According to the operation "a6", the generated subsets are sequentially written into empty columns starting from the left in the n'th (=sixth) line of the worksheet device key table.

When k=4, according to the operation "a5", subsets "7" and "8" are generated each being made up of an identifier that remains after 2^0 (=1) terminal identifier is excluded from a sub-tree whose root is the fourth node from the left in the layer 1. According to the operation "a6", the generated subsets are sequentially written into empty columns starting from the left in the n'th (=sixth) line of the worksheet device key table.

<Generation Results>

As a result of the operation above, the information generating unit 103 generates the device key table D100a in which only subsets are recorded, as shown in FIG. 10.

The subsets written in the first line 501, the second line 502, and the third line 503 of the device key table D100a are generated from a sub-tree whose root is the node T130 "E0" existing in the layer 0 of the tree structure T100. The first line 501 records 8 subsets in each of which 1 terminal identifier is excluded, in other words, 8 subsets each having 7 unrevoked (valid) terminal identifiers. The second line 502 records 4 subsets each having 5 unrevoked terminal identifiers. The third line 503 records 2 subsets each having 4 unrevoked terminal identifiers.

The subsets written in the fourth line 504 and the fifth line 505 are generated from 2 sub-trees whose roots are 2 nodes existing in the layer 1 of the tree structure T100, respectively. The fourth line 504 records 8 subsets each having 3 unrevoked terminal identifiers. The fifth line 505 records 4 subsets each having 2 unrevoked terminal identifiers.

The 8 subsets written in the sixth line 506 are generated from 4 sub-trees whose roots are the 4 nodes existing in the layer 2 of the tree structure T100, respectively.

<Generation of Device Keys>

The information generating unit 103 pre-stores therein a worksheet interrelation table in which nothing is recorded in a initial state and which has a same frame as the interrelation table D101. In other words, the worksheet interrelation table is a table when nothing has been recorded into the interrelation table D101.

The information generating unit 103 obtains a height T of a tree structure managed by the apparatus information storing unit 101.

The information generating unit 103 repeats the following operations "b1" through "b11" from h=1 to h=2^T.

b1: The information generating unit 103 generates a random number Ah having X bits, and writes the generated random number Ah into the line $\{(T^2+T)/2\}$, the column h of the device key table D100a. Consequently, the information generating unit 103 is able to assign the random Ah as a label for a subset positioned in the line $\{(T^2+T)/2\}$, the column h of the device key table D100a.

b2: The assigned label, i.e. the random number Ah is inputted to the pseudo random number generator G as an inputted value, and the generated output being a 3X-bit random number is obtained.

b3: The 3X-bit random number is divided into every X bits. The X bits positioned in the second place from the left is taken as a device key "Km" in correspondence with the assigned label and written into the line $\{(T^2+T)/2\}$, the column h of the device key table D100a. A left label and a right label which are X bits positioned on the left side and the right side respectively are brought into correspondence with a subset for the label (i.e. the random number Ah) inputted to the pseudo random number generator G and are temporarily stored. It should be noted that the letter "m" in the device key "Km" starts from the initial value of 1 and increments by 1 every time a device key is assigned. "Km+1" is a device key that is to be assigned after "Km" is assigned.

b4: the following operations "b5" through "b11" are repeated from i={(T^2+T)/2−1} to i=1.

b5: The number J of the subsets is obtained, to which a device key and a label are assigned in the line (i+1) of the device key table D100a.

b6: The following operations from "b7" through "b11" are repeated from j=1 to j=J.

b7: Using a subset Sj, which is a j'th subset from the left and to which a device key and a label are assigned in the line (i+1) of the device key table D100a, as a reference, the i'th line of the device key table D100a is searched sequentially from the left for a subset that contains the subset Sj and also to which no device key is assigned yet.

b8: As a result of the search in "b7", if no such subset exists that contains the subset Sj and also to which no device key is assigned yet, the subset Sj is taken as a parent node, and a group made up of (i) a parent node being the subset Sj and (ii) a symbol "−" indicating that there is no subset to be a child node of the parent node is written, as a piece of node information, into an uppermost empty field within the worksheet interrelation table. In other words, the subset Sj is written into the field for a parent node, and the symbol "−" is written into the field for a child node. Further, in the case where the subset Sj is a root, a piece of information indicating that Sj is a root ("ROOT") is written as a piece of root information. In the case where the subset Sj is not a root, nothing is recorded as root information. Whether the subset Sj is a root or not is judged by checking if the line in which the subset Sj is recorded, i.e. the value of (i+1) is $\{(T^2+T)/2\}$ or not. In the case where the value of (i+1) is $\{(T^2+T)/2\}$, since the subset Sj is in the lowermost layer of the device key table D100a, there are no subsets that are contained in the subset Sj. It means that there is no parent node that has the subset Sj as a child node. Thus, the subset Sj is a node being a root.

b9: As a result of the search in the operation "b7", if there are one or more subsets each of which contains the subset Sj and also to which no device key is assigned yet, at most two subsets are sequentially obtained from the left, out of the one or more subsets to which no device key is assigned yet.

b10: In the case where one subset is obtained, the right label, out of the left and right labels that are in correspondence with the subset Sj and are temporarily stored, is assigned to the obtained subset as its label. The assigned right label is written into the field in which the obtained subset is recorded within the device key table D100a. In the case where two subsets are obtained (e.g. Tj and Uj), the left label, out of the left and right labels that are in correspondence with the subset Sj and are temporarily stored, is assigned as a label for the subset Tj positioned on the left, whereas the right label, out of the left and right labels that are in correspondence with the subset Sj and are temporarily stored, is assigned as a label for the subset Uj positioned on the right. The assigned left label is written into the field in which the obtained subset Tj is recorded within the device key table D100a. The assigned right label is written into the field in which the obtained subset Uj is recorded.

b11: In the case where one subset is obtained, the label assigned to the obtained subset (i.e. the temporarily stored right label) is inputted to the pseudo random number generator G as an input value, and a 3X-bit random number is generated and obtained as an output. The 3X-bit random number is divided into every X bits. The X bits positioned in the second place from the left is taken as a device key "Km" in correspondence with the assigned label and written into the field in which the obtained subset is recorded within the device key table D100a. Further, the information generating unit 103 brings the left and right labels obtained in this operation ("b11") into correspondence with the subset for the label inputted to the pseudo random number generator G (i.e. the subset obtained in the operation "b9") and temporarily stores these labels. Further, the subset Sj taken as a parent node and the obtained subset taken as its child node are written into an uppermost empty field within the worksheet interrelation table. Further, in the case where the subset Sj is a root, a piece of information indicating that Sj is a root ("ROOT") is written as a piece of root information. In the case where the subset Sj is not a root, nothing is recorded as root information.

b12: In the case where two subsets are obtained (e.g. a subset Tj and a subset Uj from the left), the label assigned to the obtained subset Tj (i.e. the temporarily stored left label) is inputted to the pseudo random number generator G as an input value, and a 3X-bit random number is generated and obtained as an output. The 3X-bit random number is divided into every X bits. The X bits positioned in the second place from the left is taken as a device key "Km" in correspondence with the assigned label and written into the field in which the obtained subset Tj is recorded within the device key table D100a. Further, the information generating unit 103 takes the left label as an input value and brings the two left and right labels obtained in correspondence with the subset Tj for the label inputted to the pseudo random number generator G and temporarily stores these labels. Further, the subset Sj taken as a parent node and the obtained subset Tj taken as its child node are written into an uppermost empty field within the worksheet interrelation table. Further, in the case where the subset Sj is a root, a piece of information indicating that Sj is a root ("ROOT") is written as a piece of root information. In the case where the subset Sj is not a root, nothing is recorded as root information. Subsequently, the label assigned to the obtained subset Uj (i.e. the temporarily stored right label) is inputted to the pseudo random number generator G as an input value, and a 3X-bit random number is generated and obtained as an output. The 3X-bit random number is divided into every X bits. The X bits positioned in the second place from the left is taken as a device key "Km+1" in correspondence with the assigned label and written into the field in which the obtained subset Uj is recorded within the device key table D100a. Further, the information generating unit 103 takes the right label as an input value and brings the two left and right labels obtained in correspondence with the subset Uj for the label inputted to the pseudo random number generator G and temporarily stores these labels. Further, the subset Sj taken as a parent node and the obtained subset Uj taken as its child node are written into an uppermost empty field within the worksheet interrelation table. Further, in the case where the subset Sj is a root, a piece of information indicating that Sj is a root ("ROOT") is written as a piece of root information. In the case where the subset Sj is not a root, nothing is recorded as root information.

As a result of the operation described above, the information generating unit 103 is able to generate the device key table D100, as shown in FIG. 5, in which a label and a device key are assigned to each of all the subsets recorded in the device key table D100a. Further, the information generating unit 103 is able to generate the interrelation table D101 from the worksheet interrelation table.

The following describes the specific operation of the information generating unit 103 to generate labels and device keys and assign the generated labels and device keys, with the use of the device key table D100a.

Specific Example of Generation of Device Keys

The information generating unit 103 obtains a height T=3 of the tree structure T100.

The information generating unit 103 repeats the following operations from h=1 to h=2^T.

<When h=1>

The information generating unit 103 generates a random number A1 having X bits, assigns the generated random number A1 as a label for the subset "1" in the line 6, the column 1, and writes the assigned label into the line 6, the column 1 of the device key table D100a.

Subsequently, the assigned label, i.e. the random number A1 is inputted to the pseudo random number generator G as an inputted value, and the generated output being a 3X-bit random number is obtained.

The information generating unit 103 divides the 3X-bit random number into every X bits. The X bits positioned in the second place from the left is taken as a device key "K1" in correspondence with the assigned label and written into the line 6, the column 1 of the device key table D100a. A left label (referred to as "A1L") and a right label (referred to as "A1R") each of which has X bits and which are positioned on the left side and the right side respectively are brought into correspondence with a subset "1" for the label inputted to the pseudo random number generator G and are temporarily stored.

The operations "b5" through "b11" are repeated from i=5 to i=1.

When i=5, the number J=1 of the subsets is obtained, to which a device key is assigned in the line 6 of the device key table D100a. According to the repetition in "b6", the operations in "b8" through "b11" are repeated as many times as j, which is one time. According to the operation "b8", using a subset "1", which is the first subset from the left and to which a device key is assigned in the line 6 of the device key table D100a, as a reference, the information generating unit 103 searches the 5th line of the device key table D100a sequentially from the left for a subset that contains the subset "1" and also to which no device key is assigned yet. According to the operation in "b9", the subset "12" that contains the subset "1" and to which no device key is assigned yet is obtained. According to the operation "b10", the temporary stored right label "A1R" is assigned as a label for the obtained subset "12". The assigned right label is written into the field in which the obtained subset "12" is recorded within the device key table D100a. According to the operation "b11", the information generating unit 103 inputs the label "A1R" assigned to the obtained subset "12" to the pseudo random number generator G as an input value, and obtains a 3X-bit random number as an output. The 3X-bit random number is divided into every X bits. The X bits positioned in the second place from the left is taken as a device key "K2" in correspondence with the assigned label and written into the field in which the obtained subset "12" is recorded within the device key table D100a. Further, the information generating unit 103 brings a left label (referred to as "A1RL") and a right label (referred to as "A1RR") each of which has X bits and which are positioned on the left side and the right side respectively into correspondence with the subset "12" for the label inputted to the pseudo random number generator G and temporarily stores these labels. Further, the subset "1" taken as a parent node and the obtained subset taken as its child node are written into an uppermost empty field within the worksheet interrelation table. Further, since the subset "1" is a root, a piece of information indicating that the subset "1" is a root ("ROOT") is recorded.

When i=4, the number J=1 of the subsets is obtained, to which a device key is assigned in the line 5 of the device key table D100a. According to the repetition in "b6", the operations in "b8" through "b11" are repeated as many times as j, which is one time. According to the operation in "b8", using a subset "12", which is the first subset from the left and to which a device key is assigned in the line 5 of the device key table D100a, as a reference, the information generating unit 103 searches the 4th line of the device key table D100a sequentially from the left for a subset that contains the subset "12" and also to which no device key is assigned yet. According to the operation in "b9", the subsets "123" and "124" each of which contains the subset "12" and to each of which no device key is assigned yet are obtained. According to the operation "b10", the temporary stored left label "A1RL" is assigned as a label for the subset "123" positioned on the left, out of the two subsets "123" and "124", whereas the temporarily stored right label "A1RR" is assigned as a label for the subset "124" positioned on the right. The assigned left label is written into the field in which the obtained subset "123" is recorded within the device key table D100a. The assigned right label is written into the field in which the obtained subset "124" is recorded.

According to the operation "b12", the information generating unit 103, at first, inputs the label "A1RL" assigned to the obtained subset "123" to the pseudo random number generator G as an input value, and obtains a 3X-bit random number as an output. The 3X-bit random number is divided into every X bits. The X bits positioned in the second place from the left is taken as a device key "K3" in correspondence with the assigned label and written into the field in which the obtained subset "123" is recorded within the device key table D100a. Further, the information generating unit 103 brings a left label "A1RLL" and a right label "A1RLL" each of which has X bits and which are positioned on the left side and the right side respectively into correspondence with the subset "123" for the label inputted to the pseudo random number generator G and temporarily stores these labels. Further, the subset "12" taken as a parent node and the obtained subset "123" taken as its child node are written into an uppermost empty field within the worksheet interrelation table. It should be noted that, since the subset "12" is not a root, nothing is recorded as root information. Subsequently, the information generating unit 103 inputs the label "A1RR" assigned to the obtained subset "124" to the pseudo random number generator G as an input value, and obtains a 3X-bit random number as an output. The 3X-bit random number is divided into every X bits. The X bits positioned in the second place from the left is taken as a device key "K4" in correspondence with the assigned label and written into the field in which the obtained subset "124" is recorded within the device key table D100a. Further, the information generating unit 103 brings a left label "A1RRL" and a right label "A1RRR" each of which has X bits and which are positioned on the left side and the right side respectively into correspondence with the subset "124" for the label inputted to the pseudo random number generator G and temporarily stores these labels. Further, the subset "12" taken as a parent node and the obtained subset "124" taken as its child node are written into an uppermost empty field within the worksheet interrelation table. It should be noted that, since the subset "12" is not a root, nothing is recorded as root information.

When i=3, i=2, and i=1, the operation described above is performed so that the data structure indicating the tree structure T100 whose root is the subset "1" and the device keys "K1" through "K11" as well as the labels corresponding to the device keys are obtained.

In addition, for each of the cases where h=2, 3, 4, 5, 6, 7, and 8, the operation described above is performed so that the data structures indicating the tree structures T202, T203, T204, T205, T206, T207, and T208 whose roots are the subsets "2", "3", "4", "5", "6", "7", and "8", respectively, and the device keys "K12" through "K34" as well as the labels corresponding to the devices keys are obtained.

<Generation Results>

As a result of the operation above, the information generating unit 103 generates the device key table D100 and the interrelation table D101, as shown in FIGS. 5 and 6.

The first line of the device key table D100 records subsets in each of which 1 terminal identifier is excluded, in other words, subsets each having 7 unrevoked (valid) terminal identifiers, as well as the labels and the device keys assigned to the subsets. The second line records subsets each having 5 unrevoked terminal identifiers, as well as the labels and the device keys assigned to the subsets. The third line records subsets each having 4 unrevoked terminal identifiers, as well as the labels and the device keys assigned to the subsets. The fourth line, the fifth line, and the sixth line record subsets having three unrevoked terminal identifiers, two unrevoked terminal identifiers, and one unrevoked terminal identifier, respectively, as well as the labels and the device keys assigned to the subsets.

The interrelation table D101 records the data structures indicating the tree structures T201, T202, T203, T204, T205, T206, T207, and T208 whose roots are the subsets "1", "2", "3", "4", "5", "6", "7", and "8", respectively.

Here, the situation in which some of the subsets are associated with one another as a result of the operation described above is shown in the table in FIG. 11. The elements in the table are subsets. Each arrow shows the direction in which two subsets are associated with each other. The meaning of the association between subsets is that a label for a child node is generated from a label for a subset being a parent node of the child node.

For example, the subset 510 "1" is associated with the subset 511 "12" with the arrow 512. It means that the subset 510 "1" taken as a parent node and the subset 511 "12" taken as its child node are associated with each other, and that it is possible to generate the label "A1R" for the subset 511 "12" from the label "A1" for the subset 510 "1". In addition, the subset 511 "12" is associated with the subsets 513 "123" and 514 "124" with the arrows 515 and 516. In other words, the subset 511 "12" taken as a parent node is associated with the subsets 513 "123" and 514 "124" taken as child nodes.

Here, it is observed that when subsets are associated with each other, the labels are associated with each other. The reason is, because of the association between the subsets, a label for a subset assigned to a child node is generated from a label assigned to a subset being a parent node, with the use of the pseudo random number generator G150 that is a one-way function.

(4) The Distributing Unit 104

The distributing unit 104 has a key information storing area for temporarily storing a label to be distributed to an apparatus and a subset in correspondence with the label.

The distributing unit 104 receives an instruction to distribute key information and an apparatus identifier specifying an apparatus being the destination of the distribution, from the receiving unit 107.

Having received the distribution instruction and the apparatus identifier, the distributing unit 104 generates and obtains one or more pieces of key information each of which includes a label to be distributed to the apparatus specified by the received apparatus identifier and a subset in correspondence with the label. The method of obtaining the key information will be described later.

The distributing unit 104 reads the interrelation table D101 stored in the information storing unit 102.

The distributing unit 104 distributes the obtained one or more pieces of key information and the read interrelation table D101 to the apparatus identified with the received apparatus identifier.

The following describes an example of the method of distribution. The distributing unit 104 writes the received apparatus identifier, the obtained one or more pieces of key information, and the read interrelation table D101 into a recording medium to be distributed that is mounted to the key management apparatus 100. A business entity that manages the key management apparatus 100 distributes the recording medium on which the apparatus identifier, the one or more pieces of key information, and the interrelation table 101 are recorded to a business entity that manufactures apparatuses. Having received the recording medium, the manufacturing entity reads the one or more pieces of key information and the interrelation table D101 recorded on the recording medium, during the manufacturing process of an apparatus corresponding to the apparatus identifier recorded on the recording medium and writes the one or more pieces of key information and the interrelation table D101 into the apparatus being manufactured. Accordingly, the one or more pieces of key information and the interrelation table D101 are distributed to the apparatus that is in correspondence with the apparatus identifier.

<Obtainment of Key Information>

The following describes the operation to obtain key information.

Having received a distribution instruction and an apparatus identifier of an apparatus being the destination of the distribution, the distributing unit 104 obtains the number Y of the tree structures that are managed in the interrelation table D101.

The distributing unit 104 repeats the following operations "c1" through "c6" from i=1 to i=Y.

c1: The distributing unit 104 obtains a data structure indicating a tree structure Vi that is managed in the interrelation table D101 and is positioned in an i'th place from the top.

c2: The distributing unit 104 obtains the number P of the nodes having no child node (i.e. the number of the leaves), from the obtained data structure.

c3: The distributing unit 104 repeats the following operations "c4" through "c6" from p=1 to p=P.

c4: The distributing unit 104 obtains a node Wp that is positioned in the p'th place from the top and has no child node (i.e. Wp is a leaf), out of the fields for parent nodes in the obtained data structure. The distributing unit 104 searches the path starting from the root of the tree structure Vi and reaching the leaf Wp for a first node (subset) in which a subset containing the received apparatus identifier appears.

c5: If a node has been detected as a result of the search in the operation "c4", it is judged whether or not the detected node has already been stored in the key information storing area.

c6: In the case where it is judged that the node has not been stored yet, the distributing unit 104 reads a label that corresponds to the detected node i.e. the detected subset, from the device key table D100 and generates and obtains a piece of key information that contains the read label and the detected subset. The distributing unit 104 stores the obtained piece of key information into the key information storing area. When it is judged that the detected node has already been stored in the key information storing area, the distributing unit 104 does not perform the generation and the storing of the key information into the key information storing area.

As a result of the operation described above, the distributing unit 104 stores all the pieces of key information that contain labels and subsets to be distributed to the apparatus corresponding to the received apparatus identifier, into the key information storing area. The distributing unit 104 reads the interrelation table D101 and distributes the read interrelation table D101 and all the pieces of key information stored in the key information storing area to the apparatus being the destination of the distribution.

After distributing the interrelation table D101 and all the pieces of key information to the apparatus identified with the received apparatus identifier, the distributing unit 104 deletes all the pieces of key information stored in the key information storing area. It should be noted that "to distribute" here means, for example, to complete the writing of the received apparatus identifier, the one or more pieces of key information stored in the key information storing area, and the interrelation table D101 onto the recording medium to be distributed.

<Specific Example of Obtainment of Key Information>

The following describes the specific operation for obtainment of key information in the case where the apparatus identifier 1 is given with the use of the device key table D100 and the interrelation table D101.

Having received a distribution instruction and the apparatus identifier "1", the distributing unit 104 obtains the number of the tree structures managed in the interrelation table D101, the number being 8.

The distributing unit 104 repeats the following operations "c1" through "c6" from i=1 to i=8.

<When i=1>

The distributing unit 104 obtains a data structure indicating a tree structure V1 that is managed in the interrelation table D101 and is positioned in the first place from the top. Here, the data structure indicating the tree structure V1 is a data structure D300, which is indicated in the first to fifteenth lines in the interrelation table D101.

The distributing unit 104 obtains the number "5" of the nodes having no child node (i.e. the number of the leaves), from the obtained data structure.

The distributing unit 104 repeats the following operations "c4" through "c6" from p=1 to p=5.

In the case where p=1, the distributing unit 104 obtains a node W1 (which is in the present example the subset D302 "124" shown in FIG. 6) that is positioned in the first place from the top and has no child node, out of the fields for parent nodes in the obtained data structure. The distributing unit 104 searches the path starting from the root of the tree structure V1 and reaching the leaf W1 for a first node (subset) in which a subset containing the received apparatus identifier appears. As a result of the search, the distributing unit 104 detects the node 1 (in the present example, the subset D301 "1" in FIG. 6) and judges whether or not the detected subset D301 "1" has already been stored in the key information storing area.

The distributing unit 104 judges that the subset has not been stored yet, reads the label D202 "A1" that is in correspondence with the detected subset D301 "1", from the device key table D100, and generates and obtains a piece of key information that contains the read label D202 "A1" and the detected subset D301 "1". The distributing unit 104 stores the obtained piece of key information into the key information storing area.

When p=2, the distributing unit 104 obtains the node W2 (in the present example, the subset D303 "1234567") positioned in the second place from the top and has no child node, out of the parent node fields in the obtained data structure, and searches the path starting from the root of the tree structure V1 and reaching the leaf W2 for a first node (subset) in which a subset containing the received apparatus identifier appears. As a result, the node 1 (in the present example, the subset D301 "1") is detected, but the distributing unit 104 judges that the subset has already been stored in the key information storing area and does not generate key information and does not store key information into the key information storing area.

When p=3, 4, and 5, the distributing unit 104 detects the node 1 in the same manner and judges that the node has already been stored; therefore, the distributing unit 104 does not generate key information and does not store key information into the key information storing area.

<When i=2>

The distributing unit 104 obtains a data structure indicating a tree structure V2 that is managed in the interrelation table D101 and is positioned in the second place from the top. Here, the data structure indicating the tree structure V2 is a data structure D310, which is indicated in the sixteenth line in the interrelation table D101.

The distributing unit 104 obtains the number "1" of the nodes having no child node (i.e. the number of the leaves), from the obtained data structure D310.

The distributing unit 104 repeats the following operations "c4" through "c6" for p=1 time.

The distributing unit 104 obtains a node W1 (which is in the present example the subset D311 "2") that is positioned in the first place from the top and has no child node, out of the fields for parent nodes in the obtained data structure. The distributing unit 104 searches the path starting from the root of the tree structure V2 and reaching the leaf W1 for a first node (subset) in which a subset containing the received apparatus identifier appears. As a result of the search, the distributing unit 104 detects no node.

<When i=3>

The distributing unit 104 obtains a data structure indicating a tree structure V3 that is managed in the interrelation table D101 and is positioned in the third place from the top. Here, the data structure indicating the tree structure V3 is a data structure D320, which is indicated in the seventeenth to twenty-first lines in the interrelation table D101.

The distributing unit 104 obtains the number "2" of the nodes having no child node (i.e. the number of the leaves), from the obtained data structure.

The distributing unit 104 repeats the following operations "c4" through "c6" from p=1 to p=2.

When p=1, the distributing unit 104 obtains a node W1 (which is in the present example the subset D321 "134") that is positioned in the first place from the top and has no child node, out of the fields for parent nodes in the obtained data structure. The distributing unit 104 searches the path starting from the root of the tree structure V3 and reaching the leaf W1 for a first node (subset) in which a subset containing the received apparatus identifier appears. As a result of the search, the distributing unit 104 detects a node (in the present example, the subset D321 "134"), and judges whether or not the detected subset D321 "134", has already been stored in the key information storing area.

The distributing unit 104 judges that the subset has not been stored yet, reads the label D204 "A3RL" that corresponds to the detected subset D321 "134", from the device key table D100, and generates and obtains a piece of key information that contains the read label D204 "A3RL" and the detected subset D321 "134". The distributing unit 104 stores the obtained piece of key information into the key information storing area.

When p=2, the distributing unit 104 obtains the node W2 (in the present example, the subset D322 "234") positioned in the second place from the top and has no child node, out of the parent node fields in the obtained data structure, and searches the path starting from the root of the tree structure V3 and reaching the leaf W2 for a first node (subset) in which a subset containing the received apparatus identifier appears. As a result, the distributing unit 104 detects no node.

<When i=4>

The distributing unit 104 obtains a data structure indicating a tree structure V4 that is managed in the interrelation table D101 and is positioned in the fourth place from the top. Here, the data structure indicating the tree structure V4 is a data structure D330, which is indicated in the twenty-second line in the interrelation table D101.

The distributing unit 104 obtains the number "1" of the nodes having no child node (i.e. the number of the leaves) from the obtained data structure.

The distributing unit 104 repeats the following operations "c4" through "c6" for p=1 time.

The distributing unit 104 obtains a node W1 (which is in the present example the subset D311 "4") that is positioned in the first place from the top and has no child node, out of the fields for parent nodes in the obtained data structure. The distributing unit 104 searches the path starting from the root of the tree structure V4 and reaching the leaf W1 for a first node (subset) in which a subset containing the received apparatus identifier appears. As a result of the search, the distributing unit 104 detects no node.

The distributing unit 104 thereafter performs the aforementioned operations from i=5 to i=8, generates a piece of key information that contains the subset "125678" and the label "A5RLRL" and a piece of key information that contains the subset "1345678" and the label "A5RLRRL", and stores the pieces of key information into the key information storing area.

As a result, the distributing unit 104 store all pieces of key information that contain labels and subsets and are to be distributed to an apparatus identified with the received apparatus identifier, into the key information storing area. The distributing unit 104 reads the interrelation table D101 from the information storing unit 102 and distributes the read interrelation table D101 and all the pieces of key information stored in the key information storing area to the apparatus having the apparatus identifier 1.

After distributing the interrelation table D101 and all the obtained pieces of key information to the apparatus having the apparatus identifier 1, the distributing unit 104 deletes all the pieces of key information stored in the key information storing area.

The table D400 shown in FIG. 12 indicates the pieces of key information to be distributed to the apparatuses 1 to 8, respectively, in other words, the total number of pieces of key information and the pieces of key information stored in each apparatus. It should be noted that, in FIG. 12, the pieces of key information are written so that they are arranged in such an order that a piece of key information containing a smaller number of elements are positioned on the left. For example, the number of labels stored in each conventional apparatus is uniformly six; however, the number of pieces of key information stored in the apparatus 1 is four, which is smaller than a conventional apparatus by two. Each of the values shown in the parentheses in the column for the total number of pieces is a differences between the number of pieces of key information stored in the apparatus and the number of labels stored in a conventional apparatus.

The pieces of key information stored in the apparatus 1 are, as shown in the key information field D401, the subset 520 "1" and the label 521 "A1", the subset 522 "134" and the label 523 "A3RL", the subset 524 "125678" and the label 525 "A5RLRL", and the subset 526 "1345678" and the label 527 "A5RLRRL".

(5) The Revoked Apparatus Specifying Unit 105

The revoked apparatus specifying unit 105 has a revoked apparatus storing area in which one or more apparatus identifiers for identifying revoked apparatuses are stored. It should be noted that the revoked apparatus storing area stores therein nothing in an initial state.

After having received a registration instruction to have revoked apparatuses registered from the receiving unit 107, the revoked apparatus specifying unit 105 receives one or more apparatus identifiers for identifying revoked apparatuses. The revoked apparatus specifying unit 105 stores the received one or more apparatus identifiers into the revoked apparatus storing area. At this time, the revoked apparatus specifying unit 105 stores the received one or more apparatus identifiers in addition to the apparatus identifiers that have already been stored.

Having received a generation instruction for key revocation data from the receiving unit 107, the revoked apparatus specifying unit 105 outputs the received generation instruction to the key revocation data generating unit 106.

(6) The Key Revocation Data Generating Unit 106

The key revocation data generating unit 106 has a media key storing area in which a media key is pre-stored.

The key revocation data generating unit 106 has a common key encryption algorithm (for example, DES).

Having received the generation instruction from the revoked apparatus specifying unit 105, the key revocation data generating unit 106 judges whether or not any apparatus identifier is stored in the revoked apparatus storing area of the revoked apparatus specifying unit 105; in other words, the key revocation data generating unit 106 judges whether or not any identifier of apparatuses to be revoked (hereafter, it will be simply referred to as a revoked apparatus identifier) exists in the revoked apparatus storing area.

In the case where it has been judged that no revoked apparatus identifier is stored, the key revocation data generating unit 106 reads two subsets that contain, in a logical sum, all the apparatus identifiers and the device keys that are in correspondence with these subsets from the device key table D100 stored in the information storing unit 102. For example, the key revocation data generating unit 106 reads a group made up of a subset "1234567" and a device key "K8" and another group made up of a subset "8" and a device key "K34" from the device key table D100 shown in FIG. 5. It should be noted in the following description, the read two subsets will be referred to as a first subset and a second subset, and the two corresponding device keys will be referred to as a first device key and a second device key, respectively.

The key revocation data generating unit 106 reads the media key from the media key storing area and encrypts the read media key with a common key encryption algorithm, using the first device key, so as to generate a first encrypted media key. The key revocation data generating unit 106 temporarily stores therein the generated first encrypted media key and the first subset, while bringing them into correspondence with each other. Further, the key revocation data generating unit 106 encrypts the read media key with a common key encryption algorithm, using the second device key, so as to generate a second encrypted media key. The key revocation data generating unit 106 temporarily stores therein the generated second encrypted media key and the second subset, while bringing them into correspondence with each other.

In the example shown above, the key revocation data generating unit 106 generates the first encrypted media key Enc (K8, media key), and the second encrypted media key Enc (K34, media key), and temporarily stores them in correspondence with the subset "1234567" and the subset "8", respectively. Here, Enc (A, B) denotes to encrypt the data B by applying an encryption algorithm E using the key A.

When it has been judged that one or more revoked apparatus identifiers are stored, the key revocation data generating unit 106 reads, from the device key table D100, (i) a subset being made up of a largest number of unrevoked apparatus identifiers out of one or more apparatus identifiers (hereafter referred to as unrevoked apparatus identifiers) obtained by excluding revoked apparatus identifiers from all the apparatus identifiers managed in the tree structure T100 and (ii) a device key that corresponds to the subset. The key revocation data generating unit 106 temporarily stores the read subset and the device key. The key revocation data generating unit 106 repeatedly performs this operation until nothing but all of the unrevoked apparatus identifiers are selected as elements of subsets. As a result of the repeated operation, the key revocation data generating unit 106 temporarily stores one or more groups each being made up of a subset and a corresponding device key in the order in which they are read out.

The key revocation data generating unit 106 reads a media key from the media key storing area and encrypts the read media key with a common key encryption algorithm, using the one or more temporarily stored device keys, so as to generate one or more encrypted media keys. The key revocation data generating unit 106 then temporarily stores the generated encrypted media keys, while bringing them into correspondence with the subsets corresponding to the device keys used in the encryption process. At this time, the number of the generated encrypted media keys is equal to the number of read device keys.

For example, in the case where the revoked apparatus storing area stores therein the apparatus identifier "1", the key revocation data generating unit 106 reads a subset "2345678" and a device key "K28" and generates an encrypted media key Enc (K28, media key) using the read device key, and temporarily stores therein the generated encrypted media key Enc (K28, media key) and the subset "2345678" while bringing them into correspondence with each other. In the case where the revoked apparatus storing area stores therein the apparatus identifiers "1" and "5", the key revocation data generating unit 106 reads a group being made up of a subset "234" and a device key "K16" as well as another group being made up of a subset "678" and a device key "K33" and generates encrypted media keys Enc (K16, media key) and Enc (K33, media key), using the read device keys "K16" and "K33", and temporarily stores therein the generated encrypted media key Enc (K16, media key) and the subset "234" while bringing them into correspondence with each other, as well as the generated encrypted media key Enc (K33, media key) and the subset "678", while bringing them into correspondence with each other.

When having finished generating encrypted media keys from all the read device keys, the key revocation data generating unit 106 reads the one or more temporarily stored groups (hereafter, referred to as key revocation data) each being made up of an encrypted media key and a subset and writes the one or more read pieces of key revocation data onto the recording medium 200a via the outputting unit 108. Subsequently, the key revocation data generating unit 106 deletes the pieces of information that are temporarily stored.

As a result, the key revocation data generating unit 106 is able to generate one or more pieces of key revocation data each being made up of an encrypted media key and a subset and to record the generated pieces of key revocation data onto the recording medium 200a.

(7) The Receiving Unit 107

The receiving unit 107 receives a generation instruction as a result of a user operation and outputs the received generation instruction to the information generating unit 103.

Subsequent to the receiving of the distribution instruction as a result of a user operation, the receiving unit 107 receives an apparatus identifier indicating an apparatus being the destination of the distribution. The receiving unit 107 outputs the received distribution instruction and apparatus identifier to the distributing unit 104.

The receiving unit 107 receives a registration instruction as a result of a user operation and then receives one or more apparatus identifiers indicating one or more apparatuses to be revoked. The receiving unit 107 outputs the received registration instruction and one or more apparatus identifiers to the revoked apparatus specifying unit 105.

The receiving unit 107 receives a generation instruction for key revocation data as a result of a user operation and outputs the received generation instruction to the revoked apparatus specifying unit 105.

(8) The Outputting Unit 108

The outputting unit 108 receives information from the key revocation data generating unit 106 and prepares a key revocation data storing unit 201 into which the received information is to be written, within the recording medium 200a, and writes the received information into the prepared key revocation data storing unit 201.

1.3 The Recording Medium 200

The recording medium 200 is a recordable medium such as a DVD-RAM and has no information recorded thereon in an initial state.

Figure 13:
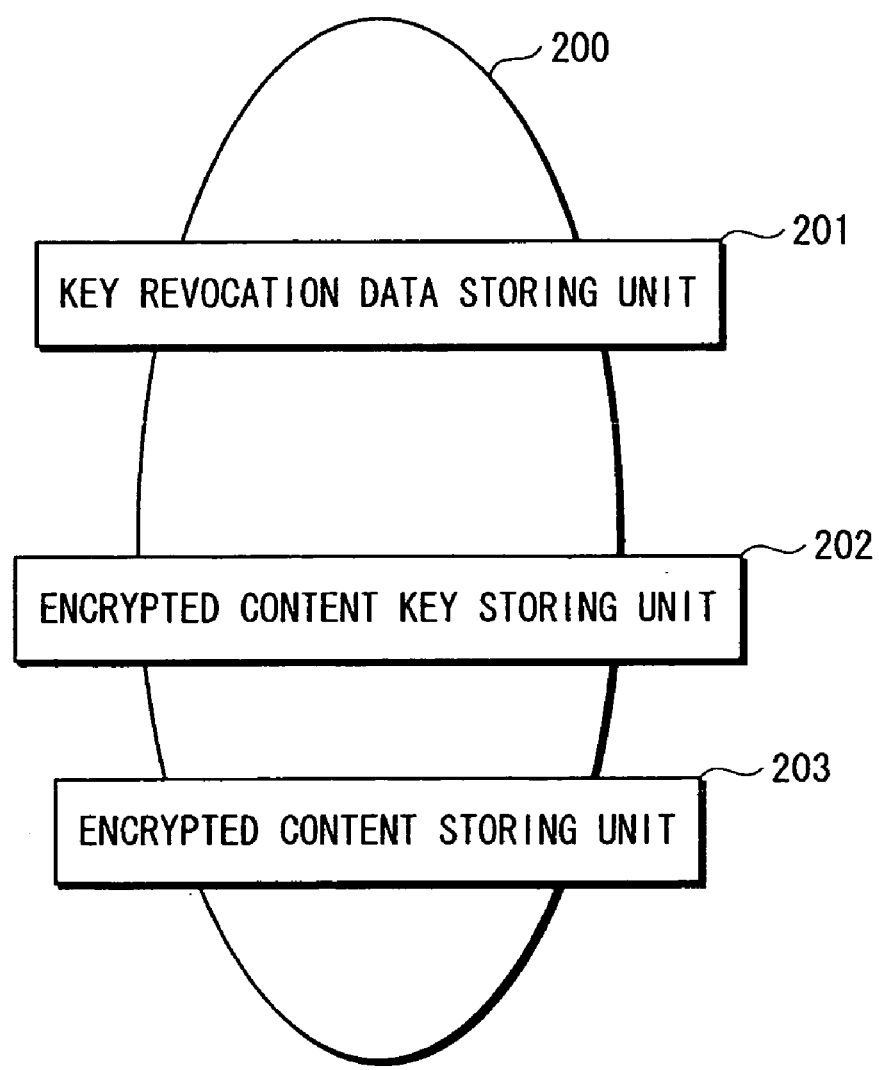
FIG. 13 is a block diagram that shows the configuration of a recording medium 200.

In the recording medium 200, as shown in FIG. 13, the key revocation data storing unit 201 is prepared after the key revocation data generating unit 106 of the key management apparatus 100 finishes the operation. Further, the encrypted content key storing unit 202 and the encrypted content storing unit 203 are prepared as a result of an operation performed by the recording apparatus 300, to be described later.

(1) The Key Revocation Data Storing Unit 201

The key revocation data storing unit 201 is an area to be prepared first in a recording medium 200a on which no information has not been recorded yet, as a result of the operation performed by the key revocation data generating unit 106 of the key management apparatus 100.

Into the key revocation data storing unit 201, one or more pieces of key revocation data, i.e. one or more groups each being made up of an encrypted media key and a subset in correspondence with the encrypted media key are stored.

It should be noted that, as mentioned above, a recording medium 200 on which one or more pieces of key revocation data have been recorded will be referred to as a recording medium 200b.

(2) The Encrypted Content Key Storing Unit 202 and the Encrypted Content Storing Unit 203

The encrypted content key storing unit 202 and the encrypted content storing unit 203 are prepared in a recording medium in the form of a recording medium 200b, as a result of the operation performed by the recording apparatus 300.

Into the encrypted content storing unit 203, an encrypted content is recorded, which is obtained by encrypting a content with a common key encryption algorithm (for example, DES), using a content key.

Into the encrypted content key storing unit 202, an encrypted content key is recorded, which is obtained by encrypting a content key with a common key encryption algorithm (for example, DES) using a media key.

1.4 The Recording Apparatus 300

Since the recording apparatuses 300a, 300b, . . . and 300c have a configuration in common, explanation will be provided for the recording apparatus 300.

Figure 14:
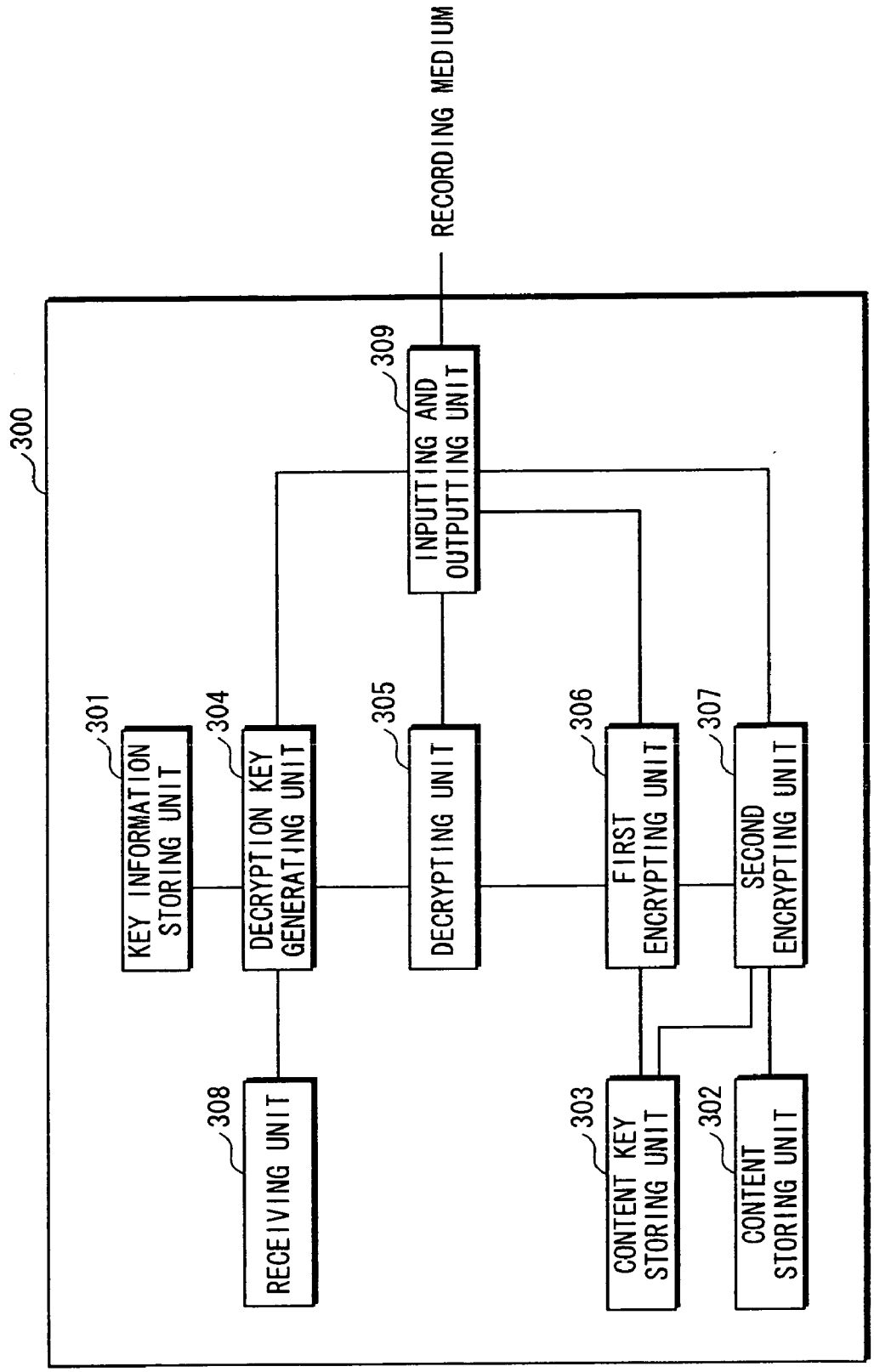
FIG. 14 is a block diagram that shows the configuration of a recording apparatus 300.

The recording apparatus 300 comprises, as shown in FIG. 14, a key information storing unit 301, a content storing unit 302, a content key storing unit 303, a decryption key generating unit 304, a decrypting unit 305, a first encrypting unit 306, a second encrypting unit 307, a receiving unit 308, and an inputting and outputting unit 309.

The recording apparatus 300 is specifically a computer system that is constituted with a microprocessor, a ROM, a RAM, a hard disk unit, and the like. A computer program is stored in the RAM or the hard disk unit. As the microprocessor operates according to the computer program, the recording apparatus 300 achieves its functions.

The recording apparatus 300 pre-stores therein an apparatus identifier for identifying the recording apparatus 300.

It should be noted that in the following description, it is assumed that a recording medium 200b is mounted on the recording apparatus 300.

(1) The Key Information Storing Unit 301

The key information storing unit 301 pre-stores therein the one or more pieces of key information and the interrelation table D101 that have been distributed by the key management apparatus 100.

For example, in the case where the recording apparatus 300 pre-stores therein the apparatus identifier 1, the key information storing unit 301 stores therein four pieces of key information stored in the apparatus 1, shown in FIG. 12. In the case where the recording apparatus 300 pre-stores therein the apparatus identifier 2, the key information storing unit 301 stores therein five pieces of key information stored in the apparatus 2, shown in FIG. 12.

(2) The Content Storing Unit 302

The content storing unit 302 pre-stores therein a content being made up of video information and audio information.

(3) The Content Key Storing Unit 303

The content key storing unit 303 stores therein a content key for encrypting the content stored in the content storing unit 302.

(4) The Decryption Key Generating Unit 304

The decryption key generating unit 304 pre-stores therein a pseudo random number generator G151 that is identical to the pseudo random number generator G150 included in the information generating unit 103 in the key management apparatus 100. Since the pseudo random number generator G151 is identical to the pseudo random number generator G150, explanation will be omitted.

Having received a recording instruction for recording an encrypted content onto the recording medium 200b from the receiving unit 308, the decryption key generating unit 304 reads one subset (hereafter, referred to as a reference subset) out of the subsets that are respectively in correspondence with the one or more encrypted media keys recorded on the recording medium 200b, via the inputting and outputting unit 309 from the recording medium 200b mounted on the recording apparatus 300.

The decryption key generating unit 304 reads the interrelation table D101 and one or more pieces of key information from the key information storing unit 301.

Using the interrelation table D101, the decryption key generating unit 304 searches the subsets contained in the read pieces of key information for a subset having a path that reaches the reference subset.

As a result of the search, in the case where a subset (hereafter referred to as a detected subset) having a path that reaches the reference subset has been detected out of the subsets contained in the read pieces of key information, the decryption key generating unit 304 obtains a device key that serves as a decryption key for an encrypted media key, through the device key obtainment operation to be described later, and outputs the obtained device key and the reference subset to the decrypting unit 305. Here, in the case where a subset that matches the reference subset is included in the subsets contained in the read pieces of key information, the decryption key generating unit 304 detects the matching subset as a detected subset.

In the case where no detected subunit has been detected as a result of the search, the decryption key generating unit 304 judges whether or not any unread reference subunits exist on the recording medium 200b. When the judgment result is that one or more unread reference subunits exist, the decryption key generating unit 304 reads one reference subunit out of the unread reference subunits and searches for a detected subunit. When the judgment result is that noun read reference subunit exists on the recording medium 200b, the decryption key generating unit 304 finishes the operation of recording encrypted contents.

<Device Key Obtainment Operation>

The decryption key generating unit 304 obtains a label having X bits from a piece of key information containing the detected subset.

The decryption key generating unit 304 obtains the number Z of the nodes existing on a path from the detected subset to the reference subset. The decryption key generating unit 304 uses the pseudorandom number generator G151 Z times in the following manner:

The decryption key generating unit 304 uses the obtained label as an input value to the pseudo random generator 151G so as to generate and obtain an output of a random number having 3X bits. The decryption key generating unit 304 judges whether or not a next node (i.e. a child node) of a subset corresponding to the label used as the input value exists on a path from the detected subset to the reference subset. In the case where the judgment result is that the next node exists, the decryption key generating unit 304 judges whether the next node is a left child node or a right child node. In the case where the judgment result is that it is a left child node, the decryption key generating unit 304 divides the obtained 3X bits into every X bits to obtain a left label and takes the obtained left label as a next value to be inputted to the pseudo random number generator G151. In the case where the judgment result is that it is a right child node, the decryption key generating unit 304 divides the obtained 3X bits into every X bits to obtain a right label and takes the obtained right label as a next value to be inputted to the pseudo random number generator G151. In the case where the judgment result is that no next node exists, in other words, that the subset corresponding to the label used as the input value is the reference subset, no right and left labels are obtained.

By using the pseudo random number G151 Z times, the decryption key generating unit 304 is able to generate and obtain a 3X-bit random number, which is an output value of the pseudo random number generator G151 in response to an input value being a label corresponding to the reference subset.

The decryption key generating unit 304 divides a 3X-bit random number obtained in the Z'th time into every X bits, and takes X bits positioned in the second place from the left as a device key to be used in decryption of an encrypted media key.

<Specific Example of Device Key Obtainment>

Figure 15:
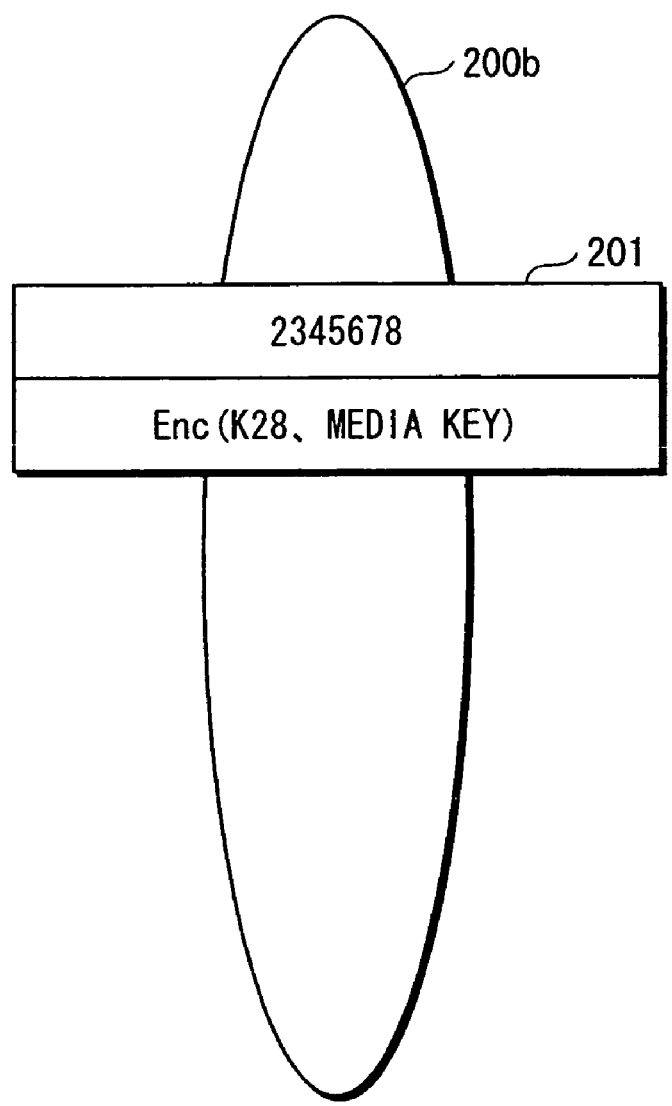
FIG. 15 shows a recording medium 200b on which only key revocation data is recorded.

Here, as specific examples of device key obtainment, description will be provided for the cases where the recording apparatus 300 has the apparatus identifier 1, where the recording apparatus 300 has the apparatus identifier 2, and where the recording apparatus 300 has the apparatus identifier 3. In these situations, the recording medium 200b stores, as shown in FIG. 15, a subset "2345678" and an encrypted media key (K28, media key) in the key revocation data storing unit 201.

In the case where the recording apparatus 300 has the apparatus identifier 1, no path exists that extends from the subsets contained in the four pieces of key information being stored and reaches the subset "2345678"; therefore, the decryption key generating unit 304 is not able to generate a device key for decrypting the encrypted media key.

In the case where the recording apparatus 300 has the apparatus identifier 2, a subset "2345678" is detected as a subset having a path that extends from the subsets contained in the five stored pieces of key information and reaches the reference subset "2345678", and the detected subset "2345678" is taken as a detected subset. The decryption key generating unit 304 obtains a label "A5RLRRR" from the key information containing the detected subset. Further, the decryption key generating unit 304 obtains the number Z=1 of the nodes existing from the detected subset to the reference subset. The decryption key generating unit 304 uses, with an input of the obtained label "A5RLRRR", the pseudo random generator G151 Z=1 time so as to generate and obtain a 3X-bit random number. The decryption key generating unit 304 divides the obtained 3X-bit random number into every X bits and takes the X bits positioned in the second place from the left as a device key "K28" to be used in decryption of the encrypted media key.

In the case where the recording apparatus 300 has the apparatus identifier 3, a subset "345678" is detected as a subset having a path that extends from the subsets contained in the four stored pieces of key information and reaches the reference subset "2345678", and the detected subset "345678" is taken as a detected subset. The decryption key generating unit 304 obtains a label "A5RLRR" from the key information containing the detected subset. Further, the decryption key generating unit 304 obtains the number Z=2 of the nodes existing from the detected subset to the reference subset. The decryption key generating unit 304 uses the pseudo random number generator G151 Z=2 times and obtains the device key "K28" in the following manner.

Firstly, the decryption key generating unit 304 uses the obtained label "A5RLRR" as an input value to the pseudo random number generator 151G so as to generate and obtain an output of a 3X-bit random number "A5RLRRL∥K24∥A5RLRRR". The decryption key generating unit 304 judges whether the subset "2345678" being a child node of the subset "345678" corresponding to the label used as the input value is a left child node or a right child node. In this case, the judgment result is that it is a right child node, and takes the obtained right label "A5RLRRR" as a next value to be inputted to the pseudo random generator G151. The decryption key generating unit 304 uses the obtained label "A5RLRRR" as an input value to the pseudo random number generator 151G so as to generate and obtain an output of a 3X-bit random number "A5RLRRRL∥K28∥A5RLRRRR". The decryption key generating unit 304 divides the obtained 3X-bit random number into every X bits, and takes the X bits positioned in the second place from the left as a device key "K28" to be used for decryption of the encrypted media key.

(5) The Decrypting Unit 305

The decrypting unit 305 has a common key encryption algorithm that is the same as the common key encryption algorithm used for generation of the encrypted media key.

Having received a device key and a reference subset from the decryption key generating unit 304, the decrypting unit 305 reads an encrypted media key that corresponds to the received reference subset from the key revocation data storing unit 201 of the recording medium 200b, via the inputting and outputting unit 309.

The decrypting unit 305 decrypts the read encrypted media key with the common key encryption algorithm using the received device key, so as to generate a media key, and outputs the generated media key to the first encrypting unit 306.

(6) The First Encrypting Unit 306

The first encrypting unit 306 has a common key encryption algorithm (for example, DES).

The first encrypting unit 306 receives a media key from the decrypting unit 305 and reads a content key from the content key storing unit 303.

The first encrypting unit 306 encrypts the read content key with the common key encryption algorithm using the media key so as to generate an encrypted content key Enc (media key, content key), and writes the generated encrypted content key into the encrypted content key storing unit 202 of the recording medium 200b, via the inputting and outputting unit 309.

Further, the first encrypting unit 306 outputs an encryption instruction to instruct the second encrypting unit 307 to encrypt the content.

(7) The Second Encrypting Unit 307

The second encrypting unit 307 has a common key encryption algorithm (for example, DES).

The second encrypting unit 307 receives the encryption instruction from the first encrypting unit 306 and reads a content key from the content key storing unit 303 and a content from the content storing unit 302.

The second encrypting unit 307 encrypts the read content with the common key encryption algorithm using the read content key so as to generate an encrypted content Enc (content key, content), and writes the generated encrypted content into the encrypted content storing unit 203 of the recording medium 200b via the inputting and outputting unit 309.

It should be noted that as the first encrypting unit 306 and the second encrypting unit 307 write the information on to the recording medium 200b, a recording medium 200c has been generated.

(8) The Receiving Unit 308

The receiving unit 308 receives a recording instruction as a result of a user operation and outputs the received recording instruction to the decryption key generating unit 304.

(9) The Inputting and Outputting Unit 309

The inputting and outputting unit 309 reads a reference subset from the key revocation data storing unit 201 of the recording medium 200b and outputs the read reference subset to the decryption key generating unit 304.

The inputting and outputting unit 309 reads an encrypted media key that corresponds to the reference subset from the key revocation data storing unit 201 of the recording medium 200b and outputs the read encrypted media key to the decrypting unit 305.

The inputting and outputting unit 309 receives an encrypted content key from the first encrypting unit 306 and prepares the encrypted content key storing unit 202 in the recording medium 200b into which the received encrypted content key is to be written, and writes the received encrypted content key into the prepared encrypted content key storing unit 202.

The inputting and outputting unit 309 receives an encrypted content from the second encrypting unit 307 and prepares the encrypted content storing unit 203 in the recording medium 200b into which the received encrypted content is to be written, and writes the received encrypted content into the prepared encrypted content storing nit 203.

1.5 The Playback Apparatus 400

Since the playback apparatuses 400a, 400b, . . . and 400c have a configuration in common, explanation will be provided for a playback apparatus 400.

Figure 16:
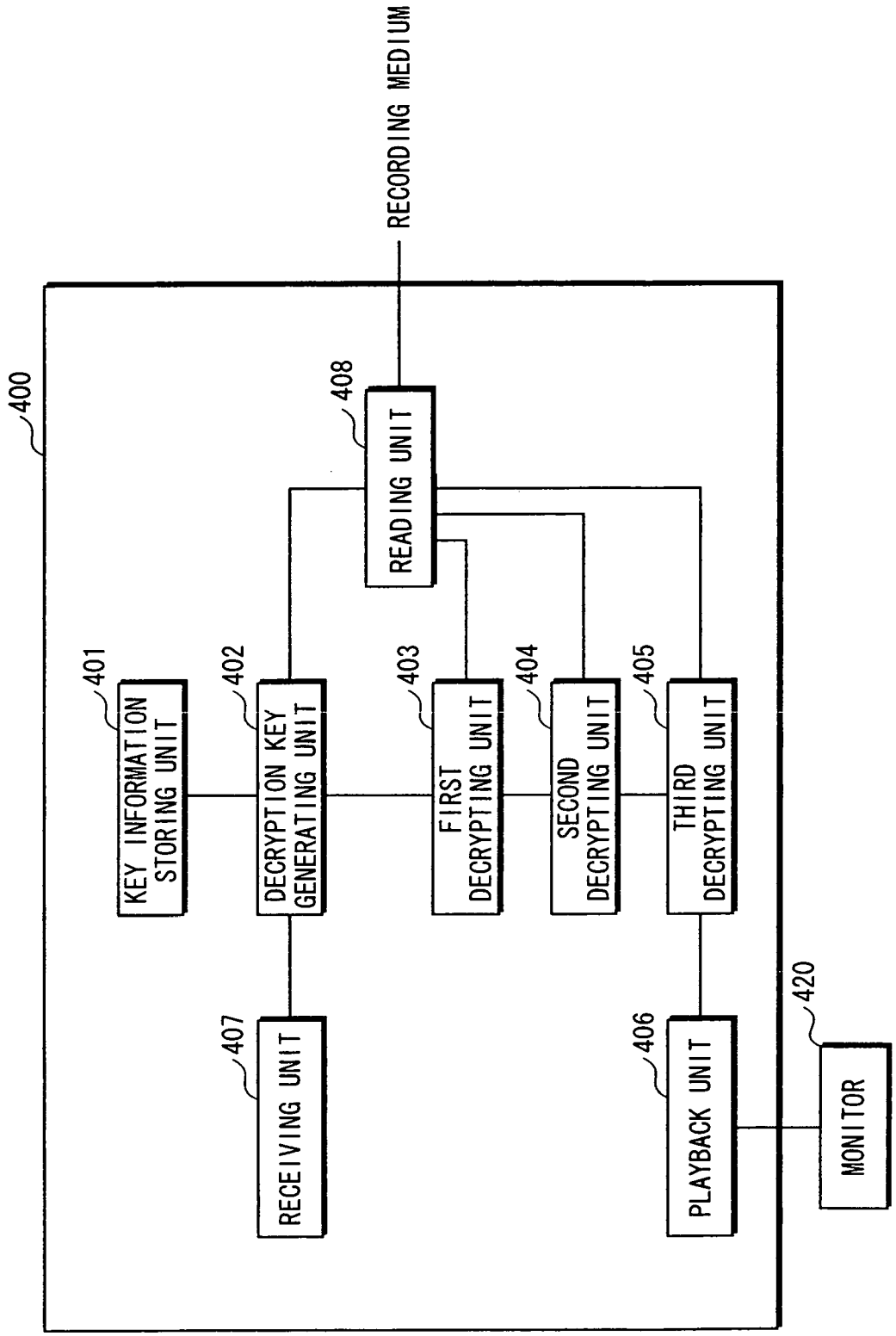
FIG. 16 is a block diagram that shows the configuration of a playback apparatus 400.

The recording apparatus 400 comprises, as shown in FIG. 16, a key information storing unit 401, a decryption key generating unit 402, a first decrypting unit 403, a second decrypting unit 404, a third decrypting unit 405, a playback unit 406, a receiving unit 407, and a reading unit 408.

The playback apparatus 400 is specifically a computer system that is constituted with a microprocessor, a ROM, a RAM, a hard disk unit, and the like. A computer program is stored in the RAM or the hard disk unit. As the microprocessor operates according to the computer program, the playback apparatus 400 achieves its functions.

The playback apparatus 400 pre-stores therein an apparatus identifier for identifying the playback apparatus 400.

It should be noted that in the following description, it is assumed that a recording medium 200c is mounted on the playback apparatus 400.

(1) The Key Information Storing Unit 401

The key information storing unit 401 pre-stores therein the one or more pieces of key information and the interrelation table D101 that have been distributed by the key management apparatus 100.

For example, in the case where the playback apparatus 400 pre-stores therein the apparatus identifier 5, the key information storing unit 401 stores therein four pieces of key information stored in the apparatus 5, that are shown in FIG. 12. In the case where the recording apparatus 400 pre-stores therein the apparatus identifier 6, the key information storing unit 401 stores therein five pieces of key information stored in the apparatus 6, that are shown in FIG. 12.

(2) The Decryption Key Generating Unit 402

The decryption key generating unit 402 pre-stores therein a pseudo random number generator G152 that is identical to the pseudo random number generator G150 included in the information generating unit 103 in the key management apparatus 100. Since the pseudo random number generator G152 is identical to the pseudo random number generator G150, explanation will be omitted.

Having received a playback instruction for playing back a content from the receiving unit 308, the decryption key generating unit 402 reads a reference subset out of the subsets that are respectively in correspondence with the one or more encrypted media keys recorded on the recording medium 200c, via the reading unit 408 from the recording medium 200c mounted on the playback apparatus 400.

The decryption key generating unit 402 reads the interrelation table D101 and one or more pieces of key information from the key information storing unit 401.

Using the interrelation table D101, the decryption key generating unit 402 searches the subsets contained in the read pieces of key information for a detected subset having a path that reaches the reference subset.

As a result of the search, in the case where a detected subset has been detected out of the subsets contained in the read pieces of key information, the decryption key generating unit 402 obtains a device key that serves as a decryption key for an encrypted media key, through the device key obtainment operation and outputs the obtained device key and the reference subset to the first decrypting unit 403.

In the case where no detected subunit has been detected as a result of the search, the decryption key generating unit 402 judges whether or not any unread reference subunits exist on the recording medium 200c. When the judgment result is that one or more unread reference subunits exist, the decryption key generating unit 402 reads one reference subunit out of the unread reference subunits and searches for a detected subunit. When the judgment result is that no unread reference subunit exists on the recording medium 200c, the decryption key generating unit 402 finishes the operation of playing back contents.

It should be noted that since the device key obtainment operation is the same as the obtainment operation performed by the decryption key generating unit 304 of the recording apparatus 300, explanation will be omitted.

<Specific Example of Device Key Obtainment>

Figure 17:
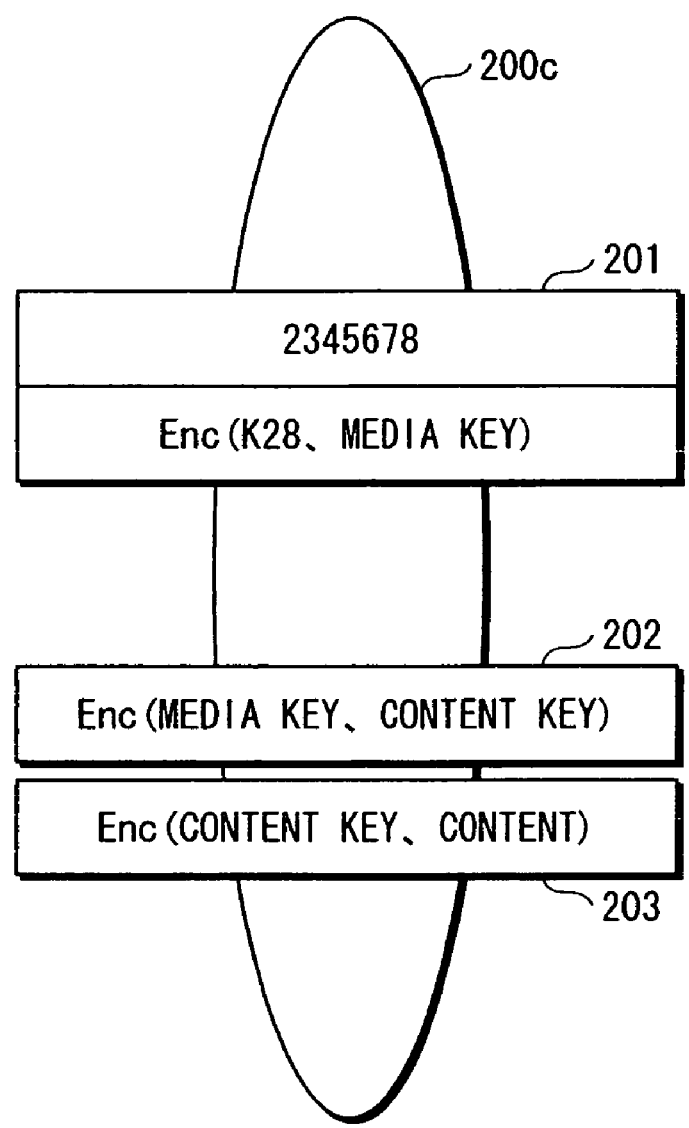
FIG. 17 is a recording medium 200c on which key revocation data, an encrypted content key, and an encrypted content are recorded.

Here, as specific examples of device key obtainment, description will be provided for the cases where the playback apparatus 400 has the apparatus identifier 1 and where the playback apparatus 400 has the apparatus identifier 7. In these situations, the recording medium 200c stores, as shown in FIG. 17, a subset "2345678" and an encrypted media key (K28, media key) in the key revocation data storing unit 201; an encrypted content key Enc (media key, content key) in the encrypted content key storing unit 202; and an encrypted content Enc (content key, content) in the encrypted content storing unit 203.

In the case where the playback apparatus 400 has the apparatus identifier 1, no path exists that extends from the subsets contained in the four pieces of key information being stored and reaches the reference subset "2345678"; therefore, the decryption key generating unit 402 is not able to generate a device key for decrypting the encrypted media key.

In the case where the playback apparatus 400 has the apparatus identifier 7, a detected subset "567" is detected from the subsets contained in the five stored pieces of key information, and a label "A5RL" is obtained from the piece of key information containing the detected subset. The decryption key generating unit 402 obtains the device key "K28" using the pseudo random number generator G152 and the obtained label "A5RL".

(3) The First Decrypting Unit 403

The first decrypting unit 403 has a common key encryption algorithm that is the same as the common key encryption algorithm used for generation of the encrypted media key.

Having received a device key and a reference subset from the decryption key generating unit 402, the first decrypting unit 403 reads an encrypted media key that corresponds to the received reference subset from the key revocation data storing unit 201 of the recording medium 200c, via the reading unit 408.

The first decrypting unit 403 decrypts the read encrypted media key with the common key encryption algorithm using the received device key, so as to generate a media key, and outputs the generated media key to the second decrypting unit 404.

(4) The Second Decrypting Unit 404

The second decrypting unit 404 has a common key encryption algorithm that is the same as the common key encryption algorithm used for generation of the encrypted content key.

Having received a media key from the first decrypting unit 403, the second decrypting unit 404 reads an encrypted content key from the encrypted content key storing unit 202 of the recording medium 200c, via the reading unit 408.

The second decrypting unit 404 decrypts the read encrypted content key with the common key encryption algorithm using the received media key, so as to generate a content key, and outputs the generated content key to the third decrypting unit 405.

(5) The Third Decrypting Unit 405

The third decrypting unit 405 has a common key encryption algorithm that is the same as the common key encryption algorithm used for generation of the encrypted content.

Having received a content key from the second decrypting unit 404, the third decrypting unit 405 reads an encrypted content from the encrypted content storing unit 203 of the recording medium 200c, via the reading unit 408.

The third decrypting unit 405 decrypts the read encrypted content with the common key encryption algorithm using the received content key, so as to generate a content, and outputs the generated content to the playback unit 406.

(6) The Playback Unit 406

The playback unit 406 receives a content DCNT from the third decrypting unit 405, generates video information and audio information from the received content, converts the generated video and audio information into analog video signals and analog audio signals, and outputs the analog video and audio signals to the monitor 420.

(7) The Receiving Unit 407

The receiving unit 407 receives a playback instruction as a result of a user operation and outputs the received playback instruction to the decryption key generating unit 402.

(8) The Reading Unit 408

The reading unit 408 reads a reference subset from the key revocation data storing unit 201 of the recording medium 200c and outputs the read reference subset to the decryption key generating unit 402.

The reading unit 408 reads an encrypted media key that is in correspondence with the reference subset from the key revocation data storing unit 201 of the recording medium 200c and outputs the read encrypted media key to the first decrypting unit 403.

The reading unit 408 reads an encrypted content key from the encrypted content key storing unit 202 of the recording medium 200c and outputs the read encrypted content key to the second decrypting unit 404.

The reading unit 408 reads an encrypted content from the encrypted content storing unit 203 of the recording medium 200c and outputs the read encrypted content to the third decrypting unit 405.

(9) Monitor 420

The monitor 420 including a CRT and a speaker receives the analog video and audio signals from the playback unit 406, displays video based on the video signals and outputs audio based on the audio signals.

1.6 The Operation of the Key Management Apparatus 100

The following explains the operations performed by the key management apparatus 100 when having received a generation instruction, when distributing key information and when generating key revocation data.

(1) Outline of the Operation in the Generation Processing

Figure 18:
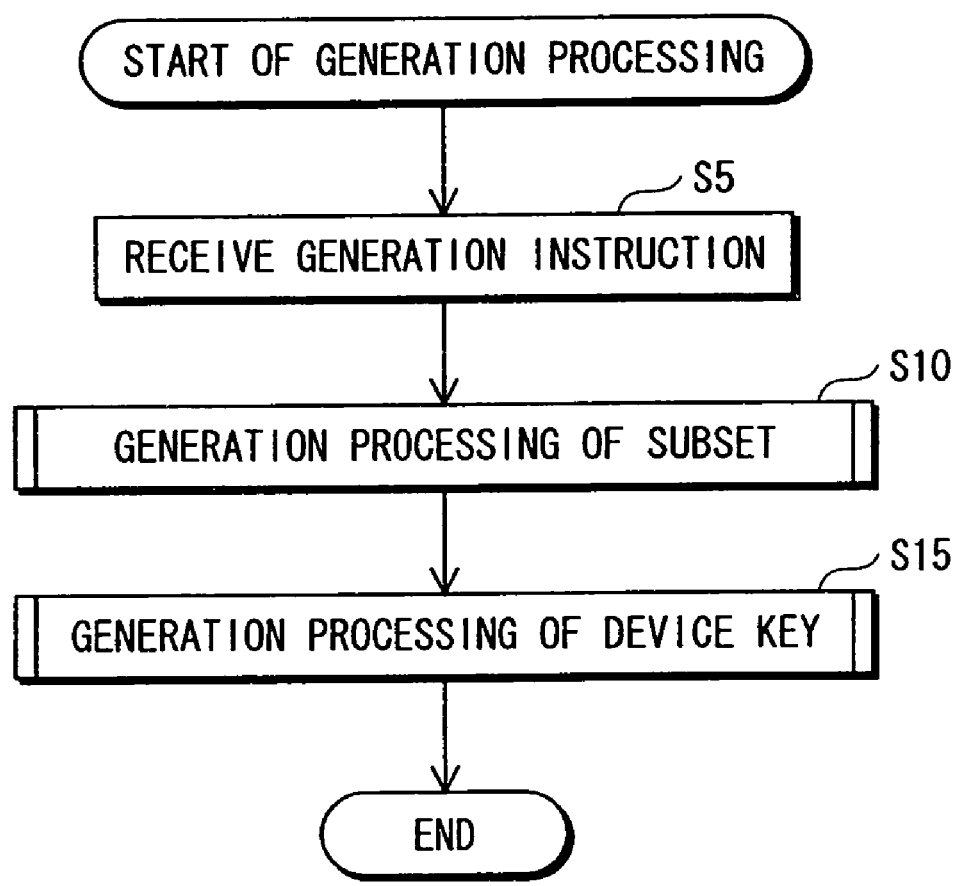
FIG. 18 is a flow chart that shows the scheme of the operation in generation processing.

The following describes the outline of the operation performed when the key management apparatus 100 has received a generation instruction, with reference to the flow chart in FIG. 18.

Having received a generation instruction from the receiving unit 107 (Step S5), the information generating unit 103 of the key management apparatus 100 performs a subset generation processing and generates a device key table D100a on which one or more subsets are recorded (Step S10).

Subsequently, the information generating unit 103 performs a device key generation processing and generates a device key table D100 and an interrelation table D101 (Step S15).

(2) The Operation in the Subset Generation Processing

Figure 19:
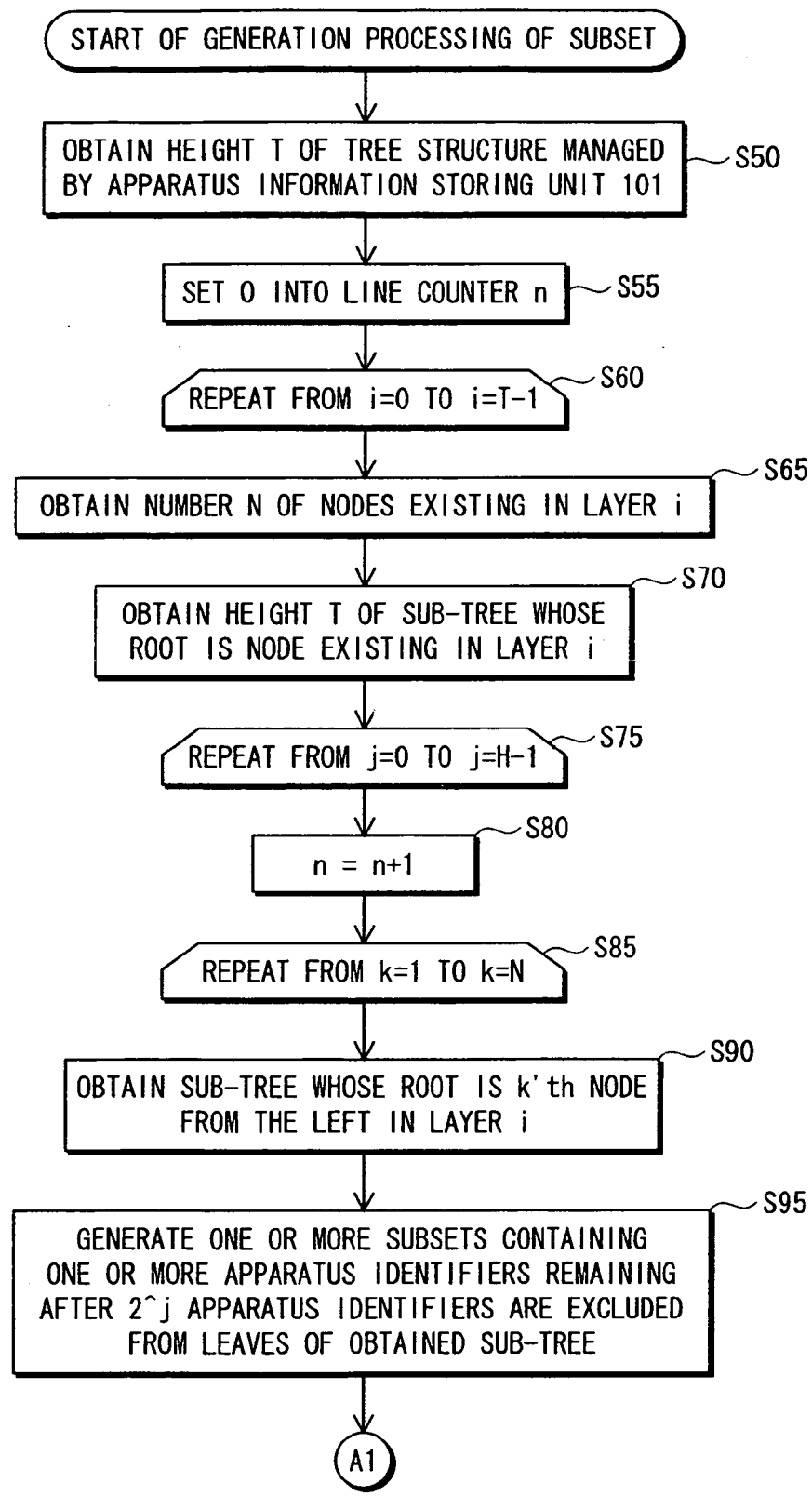
FIG. 19 is a flow chart that shows generation processing of a subset and is continued to FIG. 20.
Figure 20:
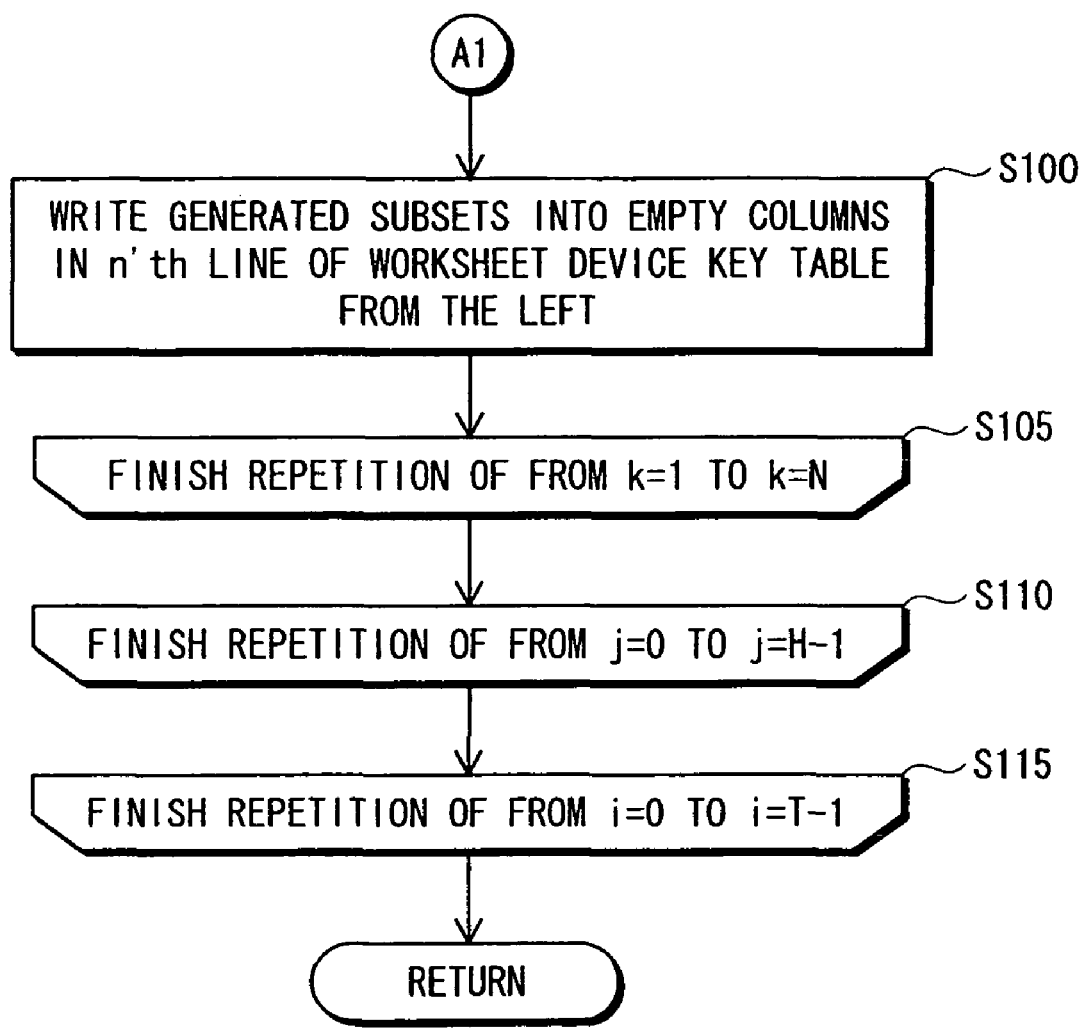
FIG. 20 is a flow chart that shows generation processing of a subset and is continued from FIG. 19.
Figure 21:
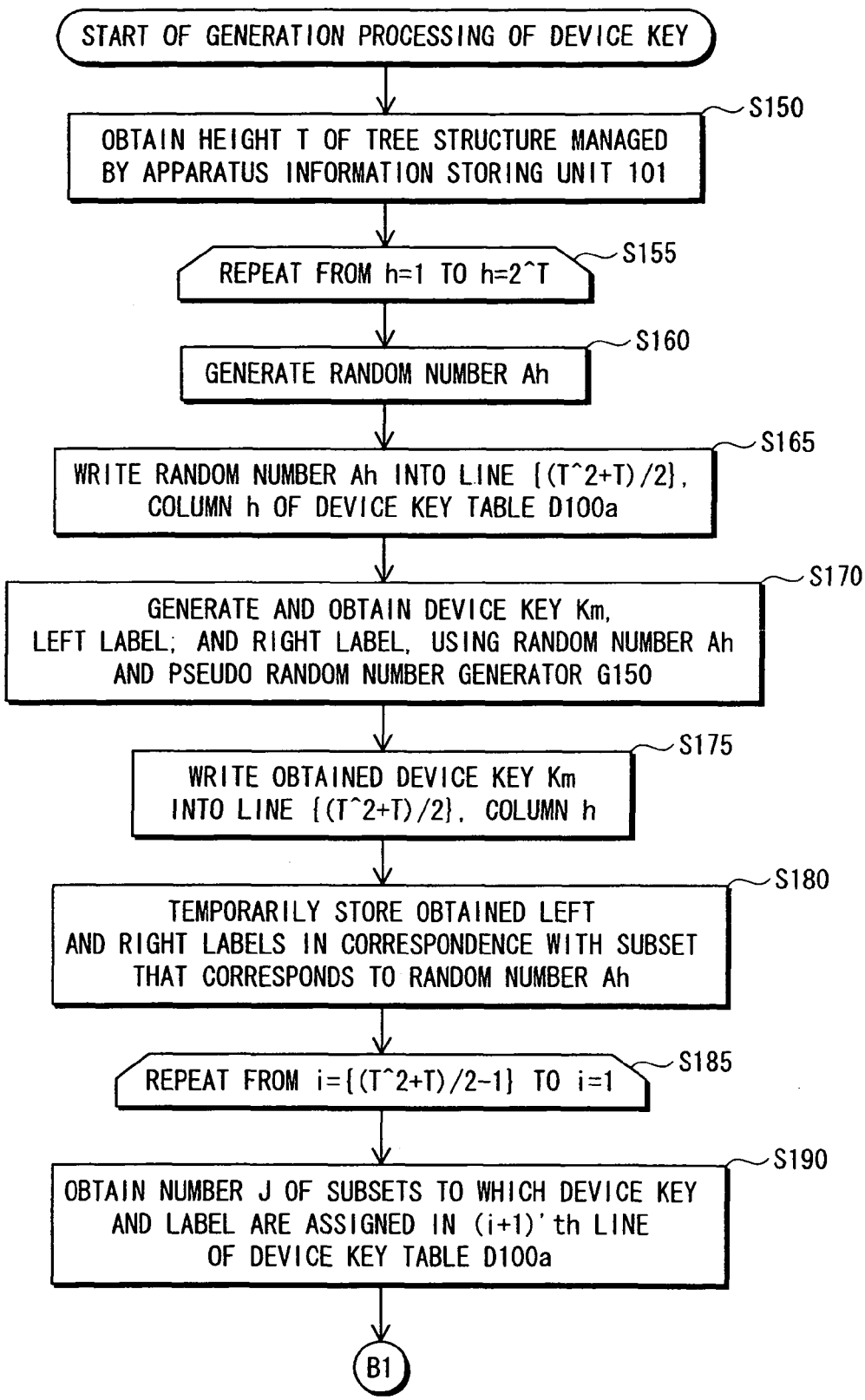
FIG. 21 is a flow chart that shows generation processing of a device key and is continued to FIG. 22.
Figure 22:
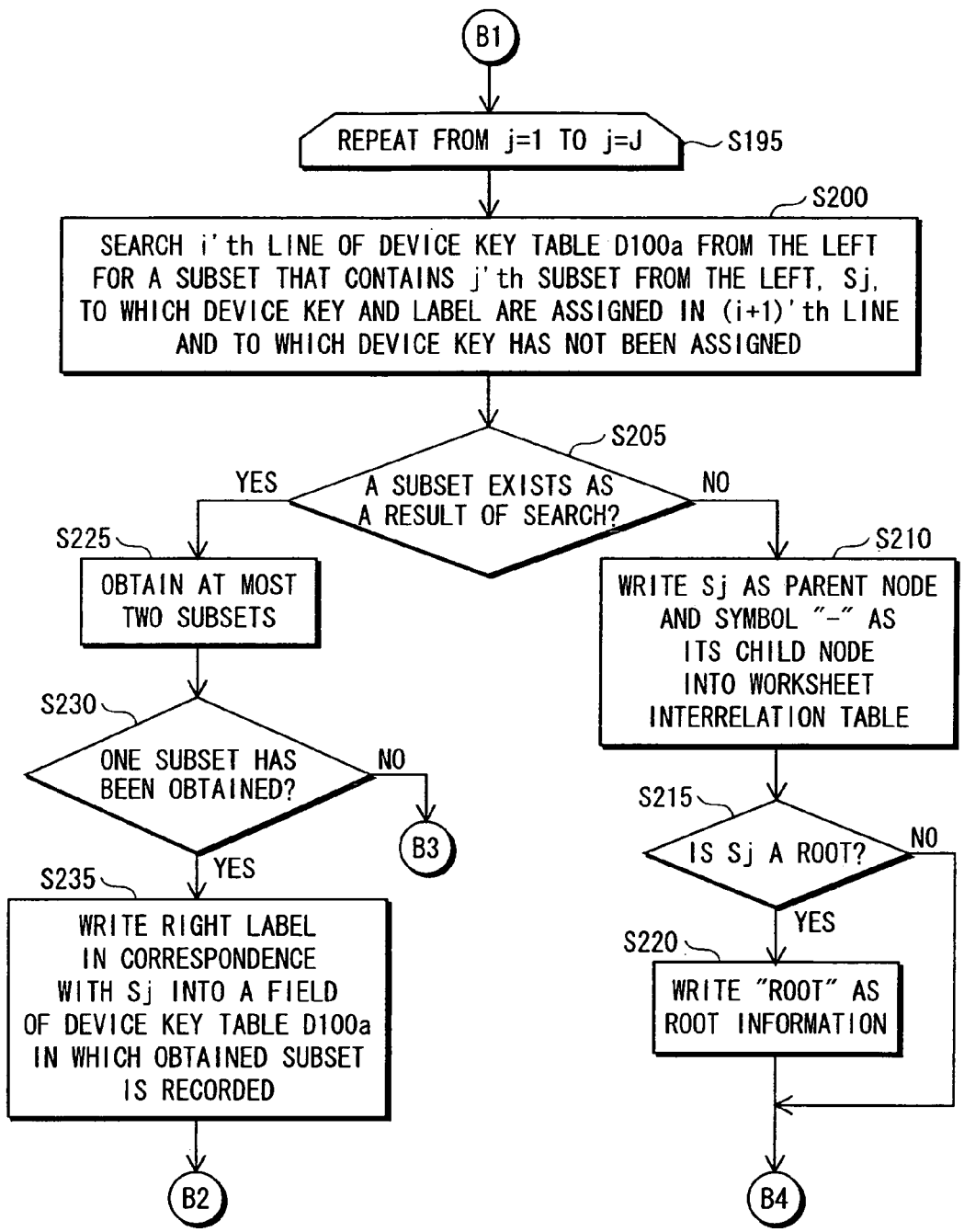
FIG. 22 is a flow chart that shows generation processing of a device key and is continued from FIG. 21 and continued to FIG. 23.
Figure 23:
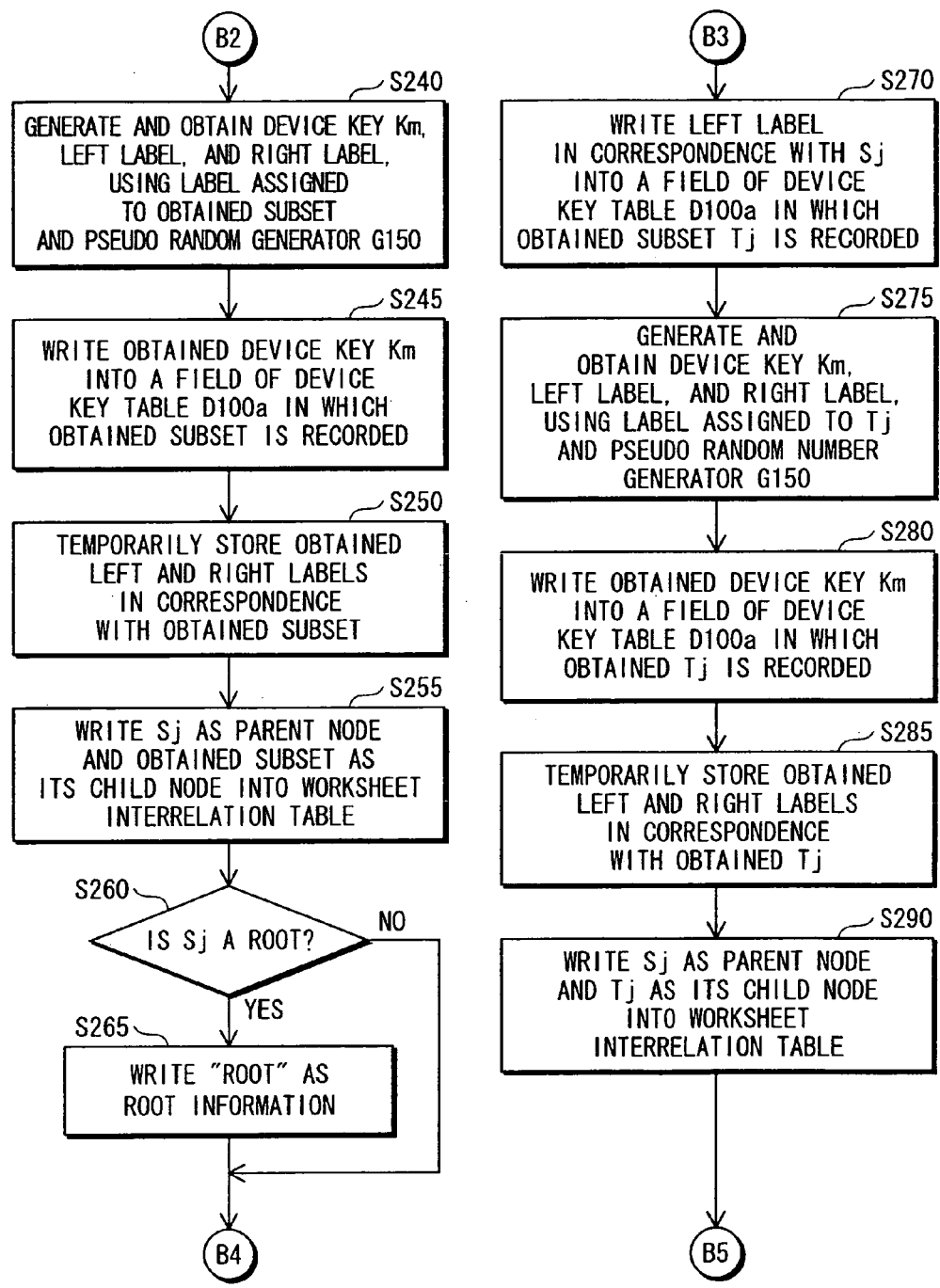
FIG. 23 is a flow chart that shows generation processing of a device key and is continued from FIG. 22 and continued to FIG. 24.
Figure 24:
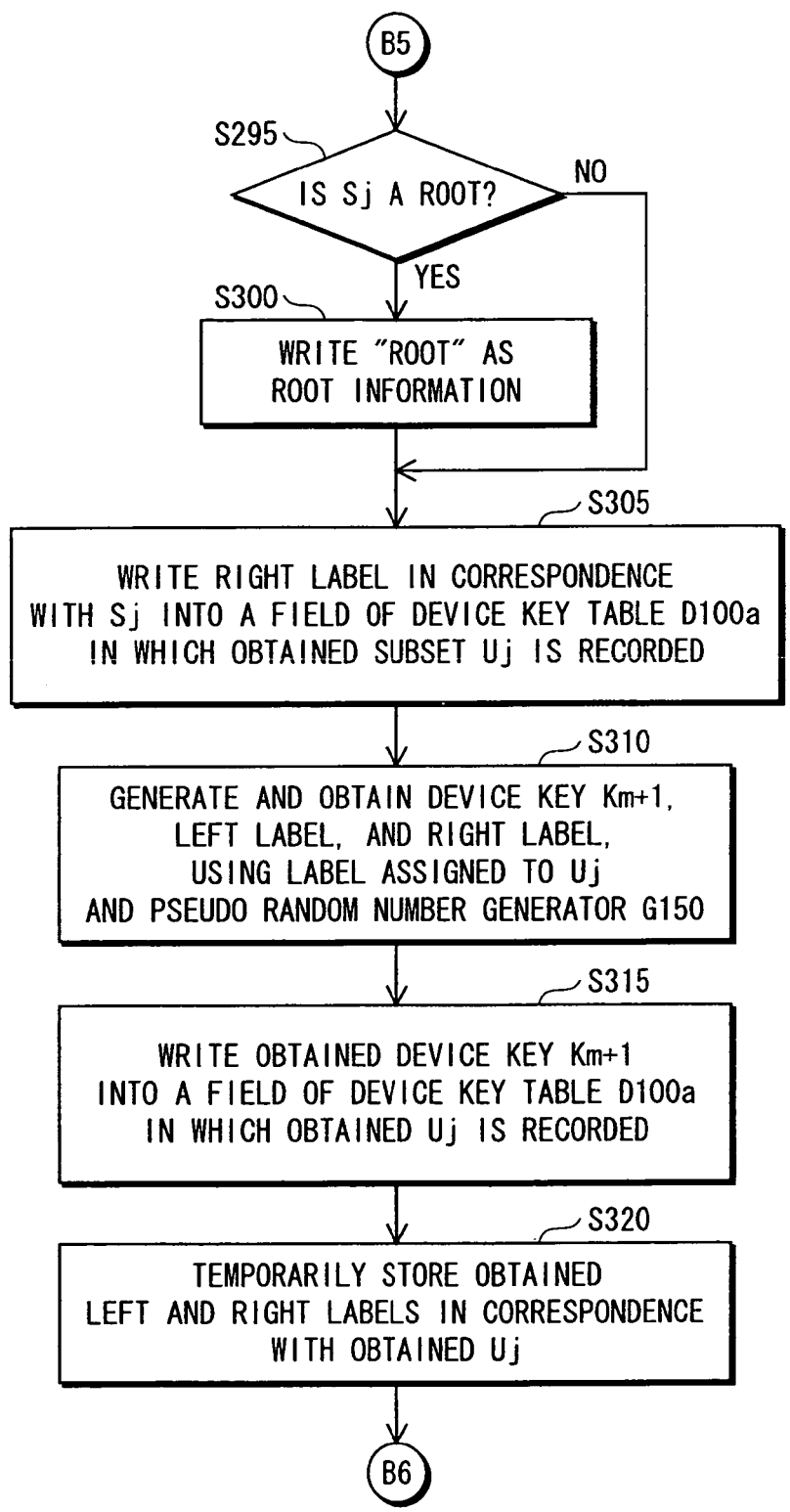
FIG. 24 is a flow chart that shows generation processing of a device key and is continued from FIG. 23 and continued to FIG. 25.
Figure 25:
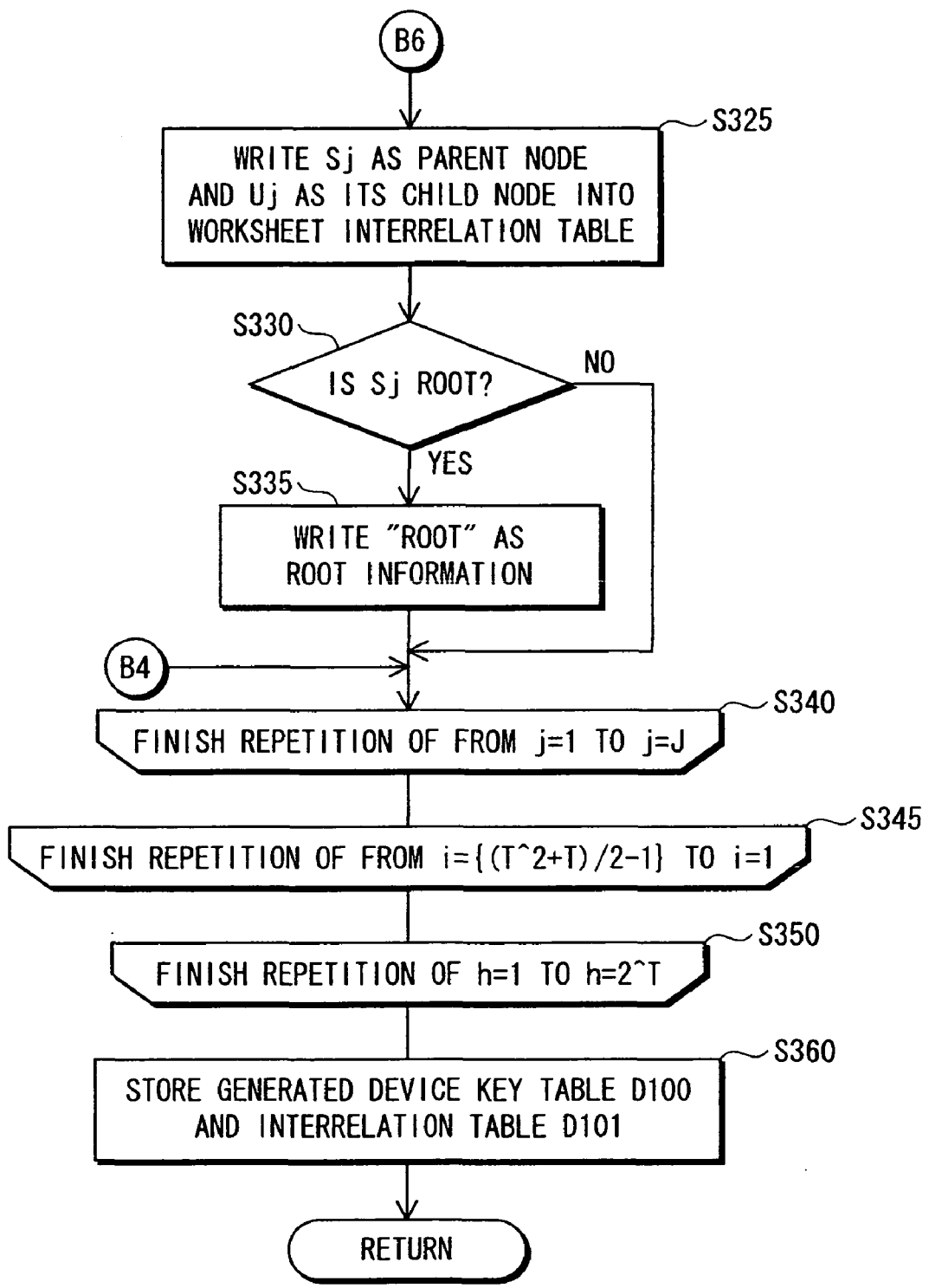
FIG. 25 is a flow chart that shows generation processing of a device key and is continued from FIG. 24.

The following describes the operation in the subset generation processing with reference to the flow chart shown in FIGS. 19 and 20.

The information generating unit 103 obtains a height T of the tree structure managed by the apparatus information storing unit 101 (Step S50) and sets an initial value 0 into a line counter n of the worksheet device key table (Step S55).

The information generating unit 103 repeats Step S65 through Step S110 from i=0 to i=T−1.

The information generating unit 103 obtains the number N of the nodes existing in the layer i (Step S65). Then, the information generating unit 103 obtains a height H of a sub-tree whose root is a node existing in the layer i (Step S70).

The information generating unit 103 repeats Step S80 through Step S105 from j=0 to j=H−1.

The information generating unit 103 adds 1 to the line counter n and the result of the addition is now taken as n (Step S80).

Then, the information generating unit 103 repeats Step S90 through Step S100 from k=1 to k=N.

The information generating unit 103 obtains a sub-tree whose root is a k'th node from the left in the layer i (Step S90), and generates one or more subsets each being made up of one or more terminal identifiers that remain after $2^j$ terminal identifiers are excluded from the leaves of the obtained sub-tree (Step S95). It should be noted that, in the case where a plurality of apparatuses are excluded (i.e. in the case where a plurality of revoked apparatus identifiers are excluded), only such a group of revoked apparatus identifiers is excluded together for which there exists an upper node (i) being in common to all the revoked apparatuses in the group and also (ii) to which no unrevoked apparatus identifiers belong.

The information generating unit 103 sequentially writes the generated subsets into empty columns starting from the left in the n'th line of the worksheet device key table (Step S100).

(3) The Operation in the Device Key Generation Processing

The following describes the operation in the device key generation processing with reference to the flow chart in FIGS. 21 through 25.

The information generating unit 103 obtains a height T of a tree structure managed by the apparatus information storing unit 101 (Step S150).

The information generating unit 103 repeats Step S160 through Step S345 from h=1 to h=$2^T$.

The information generating unit 103 generates a random number Ah having X bits (Step S160), and writes the generated random number Ah into the line $\{(T^2+T)/2\}$, the column h of the device key table D100a (Step S165).

The information generating unit 103 inputs the assigned label, i.e. the random number Ah to the pseudo random number generator G as an inputted value, and obtains as an output a device key "Km", a left label, and a right label (Step S170).

The information generating unit 103 writes the obtained device key "Km" into the line $\{(T^2+T)/2\}$, the column h of the device key table D100a (Step S175). The information generating unit 103 brings the left label and the right label into correspondence with a subset for the label (i.e. the random number Ah) inputted to the pseudo random generator G and temporarily stores the left and right labels (Step S180). It should be noted that the letter "m" in the device key "Km" starts from the initial value of 1 and increments by 1 every time a device key is assigned. "Km+1" is a device key that is to be assigned after "Km" is assigned.

The information generating unit 103 repeats Step S190 through Step S340 from i=$\{(T^2+T)/2-1\}$ to i=1.

The information generating unit 103 obtains the number J of the subsets, to which a device key is assigned in the line (i+1) of the device key table D100a (Step S190).

The information generating unit 103 repeats Step S200 through Step S335 from j=1 to j=J.

Using a subset Sj, which is a j'th subset from the left and to which a device key is assigned in the line (i+1) of the device key table D100a, as a reference, the information generating unit 103 searches the i'th line of the device key table D100a sequentially from the left for a subset that contains the subset Sj and also to which no device key is assigned yet (Step S200).

The information generating unit 103 judges, as a result of the search, whether or not there exists a subset that contains the subset Sj and to which no device key has been assigned yet (Step S205).

If no such subset exists (Step S205: NO), the information generating unit 103 writes a group made up of (i) a parent node being the subset Sj and (ii) a symbol "−" indicating that there is no subset to be a child node of the parent node, as a piece of node information, into an uppermost empty field within the worksheet interrelation table (Step S210). Further, the information generating unit 103 judges whether or not the subset Sj is a root (Step S215). In the case where the subset Sj is a root (Step 215: YES), a piece of information indicating that Sj is a root ("ROOT") is written as a piece of root information (Step S220). In the case where the subset Sj is not a root (Step S215: No), Step S220 is omitted.

If there are one or more subsets that contain the subset Sj and also to which no device key is assigned yet (Step S205: YES), at most two subsets are sequentially obtained from the left, out of the one or more subsets to which no device key is assigned yet (Step S225).

The information generating unit 103 judges whether or not the number of obtained subsets is one (Step S230).

In the case where one subset is obtained (Step S230: YES), the information generating unit 103 assigns the right label, out of the left and right labels that are in correspondence with the subset Sj and are temporarily stored, to the obtained subset as its label. The information generating unit 103 writes the assigned right label into the field in which the obtained subset is recorded within the device key table D100a (Step S235).

The information generating unit 103 inputs the label assigned to the obtained subset (i.e. the temporarily stored right label) to the pseudo random number generator G as an input value, and obtains as an output the device key "Km", a left label, and a right label (Step S240).

Further, the information generating unit 103 writes the obtained device key "Km" into a field in which the obtained subset is recorded within the device key table D100a (Step S245). Further, the information generating unit 103 brings the left and right labels obtained in Step S240 in correspondence with a subset (i.e. the subset obtained in Step S225) for the label inputted to the pseudo random number generator G and temporarily stores the left and right labels (Step S250). The information generating unit 103 takes the subset Sj as a parent node and the obtained subset as its child node and writes them into an uppermost empty field within the worksheet interrelation table (Step S255). The information generating unit 103 judges whether or not the subset Sj is a root (Step S260). In the case where the subset Sj is a root (Step 260: YES), a piece of information indicating that Sj is a root ("ROOT") is written as a piece of root information (Step S265). In the case where the subset Sj is not a root (Step S260: No), Step S265 is omitted.

In the case where two subsets are obtained (e.g. Tj and Uj) (Step S230: NO), the information generating unit 103 assigns the left label being in correspondence with the subset Sj and temporarily stored, as a label for the subset Tj positioned on the left, and writes the assigned left label into the field in which the obtained subset Tj is recorded within the device key table D100a (Step S270).

The information generating unit 103 inputs the label assigned to the obtained subset Tj (i.e. the left label in correspondence with the subset Sj) to the pseudo random number generator G as an input value, and obtains as an output the device key "Km", a left label, and a right label (Step S275).

Further, the information generating unit 103 writes the obtained device key "Km" into a field in which the obtained subset is recorded within the device key table D100a (Step S280). Further, the information generating unit 103 brings the left and right labels obtained in Step S275 in correspondence with a subset Tj for the label inputted to the pseudo random number generator G and temporarily stores the left and right labels (Step S285). The information generating unit 103 takes the subset Sj as a parent node and the obtained subset Tj as its child node and writes them into an uppermost empty field within the worksheet interrelation table (Step S290). The information generating unit 103 judges whether or not the subset Sj is a root (Step S295). In the case where the subset Sj is a root (Step 295: YES), a piece of information indicating that Sj is a root ("ROOT") is written as a piece of root information (Step S300). In the case where the subset Sj is not a root (Step S295: No), Step S300 is omitted.

Subsequently, the information generating unit 103 assigns the right label being in correspondence with the subset Sj and temporarily stored, as a label for the subset Uj, and writes the assigned right label into the field in which the obtained subset Uj is recorded within the device key table D100a (Step S305).

The information generating unit 103 inputs the label assigned to the obtained subset Uj (i.e. the right label in correspondence with the subset Sj) to the pseudo random number generator G as an input value, and obtains as an output the device key "Km+1", a left label, and a right label (Step S310).

Further, the information generating unit 103 writes the obtained device key "Km+1" into a field in which the obtained subset is recorded within the device key table D100a (Step S315). Further, the information generating unit 103 brings the left and right labels obtained in Step S310 in correspondence with a subset Uj for the label inputted to the pseudo random number generator G and temporarily stores the left and right labels (Step S320). The information generating unit 103 takes the subset Sj as a parent node and the obtained subset Uj as its child node and writes them into an uppermost empty field within the worksheet interrelation table (Step S325). The information generating unit 103 judges whether or not the subset Sj is a root (Step S330). In the case where the subset Sj is a root (Step 330: YES), a piece of information indicating that Sj is a root ("ROOT") is written as a piece of root information (Step S335). In the case where the subset Sj is not a root (Step S330: No), Step S335 is omitted.

The information generating unit 103 stores the generated device key table D100 and the interrelation table D101 into the information storing unit 102 (Step S360).

(4) Operation for Distributing Key Information

Figure 26:
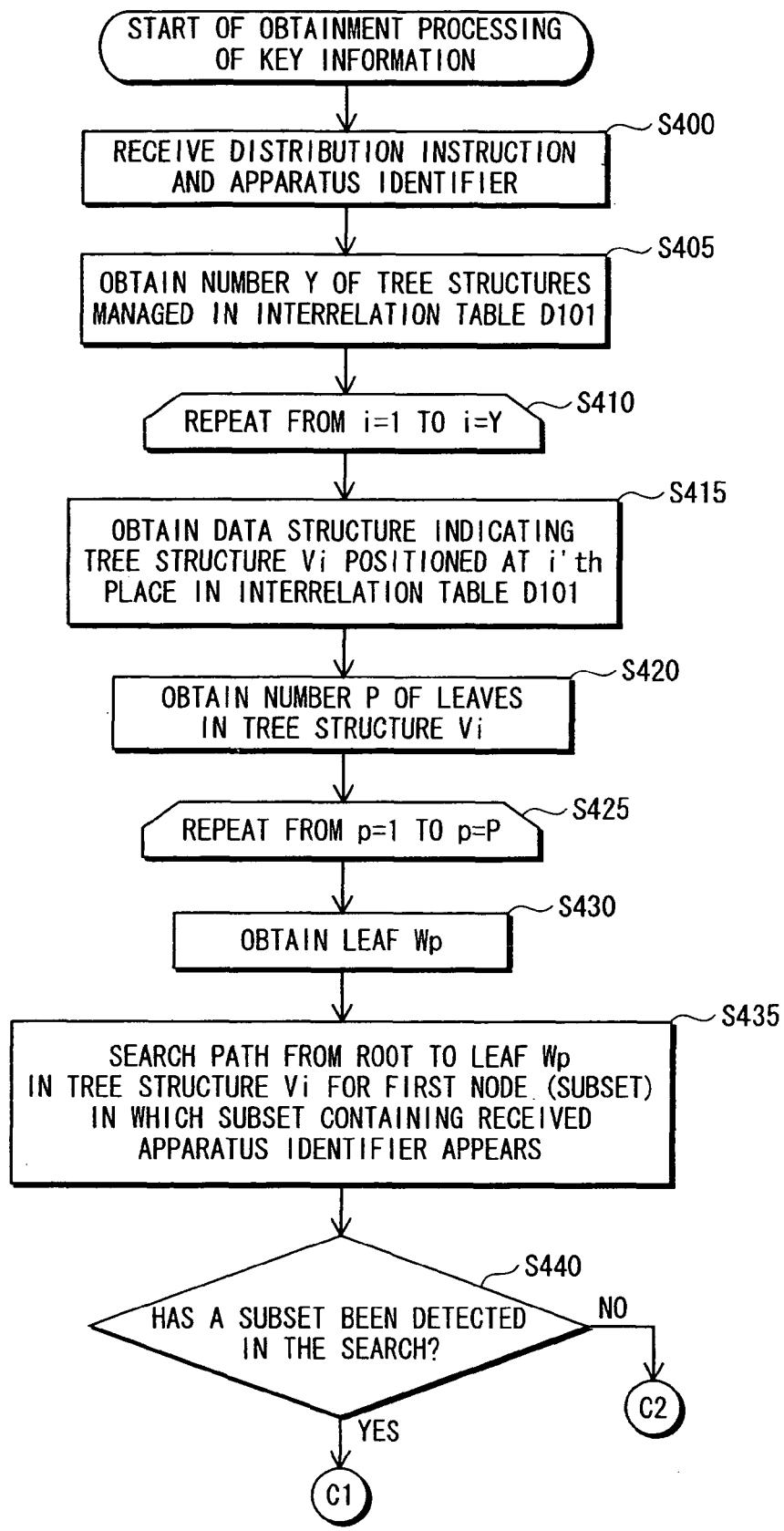
FIG. 26 is a flow chart that shows obtaining processing of key information and is continued to FIG. 27.
Figure 27:
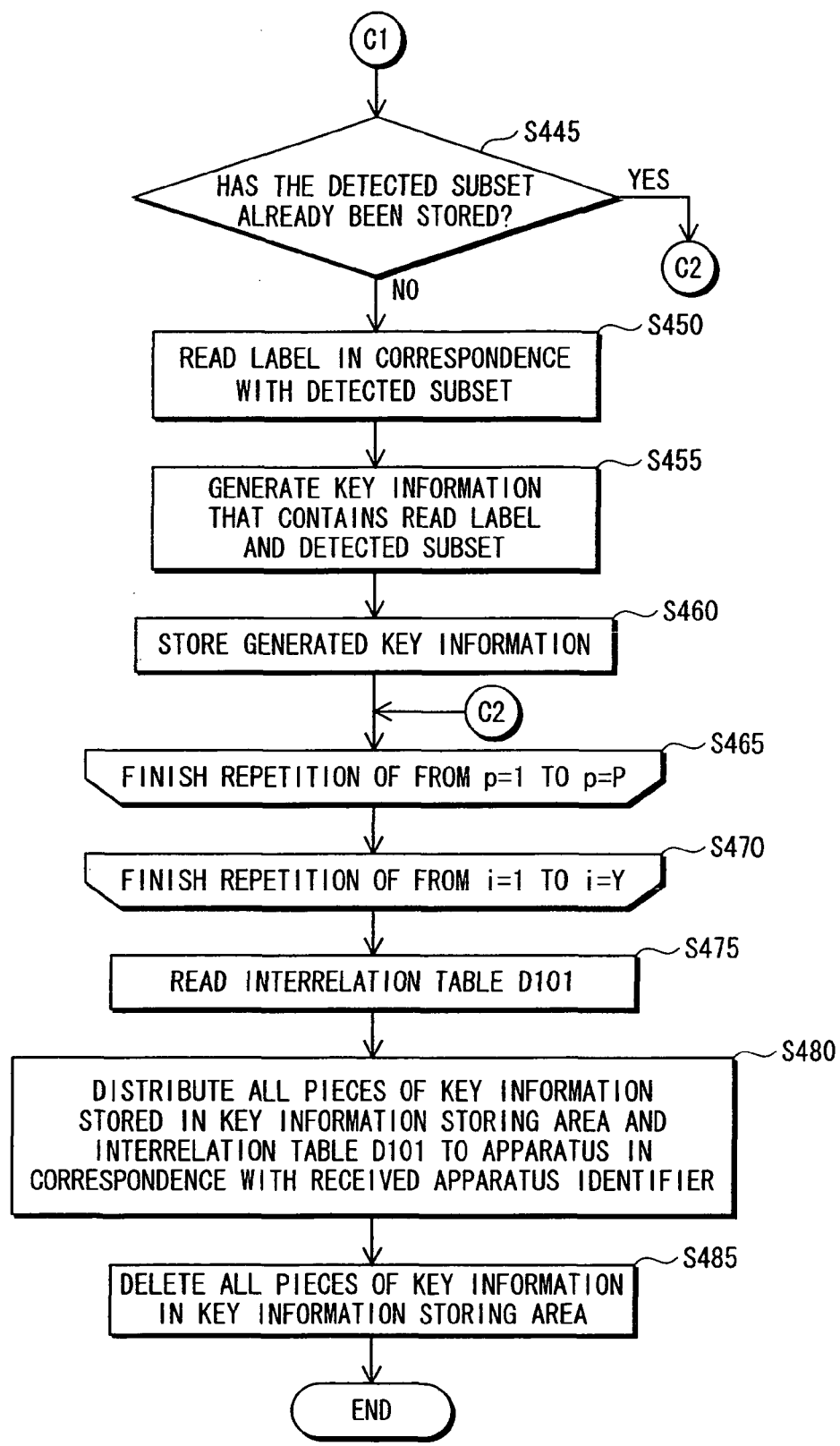
FIG. 27 is a flow chart that shows obtaining processing of key information and is continued from FIG. 26.

The following describes the operation in the key information obtainment processing to be performed when key information is distributed, with reference to the flow chart in FIGS. 26 and 27.

Having received a key information distribution instruction and an apparatus identifier of an apparatus being the distribution destination, from the receiving unit 107 (Step S400), the distributing unit 104 obtains the number Y of the tree structures that are managed in the interrelation table D101 (Step S405).

The distributing unit 104 repeats Step S415 through Step S465 from i=1 to i=Y.

The distributing unit 104 obtains a data structure indicating a tree structure Vi that is managed in the interrelation table D101 and is positioned in an i'th place from the top (Step S415).

The distributing unit 104 obtains the number P of the nodes having no child node (i.e. the number of the leaves), from the obtained data structure (Step S420).

The distributing unit 104 Step S430 through Step S460 from p=1 to p=P.

The distributing unit 104 obtains a node Wp that is positioned in the p'th place from the top and has no child node (i.e. Wp is a leaf), out of the fields for parent nodes in the obtained data structure (Step S430). The distributing unit 104 searches the path starting from the root of the tree structure Vi and reaching the leaf Wp for a first node (subset) in which a subset containing the received apparatus identifier appears (Step S435).

The distributing unit 104 judges, as a result of the search, whether a subset has been detected (Step S440).

In the case where the judgment result is that a subset has been detected (Step S440: YES), the distributing unit 104 judges whether the detected subset has already been stored in the key information storing area (Step S445).

In the case where the judgment result is that the detected subset has not been stored (Step S445: NO), the distributing unit 104 reads a label that corresponds to the detected subset from the device key table D100 (Step S450), generates and obtains a piece of key information that contains the read label and the detected subset (Step S455), and stores the obtained piece of key information to the key information storing area (Step S460). In the case where the judgment result is that the detected subset has been stored (Step S445: YES), the operation in Step S450 through Step S460 will be omitted.

The distributing unit 104 reads the interrelation table D101 (Step S475) and distributes the read interrelation table D101 and all the pieces of key information stored in the key information storing area to the apparatus being the destination of the distribution (Step S480).

After distributing the interrelation table D101 and all the pieces of key information to the apparatus identified with the received apparatus identifier, the distributing unit 104 deletes all the pieces of key information stored in the key information storing area (Step S485). It should be noted that "to distribute" here means, for example, to complete the writing of the received apparatus identifier and the one or more pieces of key information stored in the key information storing area, onto the recording medium to be distributed.

(5) Operation for Generation of Key Revocation Data

Figure 28:
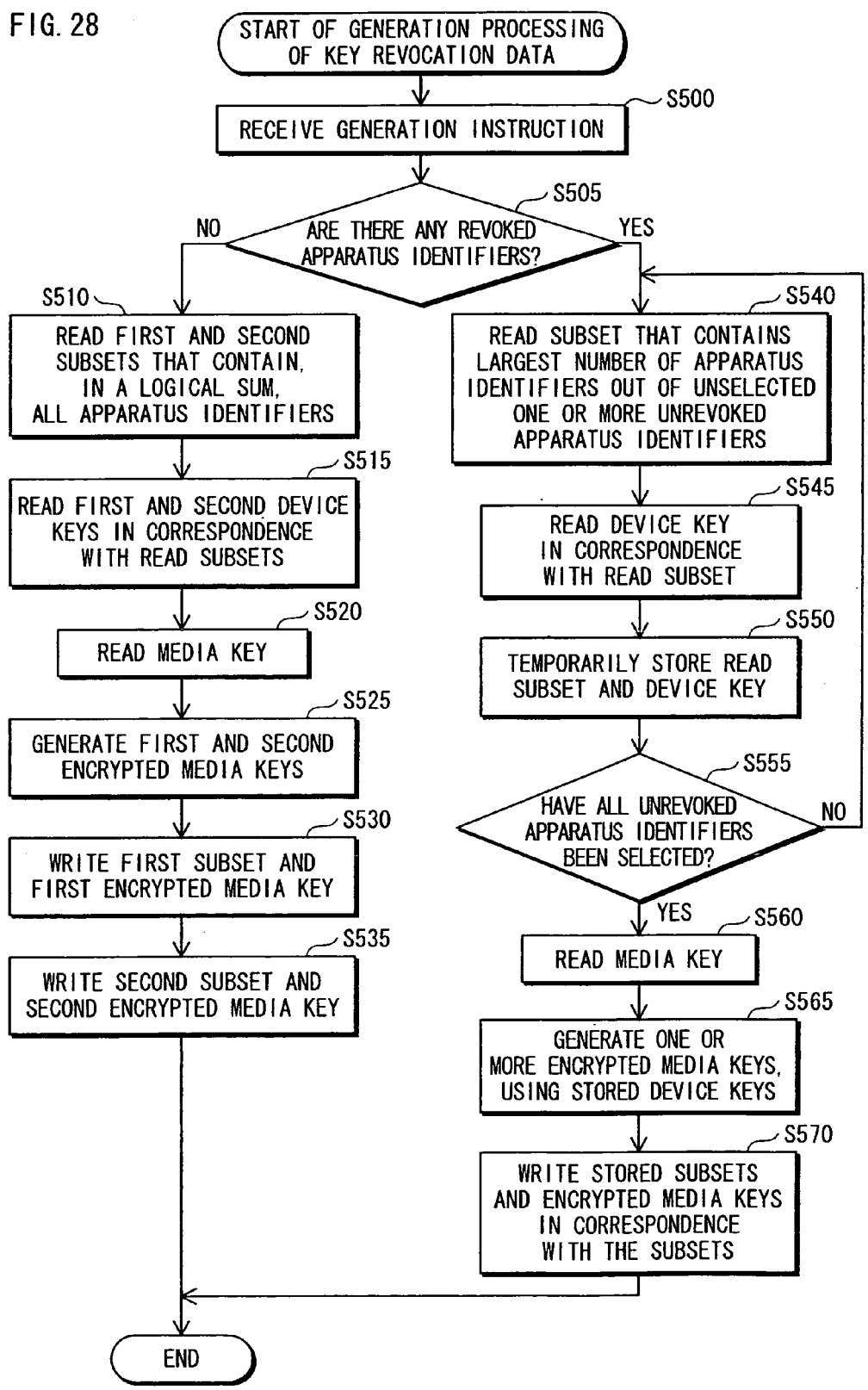
FIG. 28 is a flow chart that shows generation processing of key revocation data.

The following describes the operation in the key revocation data generation processing to be performed when key revocation data is generated, with reference to the flow chart in FIG. 28.

The key revocation data generating unit 106 receives a generation instruction from the receiving unit 107 via the revoked apparatus specifying unit 105 (Step S500), and judges whether or not any apparatus identifier is stored in the revoked apparatus storing area of the revoked apparatus specifying unit 105; in other words, the key revocation data generating unit 106 judges whether or not any revoked apparatus identifier exists in the revoked apparatus storing area (Step S505).

In the case where the judgment result is that no revoked apparatus identifier is stored (Step S505: NO), the key revocation data generating unit 106 reads a first subset and a second subset that contain, in a logical sum, all the apparatus identifiers from the device key table D100 (Step S510).

The key revocation data generating unit 106 reads device keys, namely a first device key and a second device key, that are in correspondence with the read subsets from the device key table D100 (Step S515).

The key revocation data generating unit 106 reads the media key from the media key storing area (Step S520) and encrypts the read media key with a common key encryption algorithm, using the first device key, so as to generate a first encrypted media key. The key revocation data generating unit 106 temporarily stores therein the generated first encrypted media key and the first subset, while bringing them into correspondence with each other. Further, the key revocation data generating unit 106 encrypts the read media key with a common key encryption algorithm, using the second device key, so as to generate a second encrypted media key. The key revocation data generating unit 106 temporarily stores therein the generated second encrypted media key and the second subset, while bringing them into correspondence with each other (Step S525).

The key revocation data generating unit 106 writes the first subset and the first encrypted media key onto the recording medium 200a via the outputting unit 108 (Step S530).

The key revocation data generating unit 106 writes the second subset and the second encrypted media key onto the recording medium 200a via the outputting unit 108 (Step S535).

In the case where the judgment result is that one or more revoked apparatus identifiers are stored (Step S505: YES), the key revocation data generating unit 106 reads, from the device key table D100, a subset being made up of a largest number of unrevoked apparatus identifiers out of one or more unrevoked apparatus identifiers obtained by excluding revoked apparatus identifiers from all the apparatus identifiers managed in the tree structure T100 (Step S540).

The key revocation data generating unit 106 reads a device key that is in correspondence with the read subset from the device key table D100 (Step S545) and temporarily stores the read subset and the device key (Step S550). The key revocation data generating unit 106 judges whether or not nothing but all the unrevoked apparatus identifiers are selected as the elements of the subsets (Step S555).

In the case where the judgment result is in the negative (Step S555: NO), the operation in and after Step S540 is performed again, using one or more unselected unrevoked apparatus identifiers.

In the case where the judgment result is in the affirmative (Step S555: YES), the key revocation data generating unit 106 reads the media key from the media key storing area (Step S560), and encrypts the read media key with a common key encryption algorithm, using the one or more temporarily stored device keys, so as to generate one or more encrypted media keys. The key revocation data generating unit 106 then temporarily stores the generated encrypted media keys, while bringing them into correspondence with the subsets corresponding to the device keys used in the encryption process (Step S565). At this time, the number of the generated encrypted media keys is equal to the number of read device keys.

When having finished generating encrypted media keys from all the read device keys, the key revocation data generating unit 106 reads the one or more temporarily stored groups each being made up of an encrypted media key and a subset and writes the one or more read groups onto the recording medium 200a via the outputting unit 108 (Step S570).

1.7 Operation of Recording Apparatus 300

The following describes the operation performed by the recording apparatus 300 when having received a recording instruction.

(1) Operation in the Recording Processing

Figure 29:
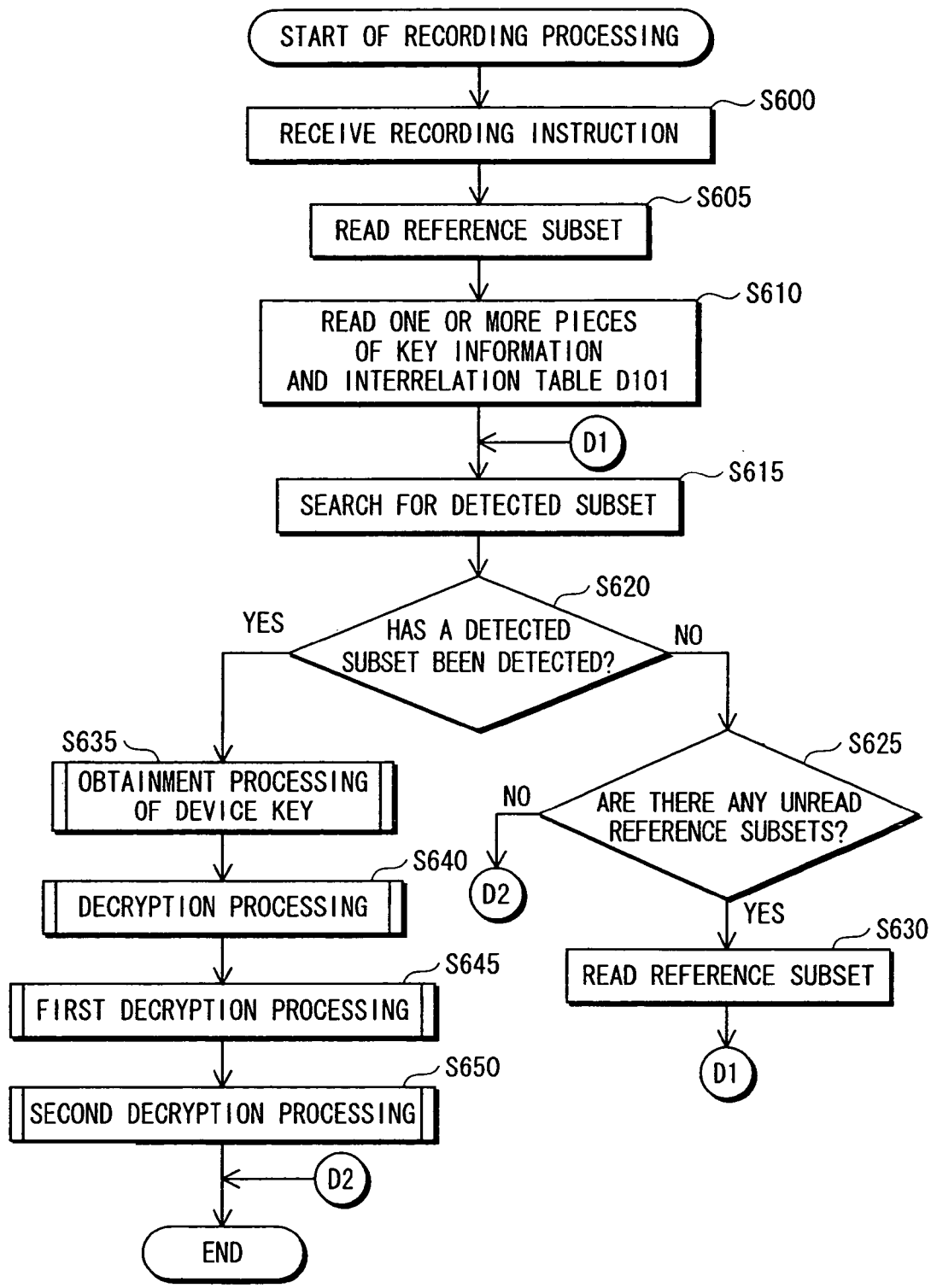
FIG. 29 is a flow chart that shows recording processing.

The following describes the operation in the recording processing to be performed by the decryption key generating unit 304, the decrypting unit 305, the first encrypting unit 306, and the second encrypting unit 307, when the recording apparatus 300 has received a recording instruction, with reference to the flow chart in FIG. 29.

Having received a recording instruction from the receiving unit 308 (Step S600), the decryption key generating unit 304 of the recording apparatus 300 reads one subset (hereafter, referred to as a reference subset) out of the subsets that are respectively in correspondence with the one or more encrypted media keys recorded on the recording medium 200b, via the inputting and outputting unit 309 from the recording medium 200b mounted on the recording apparatus 300 (Step S605).

The decryption key generating unit 304 reads the interrelation table D101 and one or more pieces of key information from the key information storing unit 301 (Step S610).

Using the interrelation table D101, the decryption key generating unit 304 searches the subsets contained in the read pieces of key information for a detected subset (S615).

As a result of the search, the decryption key generating unit 304 judges whether or not a detected subset has been detected from the subsets contained in the read pieces of key information (Step S620).

In the case where the judgment result is that a detected subset has not been detected (Step S620: NO), the decryption key generating unit 304 judges whether or not any unread reference subsets exist on the recording medium 200b (Step S625). In the case where there exist one or more unread reference subsets (Step S625: YES), the decryption key generating unit 304 reads one reference subset out of the one or more unread reference subset (Step S630), and the procedure returns to Step S615. In the case where the judgment result is that no unread reference subset exists on the recording medium 200b (Step S625: NO), the operation for recording encrypted contents will be finished.

In the case where the judgment result is that a detected subset has been detected (Step S620: YES), the device key obtainment processing is performed, and a device key is obtained (Step S635)

Subsequently, the decrypting unit 305 performs the decryption processing using the device key obtained in the device key obtainment processing and decrypts the encrypted media key so as to generate a media key (Step S640).

The first encrypting unit 306 performs the first encryption processing using the media key generated in the decryption processing and generates an encrypted content key (Step S645)

The second encrypting unit 307 performs the second encryption processing using the content key and generates an encrypted content (Step S650).

(2) Operation in the Device Key Obtainment Processing]

Figure 30:
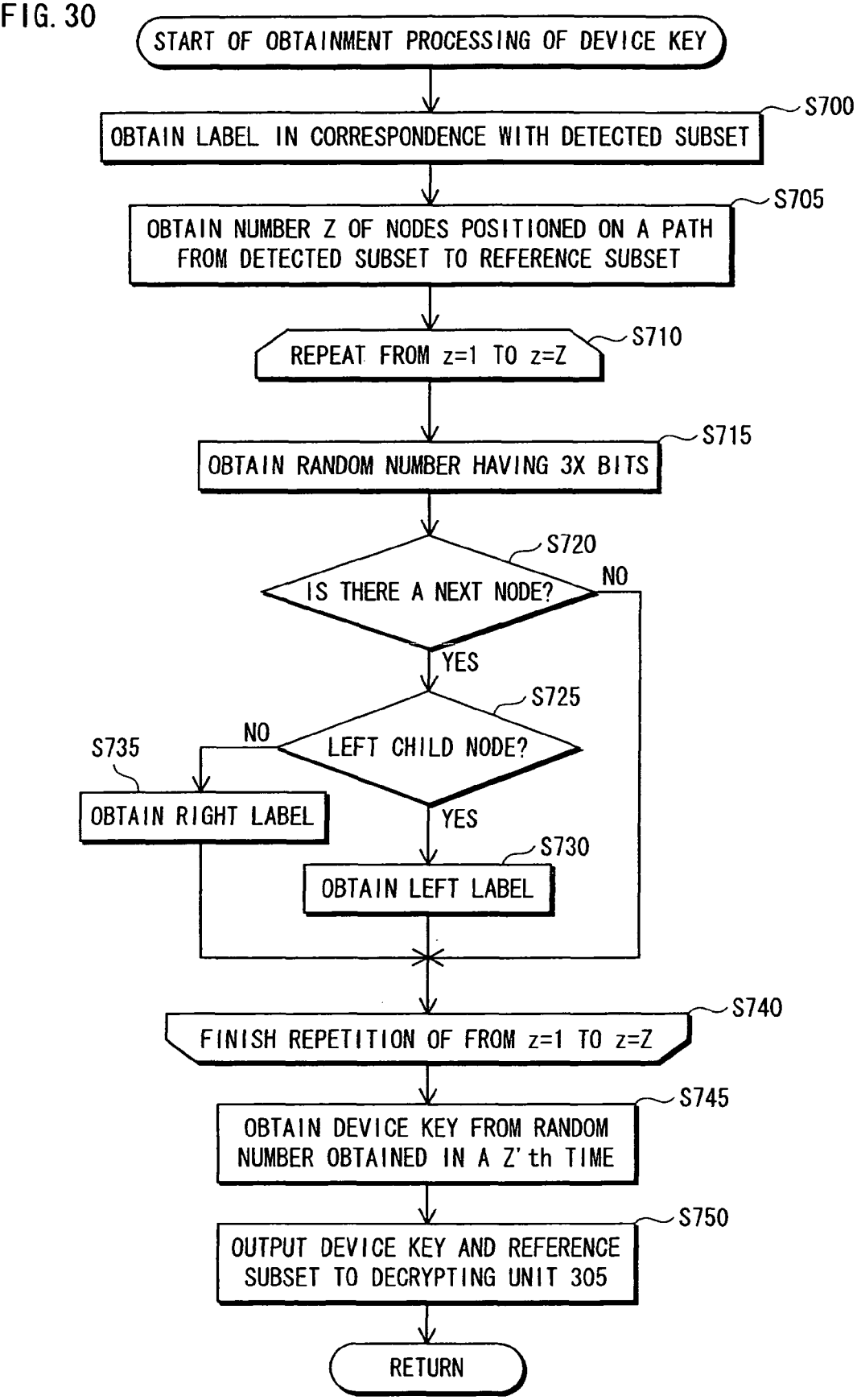
FIG. 30 is a flow chart that shows obtaining processing of a device key.

The following describes the operation in the device key obtainment processing performed in Step S635 of the recording processing shown in FIG. 29, with reference to the flow chart in FIG. 30.

The decryption key generating unit 304 obtains a label having X bits from the piece of key information containing the detected subset (Step S700).

The decryption key generating unit 304 obtains the number Z of the nodes existing on a path from the detected subset to the reference subset (Step S705).

The decryption key generating unit 304 repeats Step S715 through Step S735 from z=1 to z=Z.

The decryption key generating unit 304 uses the obtained label as an input value to the pseudo random generator G151 so as to generate and obtain an output of a random number having 3X bits (Step S715).

The decryption key generating unit 304 judges whether or not a next node of a subset corresponding to the label used as the input value exists on a path from the detected subset to the reference subset (Step S720).

In the case where the judgment result is that the next node exists (Step S720: YES), the decryption key generating unit 304 judges whether the next node is a left child node or a right child node (Step S725). In the case where the judgment result is that it is a left child node (Step S725: YES), the decryption key generating unit 304 divides the obtained 3X-bit random number into every X bits to obtain a left label (Step S730) and takes the obtained left label as a next value to be inputted to the pseudo random number generator G151, and the procedure returns to Step S715. In the case where the judgment result is that it is a right child node (Step S725: NO), the decryption key generating unit 304 divides the obtained 3X-bit random number into every X bits to obtain a right label (Step S735) and takes the obtained right label as a next value to be inputted to the pseudo random number generator G151, and the procedure returns to Step S715.

In the case where the judgment result is that no next node exists (Step S720: NO), the operation in Step S725 through Step S735 is omitted.

The decryption key generating unit 304 divides a 3X-bit random number obtained in the Z'th time into every X bits, and takes X bits positioned in the second place from the left as a device key to be used in decryption of an encrypted media key (Step S745).

The decryption key generating unit 304 outputs the obtained device key and reference subset to the decrypting unit 305 (Step S750).

(3) The Operation in the Decryption Processing

Figure 31:
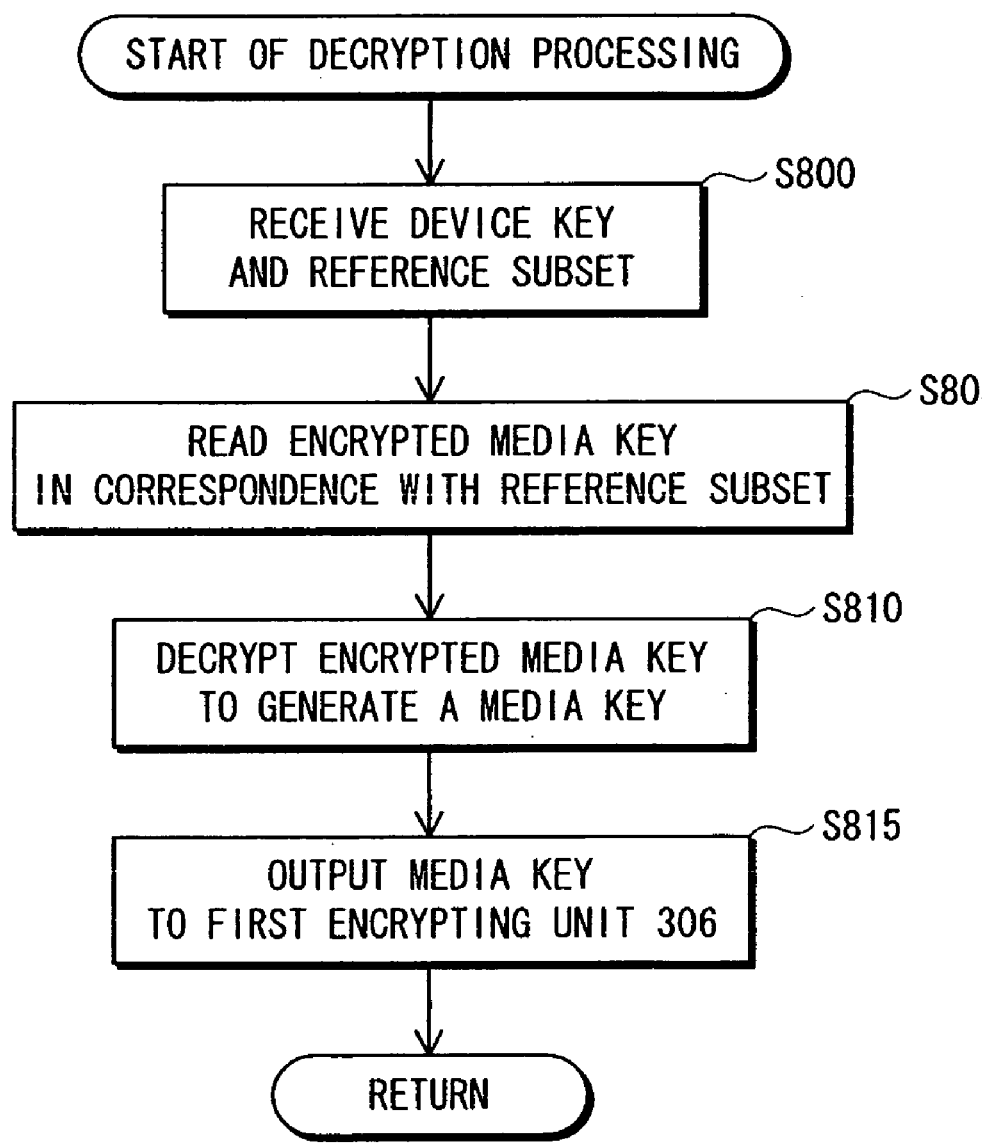
FIG. 31 is a flow chart that shows decryption processing.

The following describes the operation in the decryption processing performed in Step S640 in the recording processing shown in FIG. 29, with reference to the flow chart in FIG. 31.

Having received a device key and a reference subset from the decryption key generating unit 304 (Step S800), the decrypting unit 305 reads an encrypted media key that corresponds to the received reference subset from the key revocation data storing unit 201 of the recording medium 200b, via the inputting and outputting unit 309 (Step S805).

The decrypting unit 305 decrypts the read encrypted media key with the common key encryption algorithm using the received device key, so as to generate a media key (Step S810), and outputs the generated media key to the first encrypting unit 306 (Step S815).

(4) The Operation in the First Encryption Processing

Figure 32:
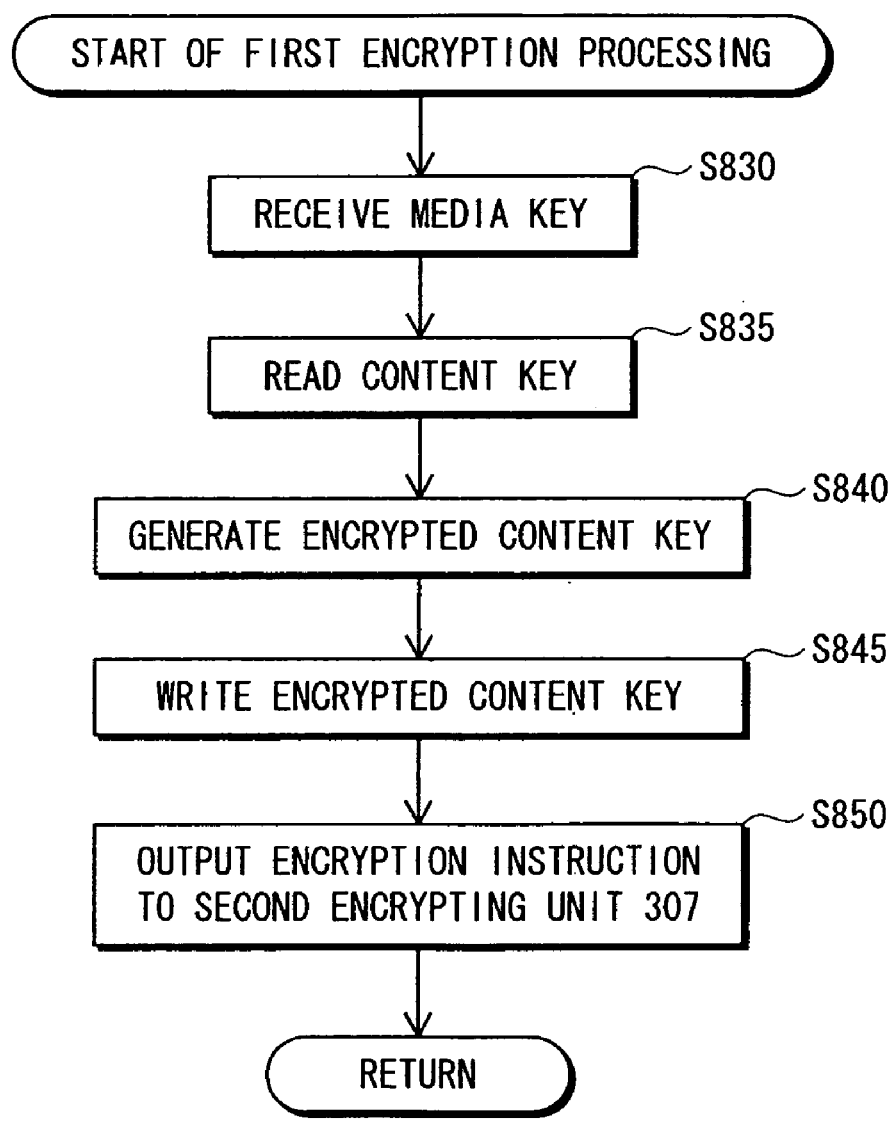
FIG. 32 is a flowchart that shows a first encryption processing.

The following describes the operation in the first encryption processing performed in Step S645 in the recording processing shown in FIG. 29, with reference to the flow chart in FIG. 32.

The first encrypting unit 306 receives a media key from the decrypting unit 305 (Step S830) and reads a content key from the content key storing unit 303 (Step S835).

The first encrypting unit 306 encrypts the read content key with the common key encryption algorithm using the media key so as to generate an encrypted content key (Step S840), and writes the generated encrypted content key into the encrypted content key storing unit 202 of the recording medium 200b, via the inputting and outputting unit 309 (Step S845).

Further, the first encrypting unit 306 outputs an encryption instruction to instruct the second encrypting unit 307 to encrypt the content (Step S850).

(5) The Operation in the Second Encryption Processing

Figure 33:
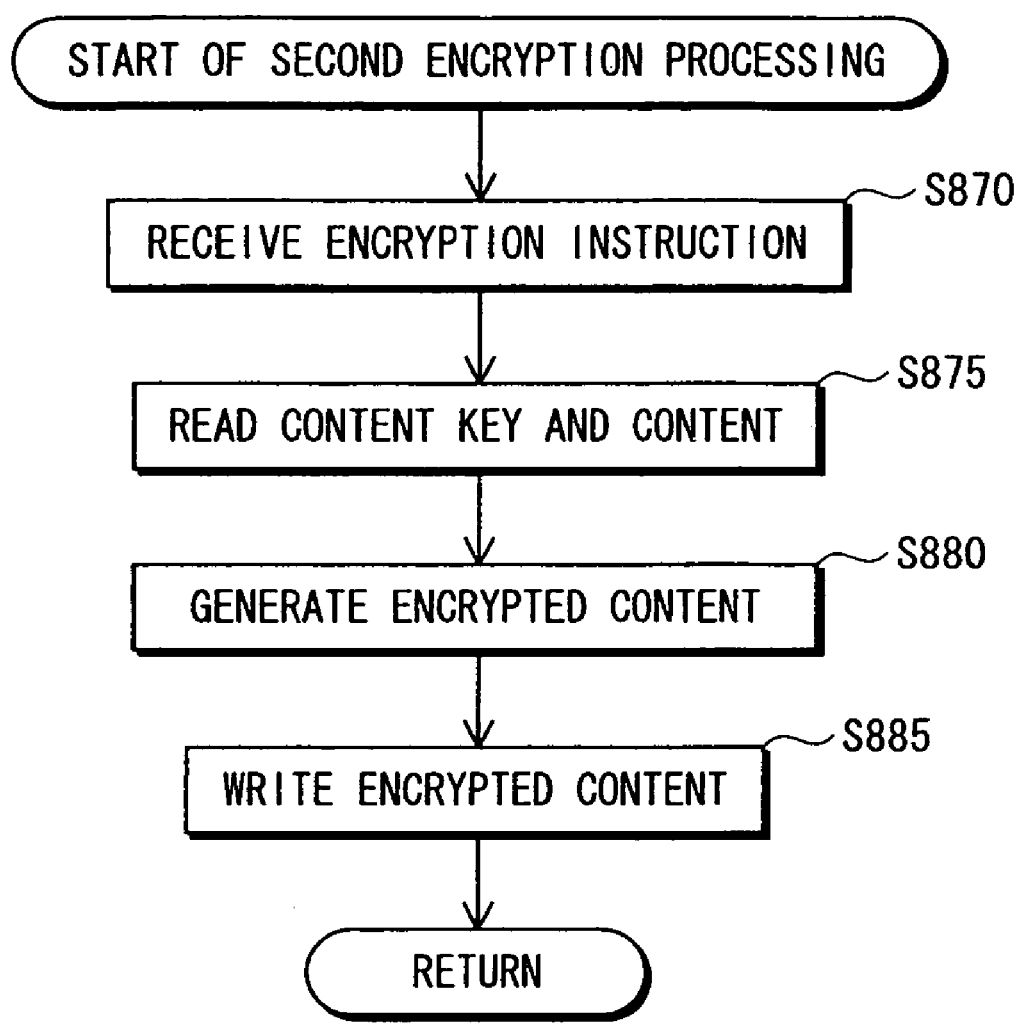
FIG. 33 is a flow chart that shows a second encryption processing.

The following describes the operation in the second encryption processing performed in Step S650 in the recording processing shown in FIG. 29, with reference to the flow chart in FIG. 33.

The second encrypting unit 307 receives the encryption instruction from the first encrypting unit 306 (Step S870) and reads a content key from the content key storing unit 303 and a content from the content storing unit 302 (Step S875).

The second encrypting unit 307 encrypts the read content with the common key encryption algorithm using the read content key so as to generate an encrypted content (Step S880) and writes the generated encrypted content into the encrypted content storing unit 203 of the recording medium 200b via the inputting and outputting unit 309 (Step S885).

1.8 The Operation of the Playback Apparatus 400

The following describes the operation performed when the playback apparatus has received a playback instruction.

(1) The Operation in the Playback Processing

Figure 34:
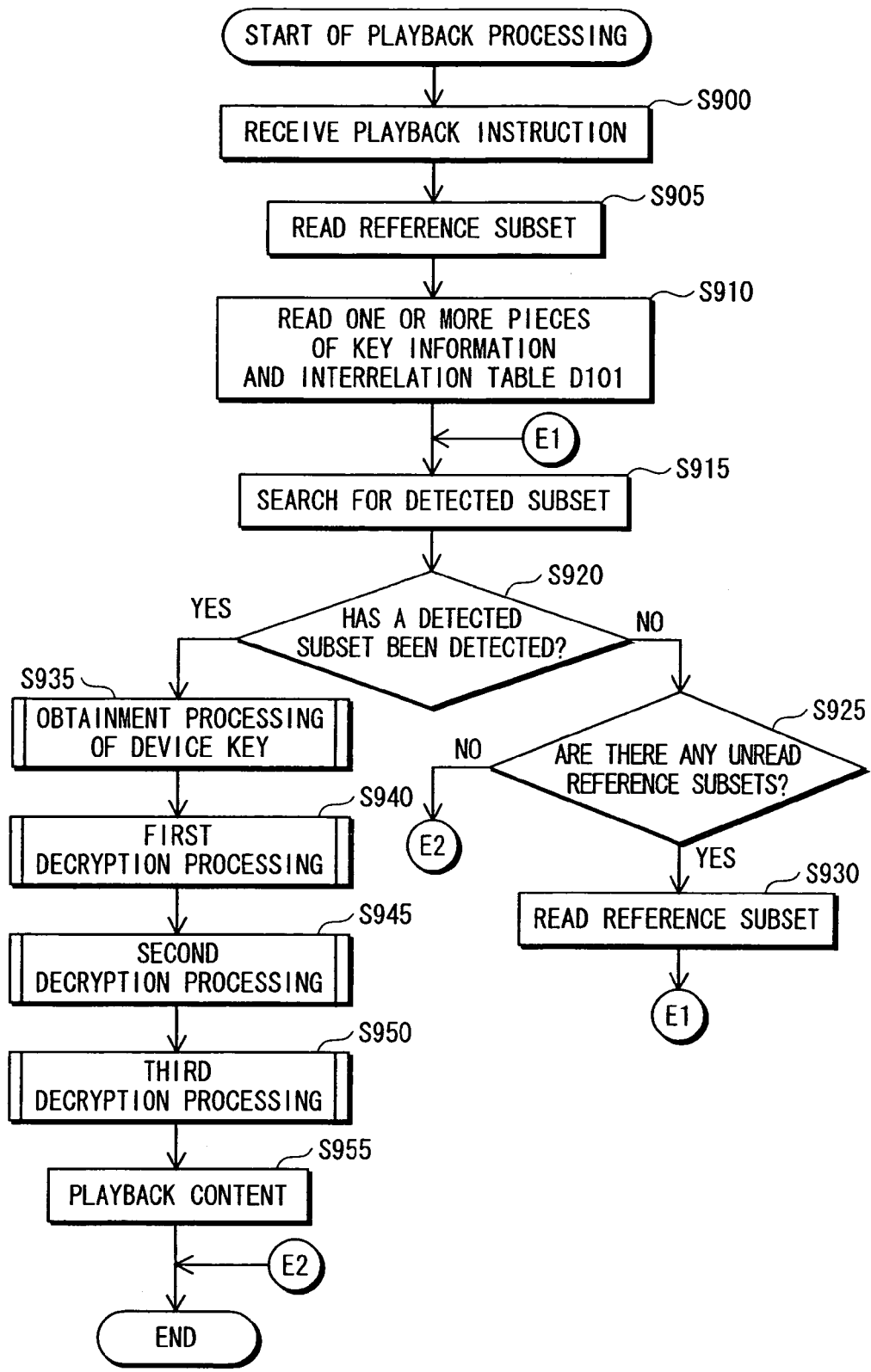
FIG. 34 is a flow chart that shows playback processing.

The following describes the operation in the playback processing performed by the decryption key generating unit 402, the first decrypting unit 403, the second decrypting unit 404, the third decrypting unit 405, and the playback unit 406, when the playback apparatus 400 has received a playback instruction, with reference to the flow chart in FIG. 34.

Having received a playback instruction from the receiving unit 402 (Step S900), the decryption key generating unit 402 of the playback apparatus 400 reads a subset (hereafter, referred to as a reference subset) out of the subsets that are respectively in correspondence with the one or more encrypted media keys recorded on the recording medium 200c, via the reading unit 408 from the recording medium 200c mounted on the playback apparatus 400 (Step S905).

The decryption key generating unit 402 reads the interrelation table D101 and one or more pieces of key information from the key information storing unit 401 (Step S910).

Using the interrelation table D101, the decryption key generating unit 402 searches the subsets contained in the read pieces of key information for a detected subset (Step S915).

The decryption key generating unit 402 judges whether or not a detected subset has been detected from the subsets contained in the read pieces of key information as a result of the search (Step S920).

In the case where the judgment result is that no detected subset has been detected (Step S920: NO), the decryption key generating unit 402 judges whether or not any unread reference subunits exist on the recording medium 200c (Step S925). In the case where the judgment result is that one or more unread reference subunits exist (Step S925: YES), the decryption key generating unit 402 reads one reference subunit out of the unread reference subunits (Step S930) and the procedure returns to Step S915. In the case where the judgment result is that no unread reference subset exists on the recording medium 200c (Step S925: NO), the decryption key generating unit 402 finishes the operation of playing back contents.

In the case where the judgment result is that a detected subset has been detected (Step S920: YES), the decryption key generating unit 402 performs the device key obtainment processing and obtains a device key (Step S935).

Subsequently, the first decrypting unit 403 performs the decryption processing using the device key obtained in the device key obtainment processing and decrypts the encrypted media key so as to generated a media key (Step S940).

The second decrypting unit 404 performs the second decryption processing using the media key generated in the first decryption processing and decrypts the encrypted content key so as to generate a content key (Step S945).

The third decrypting unit 405 performs the second decryption processing using the content key generated in the second decryption processing and decrypts the encrypted content so as to generate a content (Step S950).

The playback unit 406 plays back the content generated in the third decryption processing (Step S955).

(2) Operation in the Device Key Obtainment Processing

Figure 35:
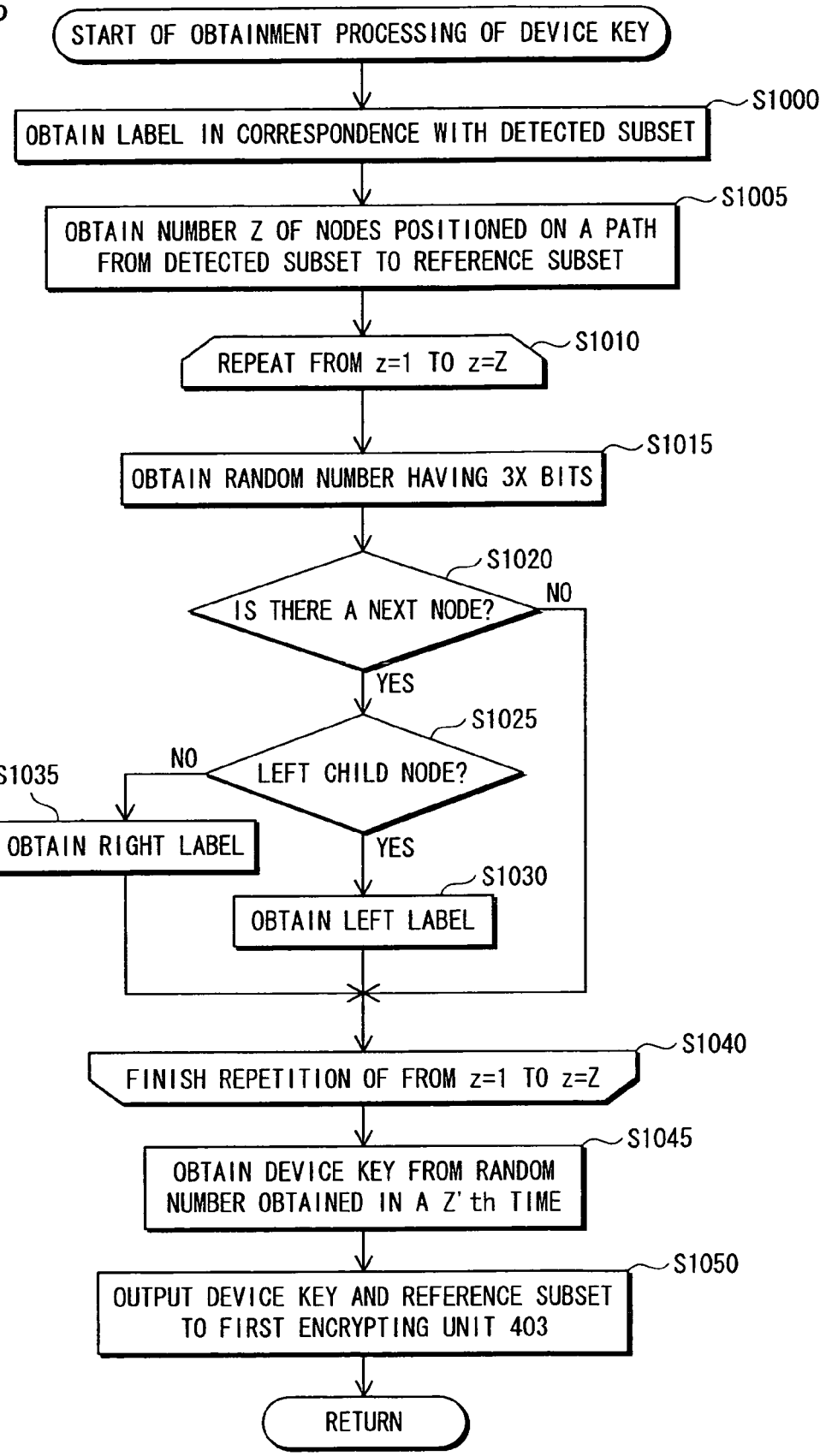
FIG. 35 is a flow chart that shows obtaining processing of a device key.

The following describes the operation in the device key obtainment processing performed in Step S935 of the playback processing shown in FIG. 34, with reference to the flow chart in FIG. 35.

The decryption key generating unit 402 obtains a label having X bits from the piece of key information containing the detected subset (Step S1000).

The decryption key generating unit 402 obtains the number Z of the nodes existing on a path from the detected subset to the reference subset (Step S1005).

The decryption key generating unit 402 repeats Step S1015 through Step S1035 from z=1 to z=Z.

The decryption key generating unit 402 uses the obtained label as an input value to the pseudo random generator G151 so as to generate and obtain an output of a random number having 3X bits (Step S1015).

The decryption key generating unit 402 judges whether or not a next node of a subset corresponding to the label used as the input value exists on a path from the detected subset to the reference subset (Step S1020).

In the case where the judgment result is that the next node exists (Step S1020: YES), the decryption key generating unit 402 judges whether the next node is a left child node or a right child node (Step S1025). In the case where the judgment result is that it is a left child node (Step S1025: YES), the decryption key generating unit 402 divides the obtained 3X-bit random number into every X bits to obtain a left label (Step S1030) and takes the obtained left label as a next value to be inputted to the pseudo random number generator G151, and the procedure returns to Step S1015. In the case where the judgment result is that it is a right child node (Step S1025: NO), the decryption key generating unit 402 divides the obtained 3X-bit random number into every X bits to obtain a right label (Step S1035) and takes the obtained right label as a next value to be inputted to the pseudo random number generator G151, and the procedure returns to Step S1015.

In the case where the judgment result is that no next node exists (Step S1020: NO), the operation in Step S1025 through Step S1035 will be omitted.

The decryption key generating unit 402 divides a 3X-bit random number obtained in the Z'th time into every X bits, and takes X bits positioned in the second place from the left as a device key to be used in decryption of an encrypted media key (Step S1045).

The decryption key generating unit 402 outputs the obtained device key and reference subset to the first decrypting unit 403 (Step S1050).

(3) The Operation in the First Decryption Processing

Figure 36:
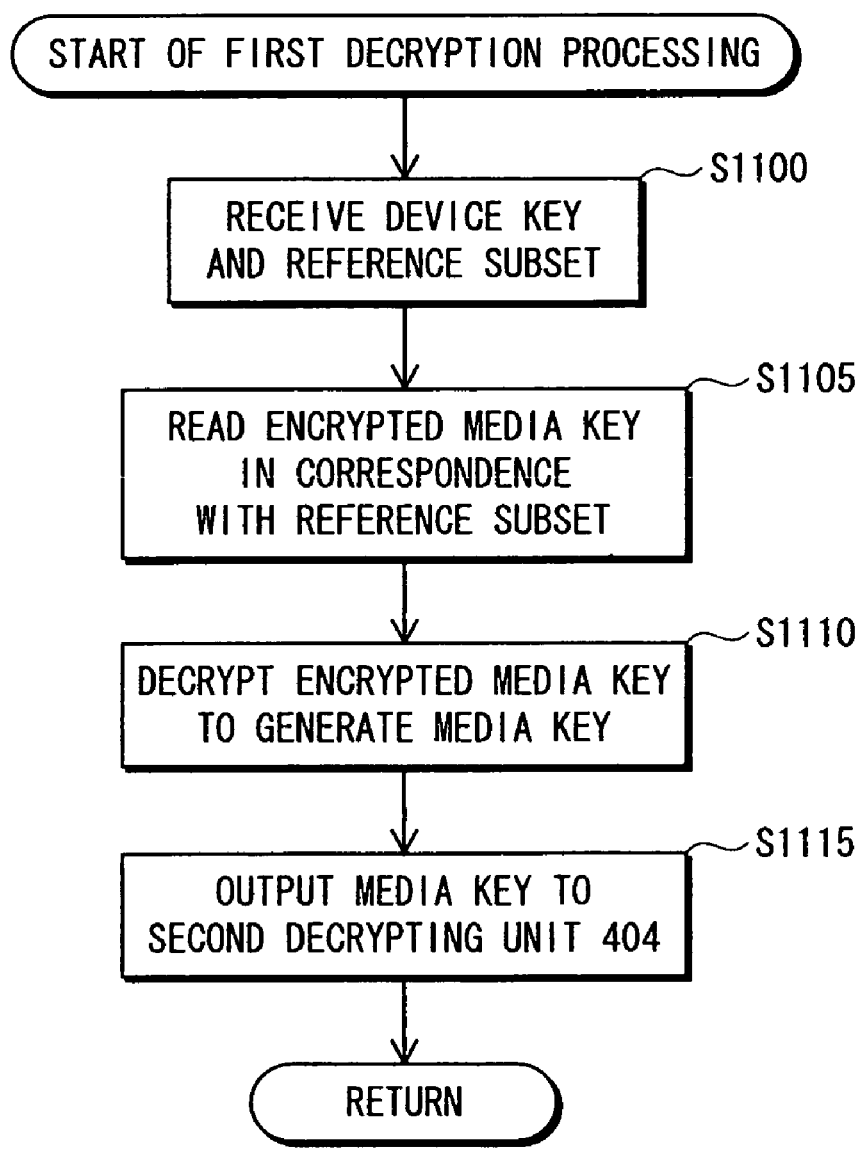
FIG. 36 is a flowchart that shows a first decryption processing.

The following describes the operation in the decryption processing performed in Step S940 of the playback processing shown in FIG. 34, with reference to the flow chart in FIG. 36.

Having received a device key and a reference subset from the decryption key generating unit 402 (Step S1100), the first decrypting unit 403 reads an encrypted media key that corresponds to the received reference subset from the key revocation data storing unit 201 of the recording medium 200c, via the reading unit 408 (Step S1105).

The first decrypting unit 403 decrypts the read encrypted media key with the common key encryption algorithm using the received device key, so as to generate a media key (Step S1110) and outputs the generated media key to the second decrypting unit 404 (Step S1115).

(4) The Operation in the Second Decryption Processing

Figure 37:
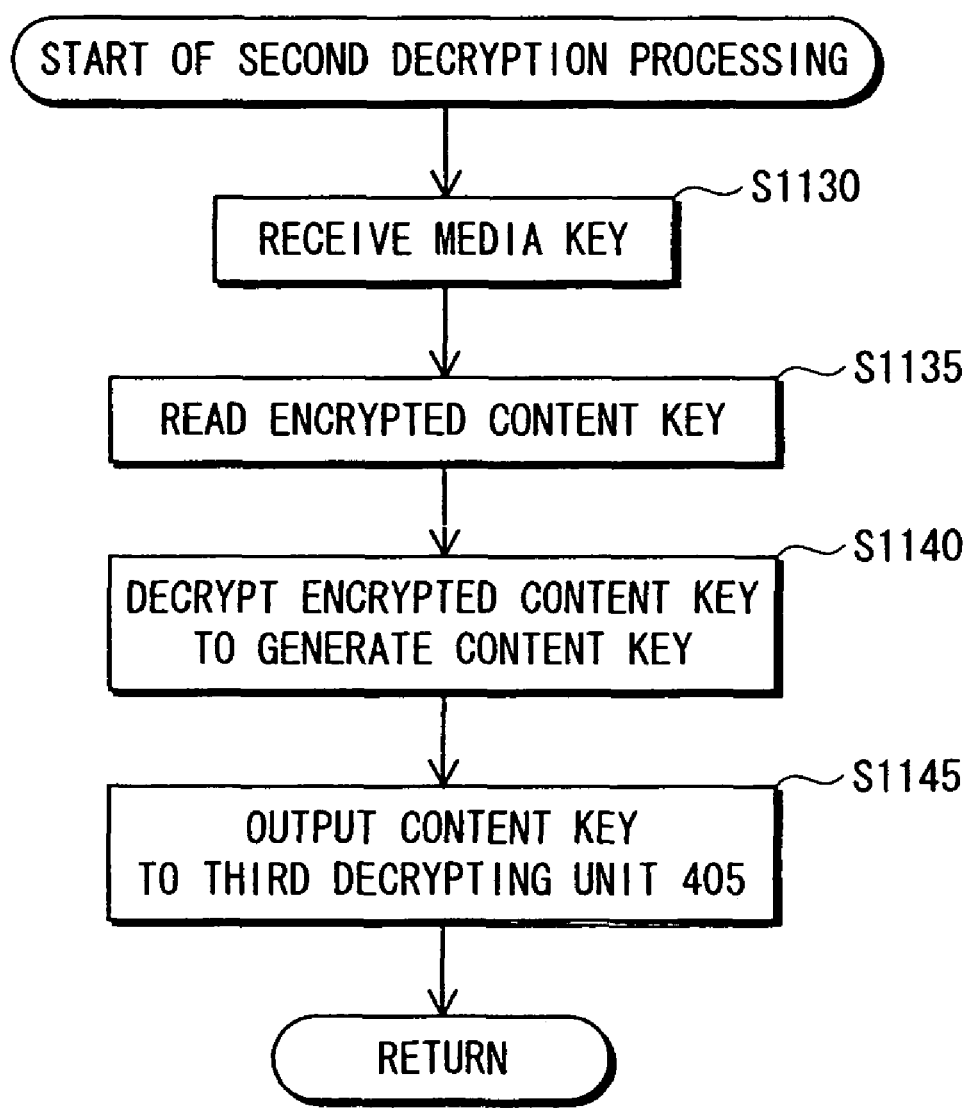
FIG. 37 is a flow chart that shows a second decryption processing.

The following describes the operation in the second decryption processing performed in Step S945 of the playback processing shown in FIG. 34, with reference to the flow chart in FIG. 37.

Having received a media key from the first decrypting unit 403 (Step S1130), the second decrypting unit 404 reads an encrypted content key from the encrypted content key storing unit 202 of the recording medium 200c, via the reading unit 408 (Step S1135).

The second decrypting unit 404 decrypts the read encrypted content key with the common key encryption algorithm using the received media key, so as to generate a content key (S1140), and outputs the generated content key to the third decrypting unit 405 (Step S1145).

(5) The Operation in the Third Decryption Processing

Figure 38:
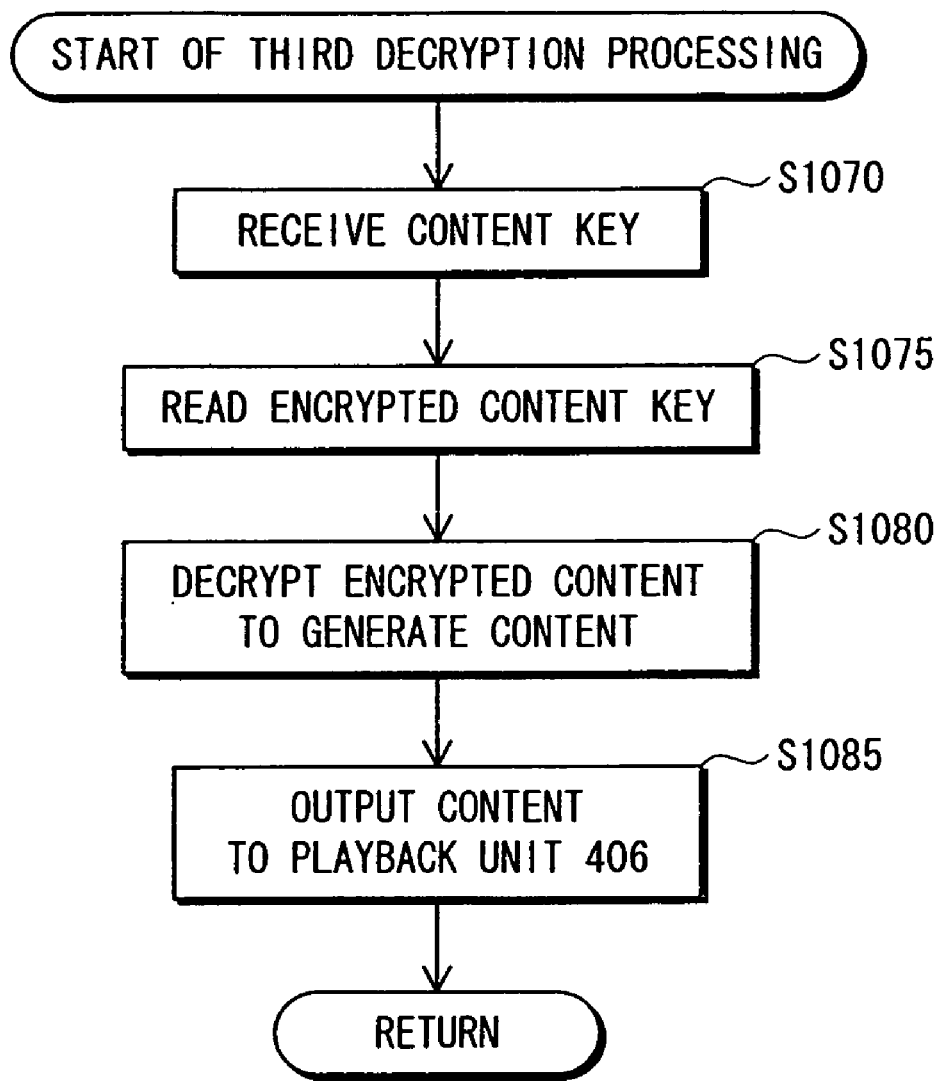
FIG. 38 is a flowchart that shows a third decryption processing.

The following describes the operation in the third decryption processing performed in Step S950 of the playback processing shown in FIG. 34, with reference to the flow chart in FIG. 38.

Having received a content key from the second decrypting unit 404 (Step S1070), the third decrypting unit 405 reads an encrypted content from the encrypted content storing unit 203 of the recording medium 200c, via the reading unit 408 (Step S1075).

The third decrypting unit 405 decrypts the read encrypted content with the common key encryption algorithm using the received content key, so as to generate a content (Step S1080), and outputs the generated content to the playback unit 406 (Step S1085).

1.9 Other Modification Examples

The present invention has been described so far based on the embodiment; however, the present invention is not limited to the embodiment described above. The following cases are also included in the present invention:

(1) In the present invention, the recording medium 200 is configured to be a recordable medium such as a DVD-RAM; however, the present invention is not limited to the configuration. For example, the recording medium may be a prerecorded medium such as a DVD-Video, and it is acceptable to have an arrangement wherein each playback apparatus stores therein a device key and plays back a content recorded on the recording medium. In such a case, the recording apparatus does not have to store key information for generating a device key and it is acceptable to have an arrangement wherein the recording apparatus receives a media key directly from the key management apparatus and encrypts a content based on the received media key and writes the encrypted content.

(2) The present invention has an arrangement wherein, as a mechanism for encrypting a content, a content key is encrypted with a media key, and a content is encrypted with the content key; however, the present invention is not limited to this arrangement. For example, it is acceptable to have an arrangement wherein a content is encrypted directly with a media key so that the key hierarchy is reduced by one layer. Alternatively, to the contrary, it is acceptable to have an arrangement wherein a disc key is introduced, and the disc key is encrypted with a media key, and a content key is encrypted with the disc key, and a content is encrypted with the content key so that the key hierarchy is increased by one layer. Alternatively, it is acceptable to have an arrangement wherein the key is modulated with different type of information added somewhere in the key hierarchy.

(3) In the present invention, a piece of key revocation data and an encrypted content are recorded on a single recording medium 200; however, the present invention is not limited to this arrangement. For example, it is acceptable to have an arrangement where in a recording medium on which a piece of key revocation data is recorded is different from a recording medium on which an encrypted content is recorded. In such a case, the recording medium having the piece of key revocation data recorded is inserted into the recording apparatus 300 or the playback apparatus 400 so that a media key can be calculated, and then the other recording medium is inserted so that the content can be recorded or played back.

(4) In the present invention, a piece of key revocation data is recorded on a recording medium 200 and distributed; however, the present invention is not limited to this configuration. For example, it is acceptable to have an arrangement wherein a piece of key revocation data is distributed using a communication medium such as the Internet, and the recording apparatus 300 or the playback apparatus 400 stores therein the distributed piece of key revocation data so that the apparatus decrypts an encrypted media key using the stored piece of key revocation data.

Further, it is acceptable to have an arrangement wherein each apparatus receives a piece of key revocation data using a communication medium every time the apparatus decrypts an encrypted media key.

Furthermore, in the present invention, the recording apparatus 300 writes the generated encrypted content key and encrypted content onto the recording medium 200 being mounted; however, the present invention is not limited to this arrangement. For example, it is acceptable to have an arrangement wherein the recording apparatus 300 records the generated encrypted content key and encrypted content onto a recording medium stored in a server in a network via a communication medium.

(5) In the present invention, a piece of key revocation data and an encrypted content are recorded on the recording medium 200 and distributed; however, the present invention is not limited to this configuration. For example, it is acceptable to have an arrangement wherein a piece of key revocation data and an encrypted content are distributed using a communication medium such as broadcast or the Internet.

(6) In the present invention, the key management apparatus 100 uses a tree structure with binary trees to manage apparatuses; however, the present invention is not limited to this example. Any tree structure is acceptable for managing the apparatuses as long as it is with n-ary trees (where n is an integer). For example the tree structure may be of ternary trees or four-ary trees.

Further, the key management apparatus 100 is configured to use a tree structure with binary trees for managing the keys, i.e. managing the interrelationship among subsets; however, the present invention is not limited to this configuration. As described above, any tree structure is acceptable for managing the interrelationship among the subsets as long as it is with n-ary trees (where n is an integer).

(7) In the embodiment described above, the key management apparatus 100 uses a pseudo random number generator G that outputs two values that are mutually different in response to two input values that are mutually different, in order to associate subsets; however, the present invention is not limited to this arrangement.

It is acceptable that the key management apparatus 100 uses a pseudo random number generator $G\_1$ that outputs one value in response to two input values that are mutually different, in order to associate subsets.

For example, in the embodiment described above, the subset "1" is associated with the subset "12". However, by using the pseudo random number generator $G\_1$, it is possible to associate the subset "12" with the subset "1" and with the subset "2". With this arrangement, the apparatus having the apparatus identifier "2" does not have to store the key information containing the subset "12". Thus, it is possible to reduce the number of pieces of key information to be stored.

(8) In the embodiment described above, in the case where no revoked apparatus identifier is stored in the revoked apparatus storing area of the revoked apparatus specifying unit 105, the key revocation data generating unit 106 reads two subsets that contain, in a logical sum, the apparatus identifiers of all the apparatuses as well as the device keys that are in correspondence with these subsets from the device key table D100, so as to generate two encrypted media keys; however, the present invention is not limited to this arrangement. It is acceptable to generate one encrypted media key in the following manner:

The key management apparatus 100 generates a label "A0" that is in common to all the apparatuses, generates a device key "K0" from the generated label "A0", stores a group made up of the label "A0", the device key "K0", and a set S0 of all the apparatus identifiers into the information storing unit 102. The key management apparatus 100 distributes the set S0 and the label "A0" to each of all the apparatuses.

In the case where no revoked apparatus identifier is stored in the revoked apparatus storing area, the key management apparatus 100 reads the set S0 and the device key "K0" from the information storing unit 102 and generates an encrypted media key Enc (K0, media key) using the read device key "K0". The key management apparatus 100 writes the generated encrypted media key Enc (K0, media key) and the set S0 into the key revocation data storing unit 201 of the recording medium 200a.

With this arrangement, all the recording apparatuses and all the playback apparatuses are able to generate the device key "K0" using the label "A0" that is in correspondence with the set S0, and are able to decrypt the encrypted media key Enc (K0, media key) so as to generate a media key.

(9) In the embodiment described above, the key revocation data generating unit 106 performs different operations depending on whether any revoked apparatus identifier is stored in the revoked apparatus storing area of the revoked apparatus specifying unit 105 or not; however, the present invention is not limited to this example. It is acceptable that the key revocation data generating unit 106 performs the operation described as to be performed in the case where one or more revoked apparatus identifiers are stored, without making judgment of whether revoked apparatus identifiers are stored.

In such a case, in the key revocation data generation processing shown in FIG. 28, Step S540 is performed after Step S500 is executed. In the case where no revoked apparatus identifier is stored in the revoked apparatus storing area, the key revocation data generating unit 106 is able to read one or more subsets by repeating the operation in Step S540 through Step S555, and each of the apparatus identifiers of all the apparatuses is contained in one of the read subsets.

(10) In the embodiment described above, the pseudo random number generator G generates a random number having 3X bits from a piece of X-bit data; however, the present invention is not limited to this arrangement. It is acceptable that the pseudo random number generator G generates a random number having 2X bits from a piece of X-bit data.

The following describes the operation of the key management apparatus 100 in such a case.

The key management apparatus 100 generates a random number Ah having X bits, and records the generated random number Ah as a device key into the line $\{(T^2+T)/2\}$, the column h. This way, it is possible to assign the random number Ah, as a device key, to a subset recorded in the line $\{(T^2+T)/2\}$, the column h.

The key management apparatus 100 generates a random number having 2X bits, using the random number Ah and the pseudo random number generator G. Here, the X bits on the left out of the generated 2X bits is a device key that corresponds to a left child node and the X bits on the right is a device key that corresponds to a right child node, when the child nodes of a subset corresponding to the random number Ah are associated.

When having detected a subset or two subsets that are child node(s) of a subset S, the key management apparatus 100 assigns a device key generated by the pseudo random generator G to each of the detected subsets in the same manner as the label assigning method described in the embodiment. With this arrangement, the key management apparatus 100 is able to generate a device key table and a correlation table including subsets and device keys. It should be noted that explanation of generation processing of the correlation table will be omitted since it is the same as the one described in the embodiment.

In this situation, each of the pieces of key information distributed by the key management apparatus 100 to other apparatuses is made up of a subset and a device key corresponding to the subset.

In the case where the recording apparatus 300 obtains a decryption key for an encrypted media key with the use of key information, the recording apparatus 300 is able to obtain the decryption key using the pseudo random number generator G as many as (Z−1) times, if the number of nodes on the path from the detected subset to the reference subset is Z (where Z is two or larger). The recording apparatus 300 judges, out of the two device keys obtained as a result of the use of the pseudo random number generator G (Z−1) times, whether the reference subset is a left child node or a right child node of the parent node. In the case where the judgment result is a left child node, the recording apparatus 300 obtains the device key having X bits on the left out of the 2X bits as a decryption key. In the case where the judgment result is a right child node, the recording apparatus 300 obtains the device key having X bits on the right as a decryption key. It should be noted that since the judgment as to which one of the two device keys generated by the pseudo random generator G is used in the next input is made in the same manner as the one described in the embodiment above, explanation will be omitted. Further, in the case where Z=1, in other words, in the case where the detected subset is identical to the reference subset, the device key corresponding to the detected subset is taken as the decryption key for the encrypted media key.

The playback apparatus 400 also obtains a decryption key for the encrypted media key in the same operation as described above.

(11) In the embodiment described above, the fields of the device key table D100 record subsets, labels corresponding to the subsets, and the device keys corresponding to the labels; however, the present invention is not limited to this arrangement. The fields of the device key table D100 may record subsets and labels corresponding to the subsets.

In such a case, in the generation process of a piece of key revocation data, the key management apparatus 100 generates a device key using a label that is in correspondence with the obtained subset and generates an encrypted media key using the generated device key. The key management apparatus 100 then records the generated encrypted media key and obtained subset onto the recording medium 200*a* as a piece of key revocation data.

(12) In the embodiment described above, each piece of key information is made up of a label and a subset that is in correspondence with the label; however, the present invention is not limited to this arrangement. It is acceptable to use path information instead of subsets, the path information being described in the following section.

A piece of path information is made up of a root number and a generation path.

A root number indicates in what place from the top in the interrelation table D101, a subset being the root of a tree structure to which the subset corresponding to the distributed label belongs is positioned. In other words, the root number indicates in what place from the left in the lowermost line of the device key table D100, the subset being the root is positioned. For example, in the case where the subset "1" is the root, the root number is "1", and in the case where the subset "3" is the root, the root number is "3".

A generation path is a path on which a distributed label is generated from the label assigned to a subset being a root, and is expressed as 0, 1, 2, and a combination of 1 and 2. "0" denotes a label itself, i.e. the label assigned to the node being the root. "1" denotes a shift to the right from the parent node; in other words, out of the right and left labels generated by the parent node, the right label is assigned to the child node. "2" denotes a shift to the left from the parent node; in other words, out of the right and left labels generated by the parent node, the left label is assigned to the child node. For example, the generation path of the label "A1" shown in FIG. 5 is "0". The generation path of the label "A1RL" is "12". The generation path of the label "A5RLRR" is "1211".

It should be noted that in the following description, each piece of path information is expressed as "root number-generation path".

The distributing unit 104 of the key management apparatus 100 receives a distribution instruction and an apparatus identifier, generates and obtains one or more pieces of key information each of which contains a label to be distributed to the apparatus identified with the received apparatus identifier and a piece of path information corresponding to the label. The distributing unit 104 distributes the obtained one or more pieces of key information to the apparatus identified with the received apparatus identifier.

The following describes the operation for path information obtainment, with reference to FIGS. 26 and 27, the description focusing on the differences.

Firstly, the operation in Step S445 is changed to an operation for judging whether or not a piece of path information corresponding to the detected subset has already been stored in the key information storing area. In this situation, in the case where the distributing unit 104 judges in Step S445 that the piece of path information corresponding to the detected subset has not been stored yet, the distributing unit 104 executes Step S450.

The operation in Step S455 is changed as follows:

Step S455 after the change: The distributing unit 104 judges whether the detected node is the root of the tree structure Vi. In the case where the judgment result is that the detected subset is a root, the generation path is "0". In the case where the judgment result is that the detected subset is not a root, a generation path from the root to the detected node is obtained. Further, the distributing unit 104 obtains a root number of the root of the tree structure Vi. In this case, i is the root number. The distributing unit 104 generates a piece of path information being made up of the obtained root number and the generation path, and generates and obtains a piece of key information that contains the generated path information and the read label.

Subsequently, the operation in Step S475 is omitted. The operation in Step S480 is changed so that all the pieces of key information are distributed to the apparatus identified with the received terminal apparatus identifier. It should be noted that "to distribute" here means, for example, to complete the writing of the received apparatus identifier and the one or more pieces of key information stored in the key information storing area, onto the recording medium to be distributed.

Further, in the generation process of key revocation data, the key management apparatus 100 firstly obtains one or more subsets based on what is stored in the revoked apparatus storing area, like in the embodiment described above. The key management apparatus 100 obtains labels that are in correspondence with the obtained subsets and device keys. Further, using the obtained device keys, the key management apparatus 100 generates encrypted media keys. The key management apparatus 100 then obtains a piece of path information using the tree structures to which the obtained subsets belong. The method for obtaining the piece of path information is, at first, the key management apparatus 100 obtains a subset being the root to which the subset belongs, and obtains a root number using the obtained root subset and the interrelation table D101. Further, the key management apparatus 100 obtains a generation path by finding out the path from the root to the subset having the obtained label, and generates a piece of path information from the obtained root number and generation path. The process of obtaining the generation path is the same as described above. The key management apparatus 100 brings generated pieces of path information into correspondence with encrypted media keys so as to generate pieces of key revocation data, and writes the generated pieces of key revocation data onto the recording medium 200a. For example, in the case where the apparatus 4 and the apparatus 5 are revoked, the key management apparatus 100 obtains the subset "123" and the subset "678" and further obtains the device keys "K3" and "K33" that are in correspondence with the subsets, as well as the pieces of path information "1-12" and "7-11" that are for the labels in correspondence with the subsets.

Figure 39:
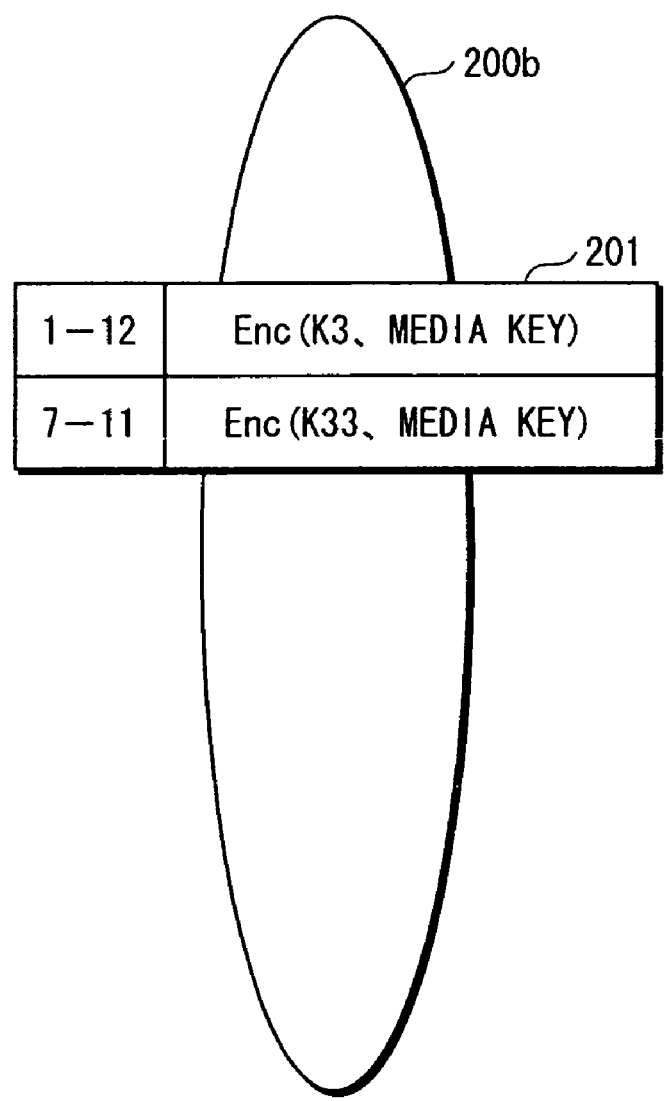
FIG. 39 shows a recording medium 200b on which only key revocation data is recorded.
Figure 42:
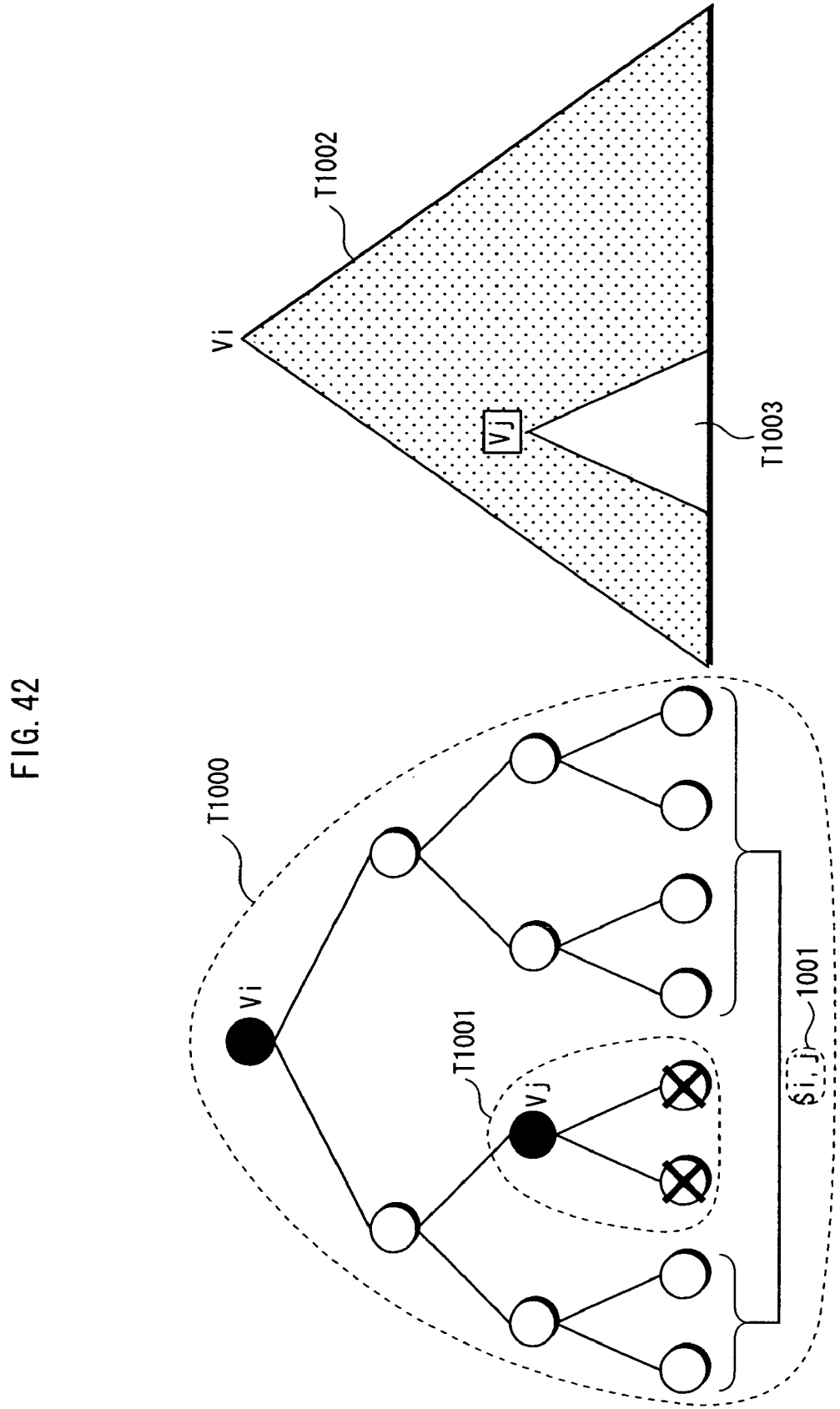
FIG. 42 shows a concept of subset difference in a conventional technique.
Figure 43:
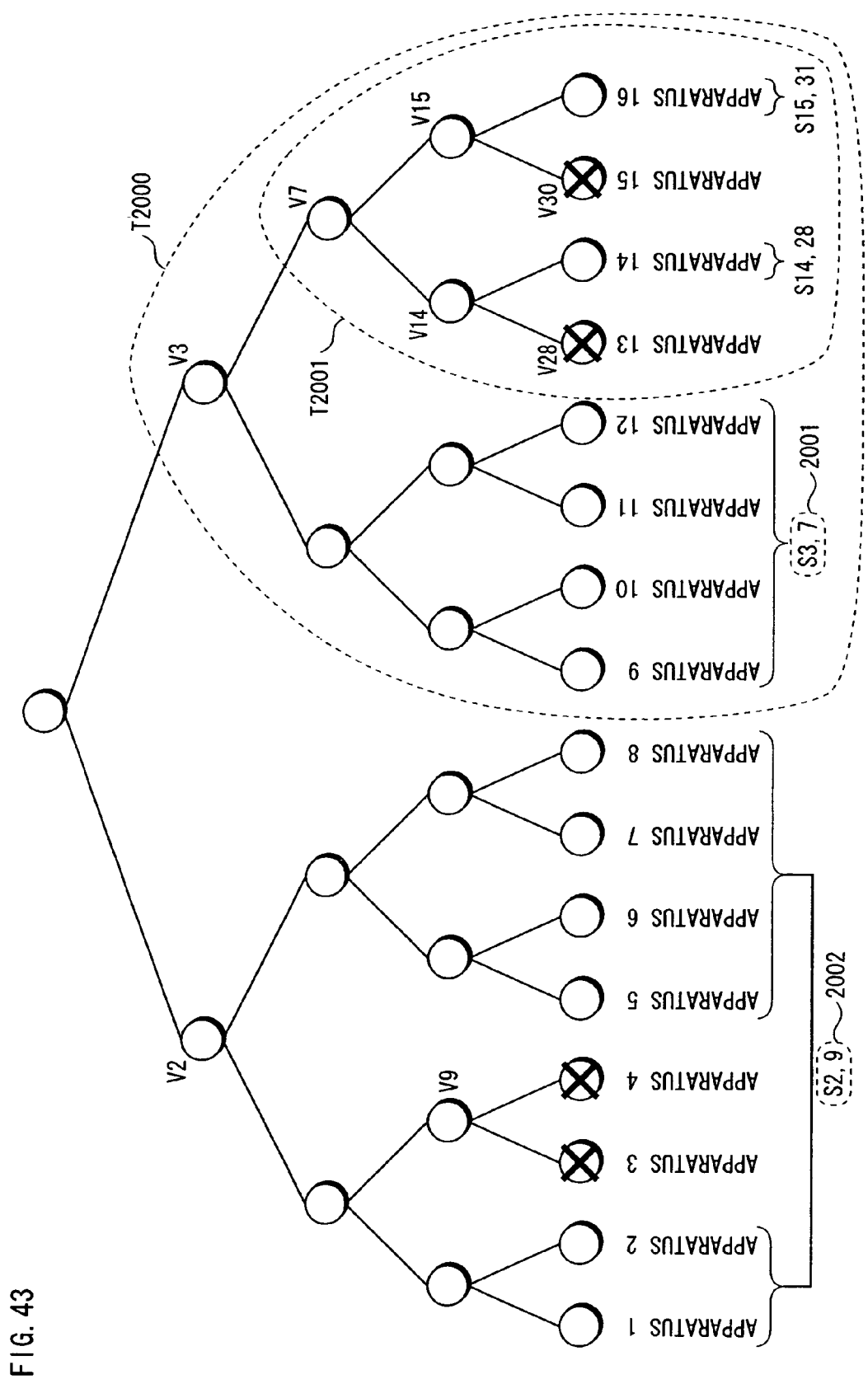
FIG. 43 is an example that shows a subset difference in a conventional technique.
Figure 44:
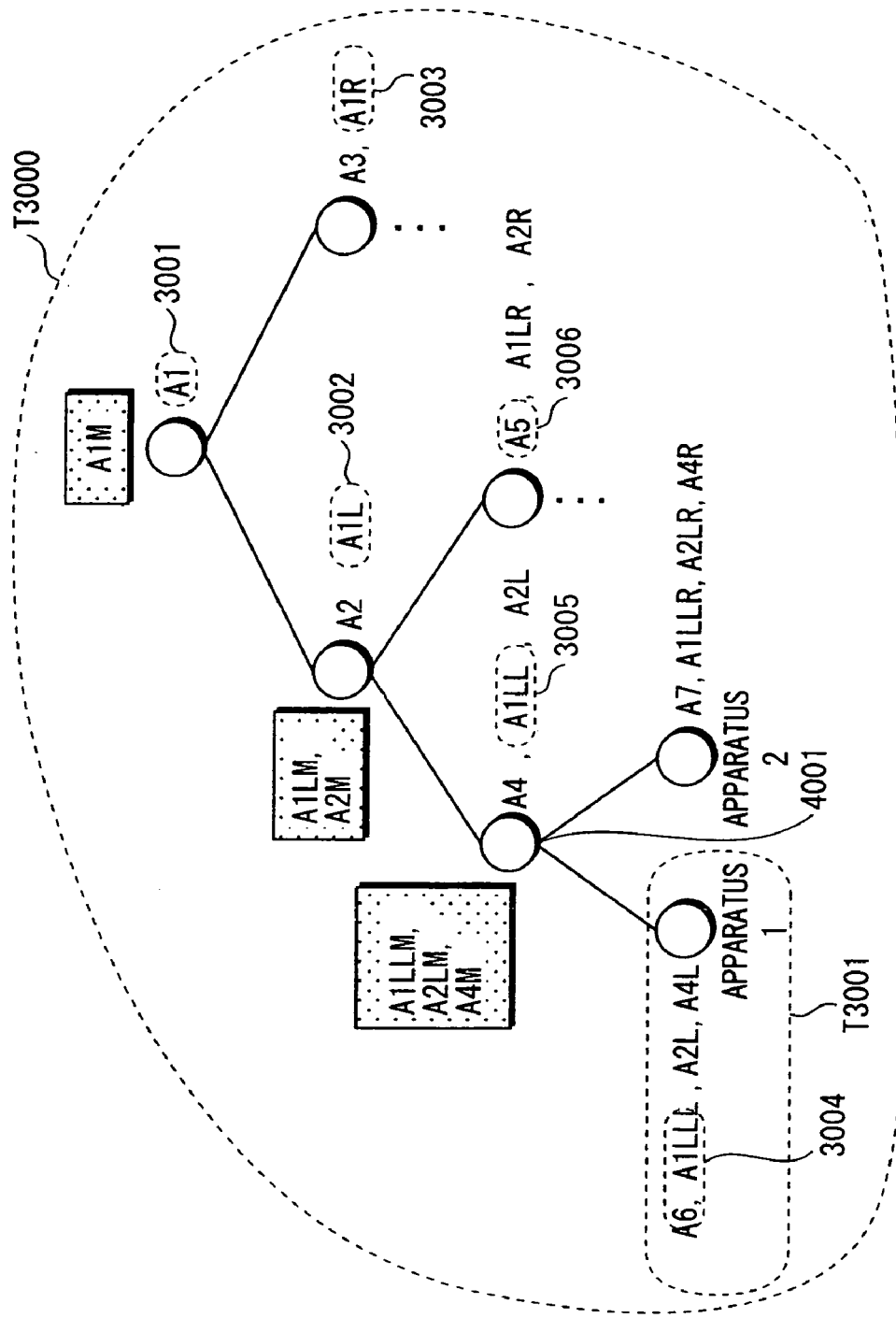
FIG. 44 is an example that shows label assignment in a conventional technique.

Further, in the case where the apparatus 4 and the apparatus 5 are revoked, the pieces of key revocation data recorded on the recording medium 200b are shown in FIG. 39. Each piece of key revocation data is, as described above, made up of an encrypted media key and a piece of path information for a label that is in correspondence with the device key used in the encryption of the media key. In the case where the apparatus 4 and the apparatus 5 are revoked, the recording medium 200b records thereon two pieces of key revocation data as described above.

The pieces of key information stored in the apparatuses are shown in FIG. 40. The upper level of each piece of key information indicates a piece of path information and the lower level indicates a label.

Here, the following describes decryption process of an encrypted media key performed by the recording apparatus 300 with reference to FIGS. 29, 30, and 31, the description focusing on the differences. It should be noted that since the first and second encryption processings are the same as the ones described in the embodiment above, explanation will be omitted.

<Differences in the Recording Processing>

At first, the operation in Step S605 is changed to an operation for reading a piece of path information (hereafter, it will be referred to as reference path information) out of pieces of path information that are in correspondence with the one or more encrypted media keys recorded on the recording medium 200b, via the inputting and outputting unit 309 from the recording medium 200b mounted on the recording apparatus 300.

Next, the operation in Step S610 is changed to an operation for reading one or more pieces of key information.

Then, the operation in Step S615 is changed as follows:

Step S615 after the change: The decryption key generating unit 304 searches for, out of the read one or more pieces of key information, a piece of path information (hereafter, it will be referred to as a piece of detected path information) that (i) has a root number that matches the root number of the piece of reference path information (hereafter, it will be referred to as a reference root number) and also (ii) has a generation path being "0" or has a generation path being in a left-forward match with a generation path contained in the piece of reference path information (hereafter, it will be referred to as a reference generation path). Here, explanation will be provided for the left-forward match. First, the number of numerals used to express a generation path is regarded as the length of the generation path. For example, the length of the generation path "2" is one, and the length of the generation path "12121" is five. In the example in which the reference generation path is p1 and the generation path is p2, to be in a left-forward match is either p1=p2 is satisfied or p1=p2∥p3 is satisfied. Here, the length of p3 is one or larger. For example, the generation path "1" and the generation path "121" are in a left-forward match with the generation path "12" and the generation path "1211" respectively. The method of searching will be described later using specific examples.

Next, the operation in Step S620 is changed into an operation for judging whether or not a piece of detected path information has been detected. The operation in Step S625 is changed into an operation for judging whether or not an unread piece of reference path information exists. Further, the operation in Step S630 is changed into an operation for reading the piece of reference path information.

Here, the method for searching is explained with specific examples. It is assumed that the recording medium 200b mounted on the recording apparatus 300 records thereon two pieces of key revocation data shown in FIG. 39. In the case where the recording apparatus 300 has the apparatus identifier 2, the decryption key generating unit 304 judges whether or not the reference root number "1" exists in the pieces of path information contained in the read pieces of key information. In the present example, the judgment result is that the reference root number "1" exists, and a piece of path information "1-1" is obtained. Then, the decryption key generating unit 304 judges whether or not the generation path is "0". Here, the judgment result is it is not "0". Subsequently, the decryption key generating unit 304 judges whether or not the generation path "1" of the obtained piece of path information "1-1" is in a left-forward match with the reference generation path. In the present example, the judgment result is that it is in a left-forward match, and the piece of path information "1-0" is detected as a piece of detected path information.

In the case where the recording apparatus 300 has the apparatus identifier 7, since the recording apparatus 300 does not store a piece of path information having the reference root number "1", the decryption key generating unit 304 reads a next piece of reference path information "7-11" from the recording medium 200b. The decryption key generating unit 304 judges whether or not the reference root number "7" exists in the pieces of path information contained in the read pieces of key information. In the present example, the judgment result is that it exists, and the decryption key generating unit 304 obtains a piece of path information "7-0". Subsequently, the decryption key generating unit 304 judges whether or not the generation path is "0". In the present example, the judgment result is that it is "0", and the decryption key generating unit 304 detects a piece of path information "7-0" as a piece of detected path information.

<Differences in the Device Key Obtainment Processing>

Firstly, the operation in Step S700 is changed into an operation for obtaining a label that is in correspondence with a piece of detected path information.

Next, the operation in Step S705 is changed into an operation for obtaining a difference Z between the length of the reference generation path and the length of the detected generation path.

The control for the repetition of Step S710 through Step S740 is changed so that the repetition is performed from z=1 to z=Z+1.

The judgment operation in Step S720 is changed into an operation for judging whether or not a numeral exists in a "(the length of the detected generation path+z)"'th place in the reference generation path.

The judgment operation in Step S725 is changed into an operation for judging whether or not the numeral positioned in the "(the length of the detected generation path+z)"'th place is 2.

The operation in Step S745 is changed into an operation for obtaining a device key from a random number obtained in a (Z+1)'th time.

The operation in Step S750 is changed into an operation for outputting the device key and the piece of reference path information to the decrypting unit 305.

<Differences in the Decryption Processing>

The operation in Step S800 is changed into an operation for receiving the device key and the piece of reference path information.

The operation in Step S805 is changed into an operation for obtaining an encrypted media key that is in correspondence with the piece of reference path information.

Due to these changes, the recording apparatus 300 is able to decrypt the encrypted media key using a piece of key information being made up of a label and a piece of path information and to generate a media key.

For the decryption processing of the encrypted media key performed by the playback apparatus 400, the similar changes described above are to be made to the processings shown in FIGS. 34, 35, and 36; therefore, explanation will be omitted.

(13) In (12), the key management apparatus 100 generates path information when distributing key information and when generating key revocation data; however, the present invention is not limited to this arrangement. It is acceptable to have an arrangement wherein the key management apparatus 100 generates path information when generating a device key and records a group made up of the generated path information, a subset, a label, and a device key into the device key table D100. With this arrangement, all the key management apparatus 100 has to do when distributing key information and when S generating key revocation data is to read the path information from the device key table D100.

(14) In the embodiment described above, one subset generated in the layer 0 is associated with another subset generated in the layer 1, and one subset generated in the layer 1 is associated with another subset generated in the layer 2; however, the present invention is not limited to this example.

For example, it is acceptable to associate only the one subset generated in the layer 0 with the one subset generated in the layer 1.

In such a case, the labels distributed to the apparatus 1 are five pieces of key information being made up of the subset "1", the subset "12", the subset "123", the subset "125678", the subset "1345678", and the labels corresponding to the subsets; therefore, the number of the pieces of key information to be distributed is smaller than in a conventional case.

Alternatively, it is acceptable to associate only the one subset generated in the layer 1 with the one subset generated in the layer 2.

In such a case, also, the number of the pieces of key information to be distributed to the apparatus 1 is smaller than in a conventional case.

(15) In the present invention, associating a plurality of generated subsets with one another may be construed as a method described above.

It is also acceptable to have an arrangement wherein one or more subsets generated in the layers are associated with one another, and after the subsets are associated with one another in each layer, the subsets are associated with one another across the layers.

For example, after generating the device key table D100a shown in FIG. 10, the key management apparatus 100 at first generates two tree structures whose root is a subset being made up of a smallest number of elements and whose child node is a subset that contains its parent node and is made up of a smallest number of elements, using the subsets generated from a tree structure whose root is a node in a layer 0, i.e. using the subsets recorded in 501 in the first line, 502 in the second line, and 503 in the third line in the device key table D100a. In other words, a tree structure whose root is the subset "1234" and a tree structure whose root is the subset "5678" are generated.

Subsequently, the key management apparatus 100 generates four tree structures whose root is a subset being made up of a smallest number of elements and whose child node is a subset that contains its parent node and is made up of a smallest number of elements, using the subsets generated from a tree structure whose root is a node in the layer 1, i.e.

using the subsets recorded in 504 in the fourth line and in 505 in the fifth line in the device key table D100a.

Further, the key management apparatus 100 generates eight tree structures whose root is a subset being made up of a smallest number of elements and whose child node is a subset that contains its parent node and is made up of a smallest number of elements, using the subsets generated from a tree structure whose root is a node in the layer 2, i.e. using the subsets recorded in 506 in the sixth line in the device key table D100a. Each of these eight tree structures is made of only a root.

Figure 11:
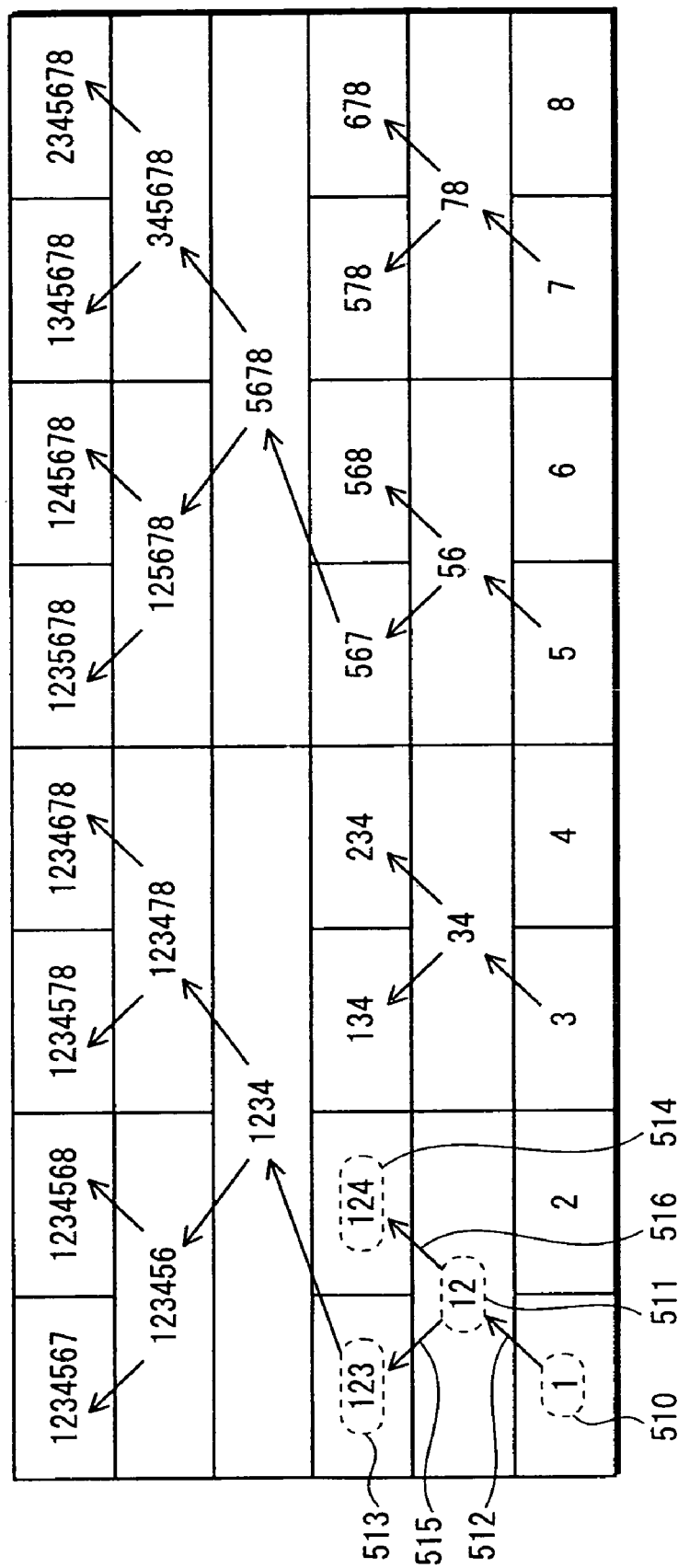
FIG. 11 is a table that shows interrelations among subsets.

Subsequently, the tree structures having been generated are associated with one another in the following manner. Firstly, the tree structure whose root is the subset "1" is associated with the tree structure that contains the subset "1" and whose root is a subset being made up of a smallest number of elements, in the present example with the tree structure whose root is the subset "12". Further, the tree structure whose root is the subset "12" is associated with the tree structure that contains one leaf of this tree structure (in the present example the subset "123") and whose root is a subset being made up of a smallest number of element, in the present example with the tree structure whose root is the subset "1234". By repeating this operation as many times as the number of the subsets each being made up of one element, interrelational association is made among the subsets in the same manner as shown in FIG. 11. It should be noted that a subset tree structure that has once been associated will not be used in other association processing.

(16) In the embodiment described above, a label is assigned to each of the nodes in a tree structure while tree structures of subsets are being structured, in other words, while an interrelation table is being generated; however, the present invention is not limited to this example. It is acceptable to assign a label to each node after the tree structures of subsets have been structured, in other words, after the interrelation table has been generated.

(17) The present invention may be of methods described as above. Alternatively, the present invention may be of a computer program that realizes these methods with the use of a computer, or may be of digital signals converted from such a computer program.

It is acceptable to consider that the present invention is a computer-readable recoding medium e.g. a flexible disk, a hard disk, a CD-ROM, an MO, a DVD, a DVD-ROM, a DVD-RAM, a BD (Blu-ray Disc), and a semiconductor memory, that records such a computer program or such digital signals thereon; or to consider that the present invention is such a computer program or such digital signals recorded on such a recording medium.

Further, it is acceptable to consider that the present invention is realized through transmission of such a computer program or such digital signals via telecommunication lines, wireless or wired communication lines, a network such as the Internet, or the like.

Moreover, it is acceptable to consider that the present invention is a computer system comprising a microprocessor and a memory, wherein the memory stores therein the computer program, and the microprocessor operates according to the computer program.

Furthermore, it is acceptable to execute the aforementioned program or digital signals on an independent computer system by delivering the program or digital signals recorded on a recording medium or via the aforementioned network or the like.

(18) It is acceptable to combine any of the embodiment described above and the modification examples.

1.10 Summary

The key management apparatus arbitrarily selects some of a plurality of terminal apparatuses and generates a plurality of permission sets. One key is assigned to each permission set. A piece of data is encrypted with the key assigned to a permission set, and each of the terminal apparatuses contained in the permission set is able to use the encrypted piece of data. A first permission set is associated with a second permission set. Because of this association, the key for the second permission set is generated from the key for the first permission set. The key management apparatus divides the plurality of terminal apparatuses into groups. For a group, some of the plurality of terminal apparatuses contained in the group are arbitrarily selected so that a plurality of permission sets are generated. One key is assigned to each permission set. A piece of data is encrypted with the key assigned to a permission set, and each of the terminal apparatuses contained in the permission set is able to use the encrypted piece of data. A third permission set is associated with a fourth permission set. Because of this association, the key for the fourth permission set is generated from the key for the third permission set. The key management apparatus associates the first permission set with the fourth permission set.

Here, relationship among subsets discussed in the Non-Patent Document 1 will be explained. According to the relationship among subsets discussed in the Non-Patent Document 1, association that is the same as the present invention is made among a plurality of subsets generated from a sub-tree whose root is a node positioned in a layer i (where i is 0 or larger). For example, from a sub-tree whose root is E1 shown in FIG. 3, the subsets "12", "123", "124", "34", "134", and "234" are generated. As for the association among the subsets, as shown in FIG. 11, the subset "12" is associated with the subsets "1123" and "124", and also the subset "34" is associated with the subsets "134" and "234". However, the subsets are not associated with one another across two sub-trees. Accordingly, the sub-trees are independent from each other.

To be more specific, in the relationship among the subsets according to the Non-Patent Document 1, the association between the subset "1" and the subset "12", the association between the subset "123" and the subset "1234", the association between the subset "3" and the subset "34", the association between the subset "5" and the subset "56", the association between the subset "567" and the subset "5678", and the association between the subset "7" and the subset "78" are missing from the relationship shown in FIG. 11. Accordingly, with the use of the conventional technique, it is necessary to distribute, for example to the apparatus 1, six labels such as the label for the subset "1", the label for the subset "12", the label for the subset "134", the label for the subset "1234", the label for the subset "125678", and the label for the subset "1345678".

According to the present invention, however, out of two sub-trees whose roots are two nodes that are in a parent-child relationship and whose roots are two different nodes, a subset F1 that has a largest number of elements out of a plurality of subsets generated from a sub-tree whose root is the child node is associated with a subset F2 that contains the subset F1 and is made up of a smallest number of elements out of a plurality of subsets generated from a sub-tree whose root is the parent node. Accordingly, the subsets are associated with one other across two sub-trees so that association is made among the sub-trees. Thus, it is possible to reduce the number of labels to be distributed.

For example, since the subset "1" is associated with the subset "12", as shown in FIG. 41, in the tree structure T100, the sub-tree T501 whose root is the node T510 "E3" is associated with the sub-tree T502 whose root is the node T511 "E1". The labels corresponding to the subsets "12", "123", and "124" generated from the sub-tree T502 are generated from the label corresponding to the subset "1" generated from the sub-tree T501, using the pseudo random number generator G150. Further, since the subset "123" is associated with the subset "124", as shown in FIG. 41, the sub-tree T502 whose root is the node T511 "E1" is associated with the sub-tree T503 whose root is the node T512 "E0". The labels corresponding to the subsets "1234", "123456", "124123478", "1234567", "1234568", "1234578" and "1234678" generated from the sub-tree T503 are generated from the label corresponding to the subset "123" generated from the sub-tree T502, in other words, generated from the label corresponding to the subset "1" generated from the sub-tree T501, using the pseudo random number generator G150. Accordingly, the key management apparatus 100 does not have to distribute, to the apparatus 1, the label for the subset "12" and the label for the subset "1234". The key management apparatus 100 needs to distribute only four labels to the apparatus 1, namely the label for the subset "1", the label for the subset "134", the label for the subset "125678", and the label for the subset "1345678".

Further, according to the technique disclosed in the Non-Patent Document 1, it is necessary to assign mutually different labels to the nodes of the tree structure that manages the apparatuses, respectively, in other words, to the roots of the sub-trees; however, according to the present invention, as described above, since sub-trees are associated with one other, there is no need to assign mutually different labels respectively to the roots of the sub-trees. Thus, it is possible to reduce the number of the mutually different labels from that of the conventional example.

In addition, since the key management apparatus 100 generates key revocation data, it is not possible to calculate a key required for recording or playback of a content, from a label owned by an illegitimate apparatus. Each of one or more legitimate apparatuses other than the illegitimate apparatus is able to calculate a key required for recording or playback of a content, from a label owned in the apparatus.

According to the conventional key revocation technique disclosed in the Non-Patent Document 1, one of the problems is that when the number of the apparatuses increases, the number of the labels to be stored in each apparatus becomes huge. For example, when a system with approximately one billion apparatuses (binary trees having a height of 30) is considered, the number of the labels to be stored in each apparatus is 465. According to the present invention, however, it is possible to reduce the number of the keys stored in each apparatus. More specifically, when the height of the tree structure is T, and the total number of apparatuses belonging to the system is Q, (T−1) keys are reduced in as many as Q/2 apparatuses, and (T−2) keys are reduced in as many as Q/4 apparatuses, and (T−k) keys are reduced in as many as Q/(2^k) apparatuses, where k is an integer being 1 or larger and no larger than T−1.

The key revocation system according to the present invention has an effect of reducing the number of the labels stored in the apparatuses, i.e. the number of the keys, by making the labels stored in the apparatuses, i.e. the keys, have interrelationship. When stationary-type apparatuses and mobile terminal apparatuses both exist in a system, the present invention is useful for realizing key revocation for the system, since it is possible to assign a smaller number of keys to each mobile terminal apparatus that has a smaller storage capacity.

The present invention provides a copyright protection system including a key management apparatus that generates and distributes revocation information for revoking a specified apparatus; a recording medium that records the revocation information; and a terminal apparatus that reads and processes the revocation information from the recording medium, wherein the key management apparatus comprises: a subset generating unit operable to generate a subset of terminal apparatuses belonging to the copyright protection system; an assignment unit operable to assign a key to the subset; a key generating unit operable to generate a key for another subset that contains the subset from the assigned key; and a revocation information generating unit operable to generate revocation information based on the assigned key.

The present invention also provides the copyright protection system wherein the key generation unit of the key management apparatus generates the key for said another subset from the assigned key, using a one-way function.

The present invention also provides the copyright protection system wherein the key generating unit of the key management apparatus generates keys for a plurality of other subsets from the assigned key.

Further, the present invention provides the copyright protection system, wherein the key management apparatus includes a storing unit storing therein correspondence relationship between the subsets and the assigned keys as well as the interrelationship among the generated keys.

The present invention further provides the copyright protection system wherein the storing unit of the key management apparatus manages the correspondence relationship between the subsets and the assigned keys as well as the interrelationship among the generated keys with the use of a table and stores therein the table.

The present invention further provides the copyright protection system wherein the key management apparatus includes a key distributing unit operable to distribute the key assigned to the subset to the terminal apparatus, wherein the key distributing unit selects a smallest subset out of subsets containing the terminal apparatus to which the key is distributed and distributes the key assigned to the selected subset, and further selects a smallest subset that contains the terminal apparatus out of the subsets obtained by excluding a subset to which a key generated from the distributed key is assigned and distributes the key assigned to the selected subset.

The present invention provides the copyright protection system wherein, the revocation information generating unit of the key management apparatus selects a largest subset that contains only unrevoked terminal apparatuses and further selects, for the terminal apparatuses that are not contained in the selected largest subset, a largest subset that contains only those terminal apparatuses, and repeatedly performs these selecting operations until each of all the unrevoked apparatuses is contained in a certain subset.

The present invention provides the copyright protection system, wherein the terminal apparatus includes a storage unit that stores therein a key for processing the revocation information, and the storage unit stores therein a key assigned to a subset that contains the terminal apparatus.

The present invention provides the copyright protection system wherein the storage unit of the terminal apparatus also stores therein information indicating correspondence relationship among keys and subsets.

The present invention further provides the copyright protection system wherein the storage unit of the terminal apparatus does not store therein a key that is for a subset and can be generated from a key assigned to another subset.

The present invention further provides the copyright protection system wherein the terminal apparatus includes a key generating unit operable to generate a key assigned to another subset from the key stored in the storage unit, and the key generating unit generates the key assigned to said another subset according to the correspondence relationship between the subsets and the keys and the interrelationship among the generated keys.

The present invention provides the copyright protection system, wherein the terminal apparatus includes a recording unit operable to record an encrypted content onto the recording medium.

Further, the present invention provides the copyright protection system, wherein, the terminal apparatus includes a playback unit operable to read, decrypt, and play back the encrypted content from the recording medium.

The present invention also provides the copyright protection system wherein the revocation information generated by the key management apparatus has information provided indicating based on a key for which subset, the revocation information is generated.

The present invention provides the copyright protection system, wherein a communication medium is used instead of the recording medium.

The present invention further provides a key management apparatus that generates and distributes revocation information for revoking a specified apparatus, the key management apparatus comprising: a subset generating unit operable to generate a subset of terminal apparatuses belonging to the copyright protection system; an assignment unit operable to assign a key to the subset; a key generating unit operable to generate a key for another subset that contains the subset from the assigned key; and a revocation information generating unit operable to generate revocation information based on the assigned key.

The present invention further provides the key management apparatus wherein the key generation unit generates the key for said another subset from the assigned key, using a one-way function.

The present invention also provides the key management apparatus wherein the key generating unit generates keys for a plurality of other subsets from the assigned key.

The present invention provides the key management apparatus comprising a storing unit that stores therein correspondence relationship between the subsets and the assigned keys as well as the interrelationship among the generated keys.

The present invention further provides the key management apparatus wherein the storing unit manages the correspondence relationship between the subsets and the assigned keys as well as the interrelationship among the generated keys with the use of a table and stores therein the table.

The present invention further provides the key management apparatus including a key distributing unit operable to distribute the key assigned to the subset to the terminal apparatus, wherein the key distributing unit selects a smallest subset out of subsets containing the terminal apparatus to which the key is distributed and distributes the key assigned to the selected subset, and further selects a smallest subset that contains the terminal apparatus out of the subsets obtained by excluding a subset to which a key generated from the distributed key is assigned and distributes the key assigned to the selected subset.

The present invention provides the key management apparatus wherein, the revocation information generating unit selects a largest subset that contains only unrevoked terminal apparatuses and further selects, for the terminal apparatuses that are not contained in the selected largest subset, a largest subset that contains only those terminal apparatuses, and repeatedly performs these selecting operations until each of all the unrevoked apparatuses is contained in a certain subset.

The present invention further provides a terminal apparatus that reads and processes revocation information from a recording medium, the terminal apparatus comprising a storage unit that stores therein a key for processing the revocation information, and the storage unit stores therein a key assigned to a subset that contains the terminal apparatus.

The present invention provides the terminal apparatus wherein the storage unit also stores therein information indicating correspondence relationship between keys and subsets.

The present invention further provides the terminal apparatus wherein the storage unit does not store therein a key that is for a subset and can be generated from a key assigned to another subset.

The present invention further provides the terminal apparatus comprising a key generating unit operable to generate a key assigned to another subset from the key stored in the storage unit, and the key generating unit generates the key assigned to said another subset according to the correspondence relationship between the subsets and the keys and the interrelationship among the generated keys.

The present invention provides the terminal apparatus comprising a recording unit operable to record an encrypted content onto the recording medium.

Further, the present invention provides the terminal apparatus comprising a playback unit operable to read, decrypt, and play back the encrypted content from the recording medium.

The present invention provides a recording medium that records thereon revocation information for revoking a specified apparatus, the revocation information being generated by a key management apparatus that includes: a subset generating unit operable to generate a subset of terminal apparatuses belonging to the copyright protection system; an assignment unit operable to assign a key to the subset; a key generating unit operable to generate a key for another subset that contains the subset from the assigned key; and a revocation information generating unit operable to generate revocation information based on the assigned key.

The present invention further provides the recording medium wherein the revocation information generated by the key management apparatus has information provided indicating based on a key for which subset, the revocation information is generated, and the recording medium records thereon the key revocation information along with the provided information.

INDUSTRIAL APPLICABILITY

The apparatuses and the recording medium constituting the present invention may be administratively, continuously, and repeatedly manufactured and sold by the electronics manufacturing industry. Further, the apparatuses and the recording medium constituting the present invention may be administratively, continuously, and repeatedly utilized by the content distributing industry for creating and distributing contents.

The invention claimed is:

1. A management apparatus that manages a plurality of terminal apparatuses by arranging apparatus identifiers for identifying the plurality of terminal apparatuses to be leaves of a tree structure and assigning pieces of unique information to the apparatus identifiers respectively, the pieces of unique information being bases of decryption keys for decrypting a piece of encrypted data, the management apparatus comprising:
- a subset generating unit operable to calculate and generate, for each of nodes in layers except for the leaves of the tree structure, a subset defined, by a subset difference, as a set being made up of one or more apparatus identifiers positioned subordinate to the node;
- a first association unit operable to search, with respect to a node positioned in a lowermost layer other than a leaf layer, for a subset that wholly contains another subset from among a plurality of subsets generated by the subset generating unit for a parent node of the node positioned in an immediately upper layer thereof, and to associate the another subset as an association source with the subset as an association destination;
- a second association unit operable to search for another subset that wholly contains the subset being an association destination, from among one or more other subsets generated for a node for which the subset was generated, and a plurality of subsets positioned in an immediately upper layer thereof and generated by the subset generating unit for a parent node of the node, and to associate the subset as a new association source with the another subset as a new association destination;
- a first control unit operable to control the second association unit so that processing thereof is repeatedly performed up to an uppermost layer;
- a second control unit operable to control the first association unit, the second association unit, and the first control unit so that processings thereof are repeatedly performed on all subsets generated for respective nodes in the lowermost layer;
- a first assignment unit operable to bring pieces of unique information into correspondence respectively with the subsets generated for respective nodes in the lowermost layer, and to assign each piece of unique information to apparatus identifiers contained in the corresponding subset in the lowermost layer; and
- a second assignment unit operable to bring, for a subset being an association source generated for a node in one of layers and one or more subsets being association destinations positioned in an immediately upper layer thereof and generated for a parent node of the node, pieces of new unique information into correspondence respectively with the one or more subsets being association destinations, and to assign the pieces of new unique information to apparatus identifiers contained in the one or more subsets being association destinations, the pieces of new unique information being obtained by performing a prescribed operation on pieces of unique information corresponding to the subset being an association source, the prescribed operation being to generate corresponding decryption keys and generate the pieces of new unique information derivatively obtained from the pieces of unique information.

2. The management apparatus of claim 1, wherein
the subset that is searched for by the first association unit and wholly contains said another subset in the lowermost layer is made up of a smallest number of elements, and the first association unit associates said another subset being a parent node with the searched subset being a child node,
the subset that is searched for by the second association unit and wholly contains the containing subset being the association destination is made up of a smallest number of elements, and the second association unit associates the association destination subset being a parent node with the searched subset being a child node, and
the first control unit controls the second association unit so that processing thereof is performed repeatedly up to the uppermost layer and generates subset trees whose roots are the subsets in the lowermost layer.

3. The management apparatus of claim 2, wherein
the first association unit controls the second association unit so that processings thereof are repeatedly performed up to the uppermost layer, using one or more subsets obtained by excluding one or more subsets having been associated from subsets positioned in upper layers of the lowermost layer and generates subset trees whose roots are the subsets in the lowermost layer.

4. The management apparatus of claim 3, wherein
the second assignment unit generates the pieces of derivative unique information from the pieces of unique information, using a one-way function and brings the generated pieces of derivative unique information into correspondence with the extending subsets.

5. The management apparatus of claim 4, further comprising:
- a unique information obtaining unit operable to obtain, in a case where a subset in which an identifier of a terminal apparatus being a distribution destination of a piece of unique information appears as an element for a first time exists on one or more paths from the roots to one or more leaves of the subset trees, one or more pieces of unique information being in correspondence with such a subset; and
- a distributing unit operable to distribute, to the terminal apparatus being the distribution destination, one or more groups each being made up of a different one of the obtained pieces of unique information and set identification information that identifies the subset that is in correspondence with the piece of unique information.

6. The management apparatus of claim 5, wherein the unique information obtaining unit includes:
- a first obtaining unit operable to search for the subset in which the identifier of the terminal apparatus being the distribution destination appears as an element for the first time in the one or more paths from the roots to the one or more leaves of the subset trees and, in the case where such a subset has been detected and has not been obtained, to obtain the detected subset;
- a second obtaining unit operable to obtain the one or more pieces of unique information that are in correspondence with the subset obtained by the first obtaining unit; and
- a repetition controlling unit operable to control the first and second obtaining units so that processings thereof are repeatedly performed until all of the one or more paths are searched.

7. The management apparatus of claim 5, further comprising:
- a first storing unit having an area for storing subsets being constituent elements of the subset trees and pieces of unique information that are respectively in correspondence with the subsets;
- a second storing unit having an area for storing a plurality of nodes constituting the subset trees and child nodes of the plurality of nodes;
- a first writing unit operable to write the subsets and the pieces of unique information into the first storing unit, while the subsets are brought into correspondence with the pieces unique information; and
- a second writing unit operable to write the plurality of nodes and the child nodes of the plurality of nodes into the second storing unit, while the nodes are brought into correspondence with the child nodes.

8. The management apparatus of claim 7, wherein
the first storing unit has a first table storing therein a plurality of groups each being made up of a different one of the subsets and the corresponding piece of unique information,
the second storing unit has a second table storing therein a plurality of groups each being made up of a different one of the nodes and the corresponding child node,
the first writing unit writes the groups made up of the subsets and the corresponding pieces of unique information into the first table, and
the second writing unit writes the groups made up of the nodes and the child nodes into the second storing unit.

9. The management apparatus of claim 7, wherein
the second control unit generates a plurality of subset trees by controlling the first association unit, the second association unit, and the first control unit so that the processings thereof are repeatedly performed on all the subsets in the lowermost layer,
the first storing unit stores therein subsets contained in the plurality of subset trees and pieces of unique information that are in correspondence with the contained subsets, and
the management apparatus further comprises:
a revoked identifier storing unit having an area for storing one or more revoked identifiers indicating one or more revoked terminal apparatuses out of the plurality of terminal apparatuses;
an encryption key generating unit operable to obtain one or more of the subsets from the first storing unit based on what is stored in the revoked identifier storing unit, to obtain one or more encryption keys based on pieces of unique information that are respectively in correspondence with the obtained subsets, to encrypt a media key used for utilization of a content with the obtained encryption keys individually, so as to generate encrypted media keys that are equal in number to the one or more encryption keys; and
a third writing unit operable to write, onto a recording medium mounted on the management apparatus, one or more groups each being made up of a different one of the encrypted media keys and a piece of reference identification information for identifying a subset used for obtaining the encryption key for the encrypted media key.

10. The management apparatus of claim 9, further comprising:
a revoked identifier receiving unit operable to receive each revoked identifier and write the received revoked identifier into the revoked identifier storing unit.

11. The management apparatus of claim 9, wherein
the encryption keys are each a common key and are identical to the decryption keys,
the one-way function is further used for generating common keys based on the pieces of unique information from the pieces of unique information, and
the encryption key generating unit includes:
a subset obtaining unit operable to obtain, from the first storing unit, a subset that contains a largest number of one or more unrevoked identifiers which are other than the revoked identifiers stored in the revoked identifier storing unit;
a control unit operable to control the subset obtaining unit so that processing thereof is repeatedly performed until each of all the unrevoked identifiers belongs to any one of the one or more subsets obtained by the subset obtaining unit;
a common key obtaining unit operable to obtain, using the one-way function, one or more common keys generated from the pieces of unique information that are respectively in correspondence with the subsets obtained by the subset obtaining unit; and
an encrypting unit operable to generate encrypted media keys that are equal in number to the common keys, using the common keys obtained by the common key obtaining unit.

12. The management apparatus of claim 9, wherein
each piece of reference identification information is a corresponding subset used for obtaining a corresponding common key for the encrypted media key,
the third writing unit writes, onto the recording medium, one or more groups each being made up of a different one of the encrypted media keys and the corresponding subset used for obtaining the corresponding common key for the encrypted media key,
the distributing unit distributes, to the terminal apparatus being the distribution destination, one or more groups each being made up of a different one of the obtained pieces of unique information and a piece of set identification information that is one of the subsets with which the piece of unique information is in correspondence, and
the distributing unit further distributes a data structure indicating the subset trees.

13. The management apparatus of claim 9, further comprising:
a path information obtaining unit operable to obtain a piece of path information including (i) a generation path indicating, for each subset, a path that extends from a root subset being a root of a subset tree to which the subset belongs and reaches the subset, and (ii) a root identifier indicating the root subset, wherein
the reference identification information is a piece of path information for the subset used for obtaining the encryption key for the encrypted media key,
the third writing unit writes, onto the recording medium, one or more groups each being made up of a different one of the encrypted media keys and a piece of path information for the subset used for obtaining the encryption key for the encrypted media key, and
the distributing unit distributes, to the terminal apparatus being the distribution destination, one or more groups each being made up of a different one of the obtained pieces of unique information and a piece of set identification information that is a piece of path information for the subset with which the obtained piece of unique information is in correspondence.

14. A terminal apparatus to which a piece of unique information being a base of a decryption key for decrypting a piece of encrypted data is assigned by a management apparatus that manages, with use of a tree structure, a plurality of apparatus identifiers identifying a plurality of terminal apparatuses, the terminal apparatus comprising:
a unique information storing unit storing therein a piece of unique information that contains an apparatus identifier of the terminal apparatus, out of pieces of unique information that have been distributed from the management apparatus in advance and are brought into correspondence with a plurality of subsets,
wherein the management apparatus (i) calculates and generates, for each of nodes in layers except for leaves of the tree structure, a subset defined, by a subset difference, as a set being made up of one or more apparatus identifiers positioned subordinate to the node, (ii) searches, with respect to a node positioned in a lowermost layer other than a leaf layer, for a subset that wholly contains another subset from among a plurality of subsets generated for a parent node of the node positioned in an immediately upper layer thereof, and performs a first association for associating the another subset as an association source with the subset as an association destination, (iii) searches for another subset that wholly contains the containing subset being an association destination, from among one or more other subsets generated for a node for which the subset was generated, and a plurality of subsets positioned in an immediately upper layer thereof and generated for a parent node of the node, and performs a second association for associating the subset as a new association source with the another subset as a new association destination, (iv) controls a second association unit so that the associating is repeatedly performed up to an uppermost layer, (v) performs control so that the first association, the second association, and the control on the second association unit are repeatedly performed on all subsets generated for respective nodes in the lowermost layer, (vi) performs a first assignment for bringing pieces of unique information into correspondence respectively with the subsets generated for respective nodes in the lowermost layer and to assign each piece of unique information to apparatus identifiers contained in the corresponding subset in lowermost layer, and (vii) performs a second assignment for bringing, for a subset being an association source generated for a node in one of layers and one or more subsets being association destinations positioned in an immediately upper layer thereof and generated for a parent node of the node, pieces of new unique information into correspondence respectively with the one or more subsets being association destinations, and to assign the pieces of new unique information to apparatus identifiers contained in one or more subsets being association destinations, the pieces of new unique information being obtained by performing a prescribed operation on pieces of unique information corresponding to the subset being an association source, the prescribed operation being to generate corresponding decryption keys and generate the pieces of new unique information derivatively obtained from the pieces of unique information.

15. The terminal apparatus of claim 14, wherein
the unique information storing unit further stores therein a piece of set identification information identifying a subset with which the stored piece of unique information is in correspondence, and
the terminal apparatus further includes:
a judging unit operable to judge whether the piece of set identification information indicates that the terminal apparatus is an unrevoked apparatus;
a first obtaining unit operable to, in a case where a judgment result of the judgment unit is in the affirmative, obtain an encrypted media key that (i) is obtained by encrypting a media key with an encryption key based on a specific piece of unique information out of the pieces of unique information in correspondence with the subsets generated by the management apparatus and (ii) is in correspondence with a piece of key related information related to the encryption key;
a second obtaining unit operable to obtain a decryption key that is in correspondence with the encryption key using the piece of unique information stored in the unique information storing unit; and
a decrypting unit operable to decrypt the encrypted media key obtained by the first obtaining unit, using the decryption key obtained by the second obtaining unit, so as to generate the media key.

16. The terminal apparatus of claim 15, wherein
the specific piece of unique information is a piece of reference unique information that is in correspondence with a subset that contains, at a time when the encrypted media key is generated, one or more identifiers of one or more unrevoked apparatuses,
the encryption key is a common key,
the piece of key related information is a piece of reference identification information that identifies the subset with which the piece of reference unique information is in correspondence,
the encrypted media key is in correspondence with the piece of reference identification information,
the judgment unit judges that the piece of set identification information indicates that the terminal apparatus is an unrevoked apparatus, in a case where a path exists that extends from the subset identified by the piece of set identification information stored in the unique information storing unit and reaches the subset identified by the piece of reference identification information,
the first obtaining unit obtains the encrypted media key that is encrypted by an encryption key based on the piece of reference unique information in correspondence with the piece of reference identification information,
the second obtaining unit obtains the decryption key and takes the obtained decryption key as the common key, and
the decrypting unit decrypts the encrypted media key, using the obtained common key.

17. The terminal apparatus of claim 16, wherein
the management apparatus (i) searches for a subset that wholly contains said another subset in the lowermost layer and is made up of a smallest number of elements and associates said another subset being a parent node with the searched subset being a child node, (ii) further searches for a subset that wholly contains the containing subset being an association destination, is made up of a smallest number of elements, and has not been associated yet, and associates the association destination subset being a parent node with the further searched subset being a child node, so as to generate subset trees whose roots are the subsets in the lowermost layer,
the unique information storing unit further stores therein a data structure for constituting the subset trees generated by the management apparatus, and
the judgment unit judges, using the subset trees constituted with the data structure, whether or not a path exists that extends from the subset that is in correspondence with the piece of unique information stored in the unique information storing unit and reaches the subset identified by the piece of reference identification information.

18. The terminal apparatus of claim 16, wherein
the management apparatus (i) searches for a subset that wholly contains said another subset in the lowermost layer and is made up of a smallest number of elements and associates said another subset being a parent node with the searched subset being a child node, (ii) further searches for a subset that wholly contains the containing subset being an association destination, is made up of a smallest number of elements, and has not been associated yet, and associates the association destination subset being a parent node with the further searched subset being a child node, so as to generate subset trees whose roots are the subsets in the lowermost layer, the piece of reference identification information includes a first generation path that extends from a root of one of the subset trees and reaches a reference subset with which the piece of reference unique information is in correspondence, the piece of set identification information includes a second generation path that extends from the root of the one of the subset trees and reaches a subset with which the piece of unique information is in correspondence, and the judgment unit judges, in a case where the second generation path is contained in the first generation path, that a path exists that extends from the subset identified by the piece of set identification information and reaches the subset identified by the piece of reference identification information.

19. The terminal apparatus of claim 16, wherein the management apparatus (i) inputs a piece of unique information that is in correspondence with a subset to a one-way function so as to generate a common key based on the piece of unique information and generate a piece of derivative unique information deriving from the piece of unique information, (ii) brings the generated piece of derivative unique information into correspondence with a subset that is associated with the subset with which the inputted piece of unique information is in correspondence, and (iii) assigns the generated piece of derivative unique information to apparatus identifiers included in the associated subset, the second obtaining unit includes:

a device key obtaining unit operable to generate and obtain a device key based on the piece of unique information and the piece of derivative unique information from the piece of unique information stored in the unique information storing unit, using a function identical to the one-way function;

a repetition unit operable to control the device key obtaining unit so that processing thereof is repeatedly performed using each piece of unique information obtained by the device key obtaining unit as a next input to the identical function, until a device key based on the piece of reference unique information is obtained; and a decryption key obtaining unit operable to obtain, as the common key, the device key based on the piece of reference unique information obtained by the device key obtaining unit.

20. The terminal apparatus of claim 19, further comprising:

a content obtaining unit operable to obtain a content;

a content key obtaining unit operable to obtain a content key;

a first encrypting unit operable to encrypt the content key obtained by the content key obtaining unit, using the media key obtained by the decrypting unit so as to generate an encrypted content key;

a second encrypting unit operable to encrypt the content obtained by the content obtaining unit, using the content key obtained by the content key obtaining unit so as to generate an encrypted content; and a writing unit operable to write the encrypted content key and the encrypted content into a recording medium.

21. The terminal apparatus of claim 20, wherein the writing unit writes the encrypted content key and the encrypted content into the recording medium which is included in an apparatus located in a network, via a communication medium.

22. The terminal apparatus of claim 19, further comprising:

an encrypted content key obtaining unit operable to obtain an encrypted content key which is obtained by encrypting a content key with the media key;

an encrypted content obtaining unit operable to obtain an encrypted content which is obtained by encrypting a content with the content key;

a first decrypting unit operable to decrypt the encrypted content key obtained by the encrypted content key obtaining unit, using the media key so as to generate the content key;

a second decrypting unit operable to decrypt the encrypted content obtained by the encrypted content obtaining unit, using the content key so as to generate the content; and a playback unit operable to play back the content generated by the second decrypting unit.

23. The terminal apparatus of claim 22, wherein the encrypted content key and the encrypted content are recorded on a recording medium, which is mounted on the terminal apparatus, the encrypted content key obtaining unit obtains the encrypted content key from the recording medium, and the encrypted content obtaining unit obtains the content from the recording medium.

24. The terminal apparatus of claim 22, wherein the encrypted content obtaining unit obtains the encrypted content key via a communication medium, and the encrypted content obtaining unit obtains the content via a communication medium.

25. A copyright protection system comprising:

a plurality of terminal apparatuses; and a management apparatus that manages the plurality of terminal apparatuses by arranging apparatus identifiers for identifying the plurality of terminal apparatuses to be leaves of a tree structure and assigning pieces of unique information to be bases of decryption keys for decrypting a piece of encrypted data to the apparatus identifiers respectively, wherein the management apparatus includes:

a subset generating unit operable to calculate and generate, for each of nodes in layers except for the leaves of the tree structure, a subset defined, by a subset difference, as a set being made up of one or more apparatus identifiers positioned subordinate to the node;

a first association unit operable to search, with respect to a node positioned in a lowermost layer other than a leaf layer, for a subset that wholly contains another subset from among a plurality of subsets generated by the subset generating unit for a parent node of the node positioned in an immediately upper layer thereof, and to associate the another subset as an association source with the subset as an association destination;

a second association unit operable to search for another subset that wholly contains the subset being an association destination, from among one or more other subsets generated for a node for which the subset was generated, and a plurality of subsets positioned in an immediately upper layer thereof and generated by the subset generating unit for a parent node of the node, and to associate the subset as a new association source with the another subset as a new association destination;

a first control unit operable to control the second association unit so that processing thereof is repeatedly performed up to an uppermost layer;

a second control unit operable to control the first association unit, the second association unit, and the first control unit so that processings thereof are repeatedly performed on all subsets generated for respective nodes in the lowermost layer;

a first assignment unit operable to bring pieces of unique information into correspondence respectively with the subsets generated for respective nodes in the lowermost layer, and to assign each piece of unique information to apparatus identifiers contained in the respective subset in the lowermost layer; and a second assignment unit operable to bring, for a subset being an association source generated for a node in one of layers and one or more subsets being association destinations positioned in an immediately upper layer thereof and generated for a parent node of the node, pieces of new unique information into correspondence respectively with the one or more subsets being association destinations, and to assign the pieces of new unique information to apparatus identifiers contained in the one or more subsets being association destinations, the pieces of new unique information being obtained by performing a prescribed operation on pieces of unique information corresponding to the subset being an association source, the prescribed operation being to generate corresponding decryption keys and the pieces of new unique information derivatively obtained from the pieces of unique information.

26. The copyright protection system of claim 25, wherein the subset that is searched for by the first association unit and wholly contains said another subset in the lowermost layer is made up of a smallest number of elements, and the first association unit associates said another subset being a parent node with the searched subset being a child node, the subset that is searched for by the second association unit and wholly contains the containing subset being the association destination is made up of a smallest number of elements, and the second association unit associates the association destination subset being a parent node with the searched subset being a child node, and the first control unit controls the second association unit so that processing thereof is performed repeatedly up to the uppermost layer and generates subset trees whose roots are the subsets in the lowermost layer.

27. The copyright protection system of claim 26, wherein the first association unit controls the second association unit so that processings thereof are repeatedly performed up to the uppermost layer, using one or more subsets obtained by excluding one or more subsets having been associated from subsets positioned in upper layers of the lowermost layer and generates subset trees whose roots are the subsets in the lowermost layer.

28. The copyright protection system of claim 27, wherein the second assignment unit generates the pieces of derivative unique information from the pieces of unique information, using a one-way function and brings the generated pieces of derivative unique information into correspondence with the extending subsets.

29. The copyright protection system of claim 28, further comprising:

a unique information obtaining unit operable to obtain, in a case where a subset in which an identifier of a terminal apparatus being a distribution destination of a piece of unique information appears as an element for a first time exists on one or more paths from the roots to one or more leaves of the subset trees, one or more pieces of unique information being in correspondence with such a subset; and a distributing unit operable to distribute, to the terminal apparatus being the distribution destination, one or more groups each being made up of a different one of the obtained pieces of unique information and set identification information that identifies the subset that is in correspondence with the piece of unique information.

30. The copyright protection system of claim 29, further comprising:

a first storing unit having an area for storing subsets being constituent elements of the subset trees and pieces of unique information that are respectively in correspondence with the subsets;

a second storing unit having an area for storing a plurality of nodes constituting the subset trees and child nodes of the plurality of nodes;

a first writing unit operable to write the subsets and the pieces of unique information into the first storing unit, while the subsets are brought into correspondence with the pieces unique information; and a second writing unit operable to write the plurality of nodes and the child nodes of the plurality of nodes into the second storing unit, while the nodes are brought into correspondence with the child nodes.

31. The copyright protection system of claim 30, wherein the second control unit generates a plurality of subset trees by controlling the first association unit, the second association unit, and the first control unit so that the processings thereof are repeatedly performed on all the subsets in the lowermost layer, the first storing unit stores therein subsets contained in the plurality of subset trees and pieces of unique information that are in correspondence with the contained subsets, and the management apparatus further comprises:

a revoked identifier storing unit having an area for storing one or more revoked identifiers indicating one or more revoked terminal apparatuses out of the plurality of terminal apparatuses;

an encryption key generating unit operable to obtain one or more of the subsets from the first storing unit based on what is stored in the revoked identifier storing unit, to obtain one or more encryption keys based on pieces of unique information that are respectively in correspondence with the obtained subsets, to encrypt a media key used for utilization of a content with the obtained encryption keys individually, so as to generate encrypted media keys that are equal in number to the one or more encryption keys; and a third writing unit operable to write, onto a recording medium mounted on the management apparatus, one or more groups each being made up of a different one of the encrypted media keys and a piece of reference identification information for identifying a subset used for obtaining the encryption key for the encrypted media key.

32. The copyright protection system of claim 31, further comprising:

a revoked identifier receiving unit operable to receive each revoked identifier and write the received revoked identifier into the revoked identifier storing unit.

33. The copyright protection system of claim 31, wherein the encryption keys are each a common key and are identical to the decryption keys, the one-way function is further used for generating common keys based on the pieces of unique information from the pieces of unique information, and the encryption key generating unit includes:

a subset obtaining unit operable to obtain, from the first storing unit, a subset that contains a largest number of one or more unrevoked identifiers which are other than the revoked identifiers stored in the revoked identifier storing unit;

a control unit operable to control the subset obtaining unit so that processing thereof is repeatedly performed until each of all the unrevoked identifiers belongs to any one of the one or more subsets obtained by the subset obtaining unit;

a common key obtaining unit operable to obtain, using the one-way function, one or more common keys generated from the pieces of unique information that are respectively in correspondence with the subsets obtained by the subset obtaining unit; and an encrypting unit operable to generate encrypted media keys that are equal in number to the common keys, using the common keys obtained by the common key obtaining unit.

34. The copyright protection system of claim 33, wherein the terminal apparatus comprises:

a unique information storing unit storing therein one or more groups each being made up of a piece of unique information distributed from the distributing unit of the management apparatus in advance and a piece of set identification information identifying a subset with which the piece of unique information is in correspondence;

a judging unit operable to judge whether the piece of set identification information indicates that the terminal apparatus is an unrevoked apparatus;

a first obtaining unit operable to, in a case where a judgment result of the judgment unit is in the affirmative, obtain one encrypted media key from the recording medium;

a second obtaining unit operable to obtain a decryption key that is in correspondence with the encryption key, using the piece of unique information stored in the unique information storing unit; and a decrypting unit operable to decrypt the encrypted media key obtained by the first obtaining unit, using the decryption key obtained by the second obtaining unit, so as to generate the media key.

35. The copyright protection system of claim 34, wherein the encryption key is a common key, the judgment unit judges that the piece of set identification information indicates that the terminal apparatus is an unrevoked apparatus, in a case where a path exists that extends from the subset being stored in the unique information storing unit and being identified by the piece of set identification information stored in the unique information storing unit and reaches the subset identified by the piece of reference identification information, the first obtaining unit obtains an encrypted media key that is in correspondence with the piece of reference identification information, the second obtaining unit obtains the decryption key and takes the obtained decryption key as the common key, and the decrypting unit decrypts the encrypted media key, using the obtained common key.

36. The copyright protection system of claim 35, wherein the second obtaining unit includes:

a device key obtaining unit operable to generate and obtain a device key based on the piece of unique information and the piece of derivative unique information from the piece of unique information stored in the unique information storing unit, using a function identical to the one-way function;

a repetition unit operable to control the device key obtaining unit so that processing thereof is repeatedly performed using each piece of unique information obtained by the device key obtaining unit as a next input to the identical function, until a device key based on the piece of reference unique information is obtained; and a decryption key obtaining unit operable to obtain, as the common key, the device key based on the piece of reference unique information obtained by the device key obtaining unit.

37. A management apparatus that manages a plurality of terminal apparatuses by arranging apparatus identifiers for identifying the plurality of terminal apparatuses to be leaves of a tree structure and assigning pieces of unique information to the apparatus identifiers, the pieces of unique information being bases of decryption keys for decrypting a piece of encrypted data, the management apparatus comprising:

a subset generating unit operable to calculate and generate, for each of nodes in layers except for the leaves of the tree structure, a subset defined, by a subset difference, as a set being made up of one or more apparatus identifiers positioned subordinate to the node;

a group generating unit operable to select, out of subsets positioned in a layer, and put into one group (i) a subset that contains a smallest number of elements and (ii) another subset that contains the subset containing the smallest number of elements;

a first control unit operable to control the group generating unit so that processing thereof is repeatedly performed on all subsets each of which is positioned in the layer and contains the smallest number of elements;

a second control unit operable to control the group generating unit and the first control unit so that processings thereof are repeatedly performed on all of layers;

an integrating unit operable to, after the second control unit performs the processing on all of the layers, integrate into one group (i) a lower-layer group and (ii) an upper-layer group that includes a subset that wholly contains one of subsets belonging to the lower-layer group and that is generated for a parent node of a node for which the one of subsets are generated, the lower-layer group and the upper-layer group belonging to mutually different layers;

a first assignment unit operable to, after groups are integrated in all of the layers, bring pieces of unique information into correspondence with subsets each of which has a smallest number of elements in each of remaining groups and assign each piece of unique information to one or more apparatus identifiers contained in the corresponding subset; and a second assignment unit operable to bring pieces of derivative unique information into correspondence with subsets other than the subset that has the smallest number of elements respectively and assigns each piece of derivative unique information to one or more apparatus identifiers that are contained in each of said other subsets, the pieces of new unique information being obtained by performing a prescribed operation on pieces of unique information corresponding to the subset that has the smallest number of elements respectively, the prescribed operation being to generate corresponding decryption keys and generate the pieces of new unique information derivatively obtained from the pieces of unique information.

38. An association method to be used by a management apparatus that manages a plurality of terminal apparatuses by arranging apparatus identifiers for identifying the plurality of terminal apparatuses to be leaves of a tree structure and assigning pieces of unique information to the apparatus identifiers, the pieces of unique information being bases of decryption keys for decrypting a piece of encrypted data, the association method comprising:
- a subset generating step of calculating and generating, for each of nodes in layers except for the leaves of the tree structure, a subset defined, by a subset difference, as a set being made up of one or more apparatus identifiers positioned subordinate to the node;
- a first association step of searching, with respect to a node positioned in a lowermost layer other than a leaf layer, for a subset that wholly contains another subset from among a plurality of subsets generated by the subset generating unit for a parent node of the node positioned in an immediately upper layer thereof, and associating the another subsets as an association source with the subset as an association destination;
- a second association step of searching for another subset that wholly contains the subset being an association destination, from among one or more other subsets generated for a node for which the subset was generated, and a plurality of subsets positioned in an immediately upper layer thereof and generated by the subset generating unit for a parent node of the node, and to associate the subset as a new association source with the another subset as a new association destination;
- a first control step of controlling the second association unit so that processing thereof is repeatedly performed up to an uppermost layer;
- a second control step of controlling the first association unit, the second association unit, and the first control unit so that processings thereof are repeatedly performed on all subsets generated for respective nodes in the lowermost layer;
- a first assignment step of bringing pieces of unique information into correspondence respectively with the subsets generated for respective nodes in the lowermost layer, and assigning each piece of unique information to apparatus identifiers contained in the corresponding subset in the lowermost layer; and
- a second assignment step of bringing for a subset being an association source generated for a node in one of layers and one or more subsets being association destinations positioned in an immediately upper layer thereof and generated for a parent node of the node, pieces of new unique information into correspondence respectively with the one or more subsets being association destinations and assigning the piece of new unique information to apparatus identifiers contained in the one or more subsets being association destinations, the pieces of new information corresponding to the subset being an association source, the prescribed operation being to generate corresponding decryption keys and generate the pieces of new unique information derivatively obtained from the pieces of unique information.

39. A non-transitory computer-readable program recording medium which records thereon a program that is for making associations and has a management apparatus execute the following steps, the management apparatus managing a plurality of a plurality of terminal apparatuses by arranging apparatus identifiers for identifying the plurality of terminal apparatuses to be leaves of a tree structure and assigning pieces of unique information to the apparatus identifiers, the pieces of unique information being bases of decryption keys for decrypting a piece of encrypted data, the steps being:
- a subset generating step of calculating and generating, for each of nodes in layers except for the leaves of the tree structure, a subset defined, by a subset difference, as a set being made up of one or more apparatus identifiers positioned subordinate to the node;
- a first association step of searching, with respect to a node positioned in a lowermost layer other than a leaf layer, for a subset that wholly contains another subset from among a plurality of subsets generated by the subset generating unit for a parent node of the node positioned in an immediately upper layer thereof, and associating the another subset as an association source with the subset as an association destination;
- a second association step of searching for another subset that wholly contains the subset being an association destination, from among one or more other subsets generated for a node for which the subset was generated, and a plurality of subsets positioned in an immediately upper layer thereof and generated by the subset generating unit for a parent node of the node, and to associate the subset as a new association source with the another subset as a new association destination;
- a first control step of controlling the second association unit so that processing thereof is repeatedly performed up to an uppermost layer;
- a second control step of controlling the first association unit, the second association unit, and the first control unit so that processings thereof are repeatedly performed on all subsets generated for respective nodes in the lowermost layer;
- a first assignment step of bringing pieces of unique information into correspondence respectively with the subsets generated for respective nodes in the lowermost layer and assigning each piece of unique information apparatus identifiers contained in the corresponding subset in the lowermost layer; and
- a second assignment step of bringing for a subset being an association source generated for a node in one of layers and one or more subsets being association destinations positioned in an immediately upper layer thereof and generated for a parent node of the node, pieces of new unique information into correspondence respectively with one or more subsets being association destinations and assigning each piece of new unique information to apparatus identifiers contained in the one or more subsets being association destinations, the pieces of new unique information being obtained by performing a prescribed operation on pieces of unique information corresponding to the subset being an association source, the prescribed operation being to generate corresponding decryption keys and generate the pieces of new unique information derivatively obtained from the pieces of unique information.

* * * * *